US012184924B2

(12) United States Patent
Shim et al.

(10) Patent No.: US 12,184,924 B2
(45) Date of Patent: *Dec. 31, 2024

(54) IMAGE DISPLAY APPARATUS

(71) Applicant: LG ELECTRONICS INC., Seoul (KR)

(72) Inventors: Seokjin Shim, Seoul (KR); Kiyun Kim, Seoul (KR); Kaeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,421

(22) Filed: Jan. 27, 2023

(65) Prior Publication Data

US 2023/0247247 A1 Aug. 3, 2023

(30) Foreign Application Priority Data

Jan. 28, 2022 (KR) .................. 10-2022-0013580
Oct. 25, 2022 (KR) .................. 10-2022-0138148

(51) Int. Cl.
*H04N 21/43* (2011.01)
*H04N 21/422* (2011.01)
(Continued)

(52) U.S. Cl.
CPC . *H04N 21/43074* (2020.08); *H04N 21/42204* (2013.01); *H04N 21/4316* (2013.01);
(Continued)

(58) Field of Classification Search
None
See application file for complete search history.

(56) References Cited

U.S. PATENT DOCUMENTS 8,700,714 B1    4/2014 Pan et al.
2011/0202853 A1*  8/2011 Mujkic ............. H04M 1/72436
                                                          715/753
(Continued)

FOREIGN PATENT DOCUMENTS

KR        10-1667603 B1    10/2016

OTHER PUBLICATIONS

U.S. Appl. No. 18/102,452, filed Jan. 27, 2023.
U.S. Appl. No. 18/102,475, filed Jan. 27, 2023.

*Primary Examiner* — James R Marandi
(74) *Attorney, Agent, or Firm* — Birch, Stewart, Kolasch & Birch, LLP

(57) ABSTRACT

An image display apparatus can include a display; an image receiver to receive a broadcast signal; a signal processing device to output an image signal based on the broadcast signal; and an interface to exchange data with a mobile terminal or a server Also, the signal processing device is configured to display a plurality of broadcast channel thumbnails, and in response to receiving a selection of one of the plurality of broadcast channel thumbnails, obtain a broadcast image corresponding to the selected broadcast channel thumbnail from the image receiver, receive chatting conversation content corresponding to the broadcast image from the server, and overlay the chatting conversation content on the broadcast image. Also, the signal processing device is configured to in response to receiving input conversation content based on a signal from a remote controller, display the input conversation content together with the broadcast image and the chatting conversation content.

20 Claims, 46 Drawing Sheets

(51) Int. Cl.
*H04N 21/431* (2011.01)
*H04N 21/45* (2011.01)
*H04N 21/4788* (2011.01)
*H04N 21/482* (2011.01)

(52) U.S. Cl.
CPC ..... *H04N 21/4532* (2013.01); *H04N 21/4788* (2013.01); *H04N 21/482* (2013.01)

(56) References Cited

U.S. PATENT DOCUMENTS

| | | | |
|---|---|---|---|
| 2012/0131441 A1* | 5/2012 | Jitkoff | G06Q 30/0641 715/234 |
| 2012/0144416 A1* | 6/2012 | Wetzer | H04N 21/41265 725/14 |
| 2012/0284752 A1* | 11/2012 | Jung | H04N 21/4821 725/40 |
| 2013/0173710 A1 | 7/2013 | Seo | |
| 2013/0218987 A1* | 8/2013 | Chudge | H04L 51/043 709/206 |
| 2014/0019958 A1 | 1/2014 | Sherman | |
| 2014/0068692 A1 | 3/2014 | Archibong et al. | |
| 2014/0082673 A1 | 3/2014 | Nishizawa et al. | |
| 2014/0195675 A1* | 7/2014 | Silver | H04L 65/611 709/224 |
| 2015/0271113 A1 | 9/2015 | Ahn | |

\* cited by examiner (a)　　　　　　　　　(b)　　　　　　　　　(c)

IMAGE DISPLAY APPARATUS

CROSS-REFERENCE TO RELATED APPLICATIONS

This application claims priority to Korean Patent Application No. 10-2022-0013580 filed in the Republic of Korea on Jan. 28, 2022 and Korean Patent Application No. 10-2022-0138148 filed in the Republic of Korea on Oct. 25, 2022, where the entirety of all these applications is hereby incorporated by reference into the present application.

BACKGROUND

1. Field

The present disclosure relates to an image display apparatus, and more specifically, an image display apparatus that accesses a server providing a chatting conversation content and can input or display a conversation content while displaying a broadcast image or broadcast program corresponding to a selected channel among a plurality of broadcast channels and the chatting conversation content together.

2. Description of the Related Art

An image display apparatus is a device that displays an image.

Various images can be displayed through the image display apparatus, and in particular, a broadcast image based on a broadcast signal can be displayed.

Korean Patent No. 10-1667603 (hereinafter, referred to as a "prior document") discloses a chatting providing method, system, and chatting server for each broadcast channel.

However, according to the prior document, when a chatting window is displayed on the TV, the TV does not connect to the URL, but uses a mobile terminal of a user to connect to the URL and perform chatting. Accordingly, there is a disadvantage in that chatting input cannot be directly performed through the TV.

In addition, according to the prior document, there is a disadvantage in that it is difficult to select a broadcast channel from among various broadcast channels and to display a chatting window accordingly. Also, there are problems and inconveniences in the related art when trying to select or carry out a group chat conversation while viewing or switching between different broadcast channels.

SUMMARY OF THE DISCLOSURE

An object of the present disclosure is to provide an image display apparatus an image display apparatus that accesses a server providing a chatting conversation content and can input or display a conversation content while displaying a broadcast image corresponding to a selected channel among a plurality of broadcast channels and the chatting conversation content together.

Another object of the present disclosure is to provide an image display apparatus capable of conveniently selecting a broadcast channel and chatting conversation content through a plurality of broadcast channel thumbnails.

Further another object of the present disclosure is to provide an image display apparatus capable of providing information about whether a chatting window can be displayed on some of a plurality of broadcast channel thumbnails.

According to an aspect of the present disclosure, there is provided an image display apparatus including: a display; an image receiver configured to receive a broadcast signal from an outside; a signal processing device configured to output an image signal to the display based on the received broadcast signal; and an interface configured to exchange data with a mobile terminal or server, in which the signal processing device is configured to display a plurality of broadcast channel thumbnails, and in response to a selection of one of the plurality of broadcast channel thumbnails, the signal processing device is configured to receive a broadcast image corresponding to the selected thumbnail from the image receiver, access the server to receive a chatting conversation content corresponding to the broadcast image from the server through the interface, synchronize the broadcast image and the chatting conversation content, and overlay the chatting conversation content on the broadcast image, and in response to input of a conversation content based on a signal from a remote controller, display the input conversation content.

In response to execution of a broadcast chatting application, the signal processing device can be configured to synchronize the chatting conversation content from the server received through the interface with the broadcast image received from the image receiver, and overlay the chatting conversation content on the broadcast image.

Some of the plurality of broadcast channel thumbnails can include a broadcast video image, an object representing a chatting window, and information on the number of viewers.

In response to execution of a broadcast chatting application, the signal processing device can be configured to display a broadcast image and the plurality of broadcast channel thumbnails together, and in response to a selection of a chatting window object in a thumbnail of a second channel from among the plurality of broadcast channel thumbnails while displaying a broadcast image of a first channel and a chatting conversation content of the first channel, the signal processing device can be configured to display chatting conversation content of the second channel on the broadcast image of the first channel.

The signal processing device can be configured to display a broadcast image and the plurality of broadcast channel thumbnails together, and display a chatting conversation content corresponding to a first thumbnail on a preview screen in response to focus of the first thumbnail among the plurality of broadcast channel thumbnails.

The signal processing device can be configured to display a broadcast image and the plurality of broadcast channel thumbnails together, and in response to focus of a first thumbnail of the plurality of broadcast channel thumbnails, display the most recommended conversation content or the most preferred conversation content among chatting conversation contents corresponding to the first thumbnail.

In response to input of the conversation content based on the signal from the remote controller, the signal processing device can be configured to transmit the conversation content input to the server and highlight and display the input conversation content in a chatting window.

In response to a selection of a preference item or recommendation item for a first chatting conversation content from among the plurality of displayed chatting conversation contents based on the signal from the remote controller, the signal processing device can be configured to transmit preference or recommendation information for the first chatting conversation content to the server and display an increased number of preferences or recommendations of the first chatting conversation content.

The signal processing device can be configured to display a broadcast image and the plurality of broadcast channel thumbnails aligned in the vertical direction together, and in response to focus of a first thumbnail of the plurality of broadcast channel thumbnails, and display a chatting conversation content corresponding to the first thumbnail on a preview screen. Moreover, in response to receiving a channel up or channel down signal from the remote controller in a state in which a first thumbnail of the plurality of broadcast channel thumbnails is focused, the signal processing device can be configured to move the focusing to a second thumbnail disposed above or below the first thumbnail and display a chatting conversation content corresponding to the focused second thumbnail on a preview screen.

The signal processing device can be configured to display an indicator for a menu guide based on the signal from the remote controller, display a menu including a chatting input item in response to focus or selection of the indicator, and display a mobile terminal input item, a keyboard display window, and a text input window in response to a selection of the chatting input item.

In response to a selection of the mobile terminal input item, the signal processing device can be configured to display a code image for installing a chatting application on the mobile terminal.

Based on the signal from the remote controller, the signal processing device can be configured to display an object for continuing or ending the chatting conversation content, and capture image or moving image of the broadcast image in response to a selection of a shared item in the object.

The signal processing device can be configured to transmit the captured image or moving image to the server for sharing a chatting window on which the chatting conversation content is displayed.

The signal processing device can be configured to display a profile screen for ID setting in response to a selection of a profile item in the menu.

The menu can include a profile item, a product item, a music item, a replay item, a picture-in-picture (PIP) item, the chatting input item, and a setting item, and the signal processing device can be configured to separate and display the chatting conversation content displayed on the broadcast image at a distance from the broadcast image in response to a selection of the PIP item.

Based on the PIP input, the signal processing device can be configured to separate and display the chatting conversation content displayed on the broadcast image in a first area at a distance from the broadcast image, and in response to focus of a first thumbnail in a state in which a plurality of thumbnails are displayed based on a remote-control signal, display a chatting conversation content corresponding to the broadcast image on the first area.

Based on a chatting window removal input, the signal processing device can perform a control perform to remove a chatting window including the chatting conversation content and display only the broadcast image.

The signal processing device can be configured to synchronize timing information of the chatting conversation content from the server received through the interface with timing information of the broadcast image received from the image receiver.

The plurality of broadcast channel thumbnails can include a thumbnail of a broadcast channel received from a tuner and a thumbnail of a broadcast channel received from an external input terminal.

According to an aspect of the present disclosure, there is provided the image display apparatus including: the display; the image receiver configured to receive the broadcast signal from the outside; the signal processing device configured to output the image signal to the display based on the received broadcast signal; and the interface configured to exchange data with the mobile terminal or server, in which the signal processing device is configured to display the plurality of broadcast channel thumbnails, in response to a selection of one of the plurality of broadcast channel thumbnails, the signal processing device is configured to receive the broadcast image corresponding to the selected thumbnail from the image receiver, accesses the server to receive the chatting conversation content corresponding to the broadcast image from the server through the interface, synchronizes the broadcast image and the chatting conversation content, and overlay the chatting conversation content on the broadcast image, and the signal processing device in response to input of a conversation content based on a signal from a remote controller, display the input conversation content. Accordingly, the signal processing device accesses the server providing chatting conversation content, and the signal processing device can input or display the conversation content while displaying the broadcast image corresponding to the selected channel among a plurality of broadcast channels and the chatting conversation content together. Furthermore, selection of the broadcast channel and the chatting conversation content can be easily performed through the plurality of broadcast channel thumbnails.

In response to execution of the broadcast chatting application, the signal processing device can be configured to synchronize the chatting conversation content from the server received through the interface with the broadcast image received from the image receiver and overlay the chatting conversation content on the broadcast image. Accordingly, it is possible to check the broadcast image and the chatting conversion content together.

Some of the plurality of broadcast channel thumbnails can include the broadcast video image, the object representing a chatting window, and the information on the number of viewers. Accordingly, it is possible to provide information about whether the chatting window can be displayed on some of the plurality of broadcast channel thumbnails.

In response to execution of the broadcast chatting application, the signal processing device can be configured to display a broadcast image and the plurality of broadcast channel thumbnails together, and when the chatting window object in the thumbnail of the second channel is selected from among the plurality of broadcast channel thumbnails while displaying the broadcast image of the first channel and the chatting conversation content of the first channel, the signal processing device can be configured to display chatting conversation content of the second channel on the broadcast image of the first channel. Accordingly, it is possible to conveniently provide the chatting conversation content of another channel.

The signal processing device can be configured to display the broadcast image and the plurality of broadcast channel thumbnails together, and display chatting conversation content corresponding to a first thumbnail on a preview screen in response to focus of the first thumbnail among the plurality of broadcast channel thumbnails. Accordingly, the chatting conversation contents of other channels can be conveniently provided as a preview.

The signal processing device can be configured to display a broadcast image and the plurality of broadcast channel thumbnails together, and in response to focus of a first thumbnail of the plurality of broadcast channel thumbnails, display the most recommended conversation content or the most preferred conversation content among chatting conversation contents corresponding to the first thumbnail. Therefore, among the chatting conversation content, the most recommended conversation content or the most preferred conversation content can be conveniently provided.

In response to input of the conversation content based on the signal from the remote controller, the signal processing device can be configured to display the conversation content input to the server, and highlight and display the input conversation content in the chatting window. Accordingly, it is possible to input or display the conversation content while displaying the broadcast image and the chatting conversation content together.

In response to a selection of the preference item or recommendation item for a first chatting conversation content from among the plurality of displayed chatting conversation contents based on the signal from the remote controller, the signal processing device can be configured to transmit the preference or recommendation information for the first chatting conversation content to the server, and display the increased number of preferences or recommendations of the first chatting conversation content. Therefore, it is possible to provide the increased number of preferences or recommendations of the first chatting conversation content.

The signal processing device can be configured to display a broadcast image and the plurality of broadcast channel thumbnails aligned in the vertical direction together, and in response to focus of a first thumbnail of the plurality of broadcast channel thumbnails, and display a chatting conversation content corresponding to the first thumbnail on a preview screen. Moreover, in response to receiving the channel up or channel down signal from the remote controller in a state in which a first thumbnail of the plurality of broadcast channel thumbnails is focused, the signal processing device can be configured to move the focusing to a second thumbnail disposed above or below the first thumbnail, and display a chatting conversation content corresponding to the focused second thumbnail on a preview screen. Therefore, the chatting conversation contents of other channels can be conveniently provided as a preview.

The signal processing device can be configured to display an indicator for a menu guide based on the signal from the remote controller, display a menu including a chatting input item in response to focus or selection of the indicator, and display a mobile terminal input item, a keyboard display window, and a text input window in response to a selection of the chatting input item. Accordingly, conversation input is possible in various ways.

In response to a selection of the mobile terminal input item, the signal processing device can be configured to display a code image for installing a chatting application on the mobile terminal. Accordingly, it is possible to provide conversational input through the mobile terminal.

Based on the signal from the remote controller, the signal processing device can be configured to display an object for continuing or ending the chatting conversation content, and capture image or moving image of the broadcast image in response to a selection of a shared item in the object. Accordingly, it is possible to display or complete the chatting conversation content. Furthermore, capturing and sharing of the broadcast images becomes possible.

The signal processing device can be configured to transmit the captured image or moving image to the server for sharing a chatting window on which the chatting conversation content is displayed. Accordingly, partial sharing of a broadcast image or a broadcast program is possible.

The signal processing device can be configured to display a profile screen for ID setting in response to a selection of a profile item in the menu. Accordingly, it is possible to set an ID for inputting the conversation content.

The menu can include a profile item, a product item, a music item, a replay item, a PIP item, the chatting input item, and a setting item, and the signal processing device can be configured to separate and display the chatting conversation content displayed on the broadcast image (e.g., broadcast program, TV show, movie, etc.) at a distance from the broadcast image in response to a selection of the PIP item. Accordingly, it is possible to provide the chatting conversation content separated from the broadcast image.

Based on the PIP input, the signal processing device can be configured to separate and display the chatting conversation content displayed on the broadcast image in a first area at a distance from the broadcast image, and in response to focus of a first thumbnail in a state in which a plurality of thumbnails are displayed based on a remote-control signal, display a chatting conversation content corresponding to the broadcast image on the first area. Accordingly, it is possible to conveniently provide the chatting conversation content of another channel while providing the chatting conversation content separated from the broadcast image.

Based on a chatting window removal input, the signal processing device can be configured to remove a chatting window including the chatting conversation content and display only the broadcast image. Accordingly, it is possible to easily remove the chatting window.

The signal processing device can be configured to synchronize timing information of the chatting conversation content from the server received through the interface with timing information of the broadcast image received from the image receiver. Accordingly, it is possible to synchronize the broadcast image and the chatting conversation content.

The plurality of broadcast channel thumbnails can include a thumbnail of a broadcast channel received from a tuner and a thumbnail of a broadcast channel received from an external input terminal. Accordingly, it is possible to provide thumbnails of various broadcast channels.

BRIEF DESCRIPTION OF THE DRAWINGS

The above and other aspects, features, and advantages of the present disclosure will become apparent from the detailed description of the following aspects in conjunction with the accompanying drawings, described below.

DETAILED DESCRIPTION OF THE EMBODIMENTS

Hereinafter, the present disclosure will be described in detail with reference to the accompanying drawings.

As used herein, the suffixes "module" and "unit" are added to simply facilitate preparation of this specification and are not intended to suggest special meanings or functions. Therefore, the suffixes "module" and "unit" can be used interchangeably.

Figure 1:
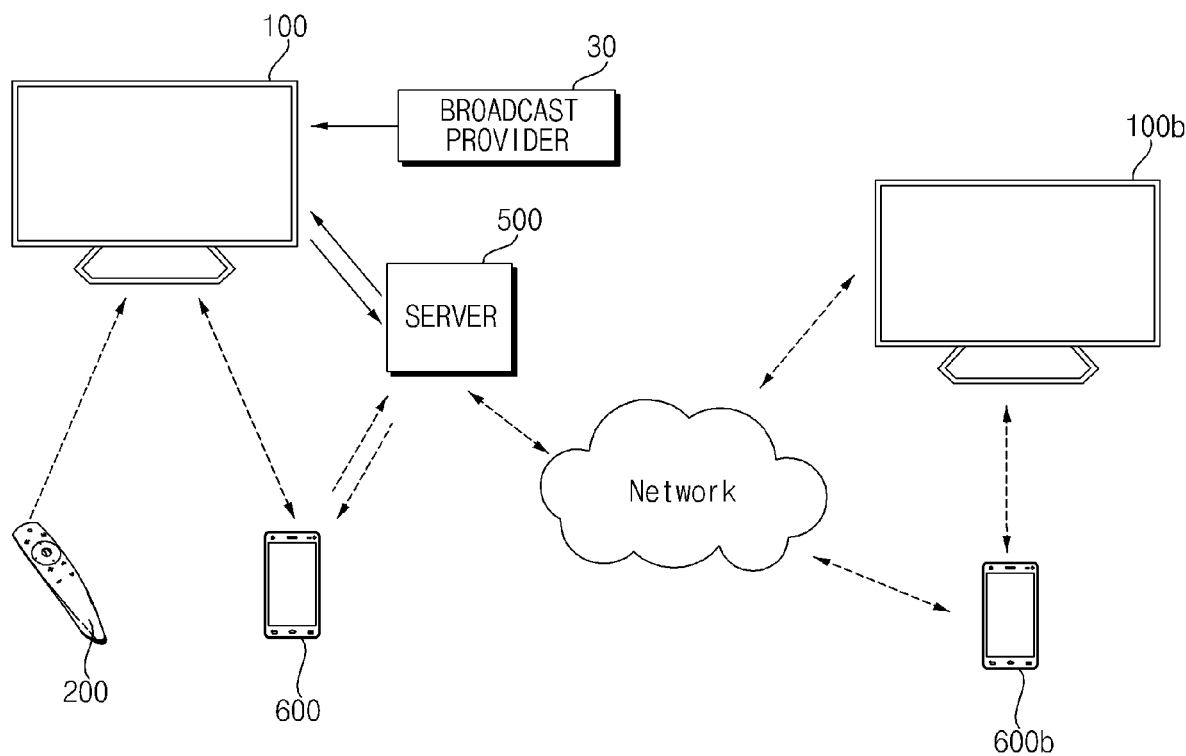
FIG. 1 is a diagram illustrating an image display system according to an embodiment of the present disclosure.

FIG. 1 is a diagram illustrating an image display system according to one embodiment of the present disclosure.

Referring to the drawing, an image display system 10 according one embodiment of the present disclosure can include an image display apparatus 100, a mobile terminal 600, a server 500, and a broadcast provider 30.

In addition, the image display system 10 can further include another image display apparatus 100b and another mobile terminal 600b that can access a network.

The image display apparatus 100 according to one embodiment of the present disclosure receives a broadcast signal from the broadcast provider 30, receives a chatting conversation content from the server 500, synchronizes a broadcast image corresponding to the broadcast signal and the chatting conversation content, displays the chatting conversation content so that the chanting conversation convent is overlaid on the broadcast image, and displays the conversation content and transmits the conversation content to the server 500 in response to input of the conversation content based on the signal from the remote controller 200.

Accordingly, the image display apparatus accesses the server 500, and can input or display conversation content while displaying the broadcast image corresponding to the selected channel among a plurality of broadcast channels and the chatting conversation content together. For example, the broadcast image can be a broadcast program, a TV show, a news program, a movie, streaming application and the like.

The image display apparatus 100 according to one embodiment of the present disclosure displays a plurality of broadcast channel thumbnails to display the chatting conversation content, and in response to a selection of any one of the plurality of broadcast channel thumbnails, the display device 100 receives the broadcast image corresponding to the selected thumbnail from the broadcast provider 30, accesses the server 500, and receives the chatting conversation content corresponding to the selected broadcast image from the server 500. Accordingly, it is possible to conveniently select the broadcast channel and chatting conversation content through the plurality of broadcast channel thumbnails.

The image display apparatus 100 according to one embodiment of the present disclosure accesses the server 500 based on first ID information and receives a first chatting conversation content corresponding to a first broadcast image selected from the server 500. Moreover, the image display apparatus 100 synchronizes the first broadcast image with the first chatting conversation content, overlays and displays the first chatting conversation content on the first broadcast image, and displays a first conversation content and transmits the first conversation content to the server 500 in response to input of the first conversation content based on the signal from the remote controller 200.

The mobile terminal 600 according to one embodiment of the present disclosure accesses the server 500 based on second ID information different from the first ID information, receives and displays the first chatting conversation content corresponding to a first broadcast image selected from the server 500, and displays a second conversation content and transmits the second conversation content to the server 500 when the second conversation content is input.

Another image display apparatus 100b according to one embodiment of the present disclosure accesses the server 500 based on third ID information and receives the first chatting conversation content corresponding to the first broadcast image selected from the server 500. Moreover, the image display apparatus 100b synchronizes the first broadcast image with the first chatting conversation content, overlays and displays the first chatting conversation content on the first broadcast image, and displays a third conversation content and transmits the third conversation content to the server 500 in response to input of the third conversation content based on the signal from the remote controller 200.

Meanwhile, another mobile terminal 600b according to one embodiment of the present disclosure accesses the server 500 based on fourth ID information different from the third ID information, receives and displays the first chatting conversation content corresponding to the first broadcast image selected from the server 500, and displays a fourth conversation content and transmits the fourth conversation content to the server 500 in response to input of the fourth conversation content.

In this way, the chatting conversation content corresponding to the same broadcast image can be shared by accessing the server 500 based on different ID information through each image display apparatus and mobile terminal according to one embodiment of the present disclosure.

In particular, each of the image display apparatuses 100 and 100b according to one embodiment of the present disclosure accesses the server 500 based on different ID information, and can share the same broadcast image and the chatting conversation content corresponding to the same broadcast image. For example, a group of users can carry out a group chat about a same broadcast (e.g., same TV show or same movie) that is being watched by the group of users.

Meanwhile, the image display apparatus 100b different from the image display apparatus 100 of FIG. 1 can be a TV, a monitor, a tablet PC, or a vehicle display device.

Figure 2:
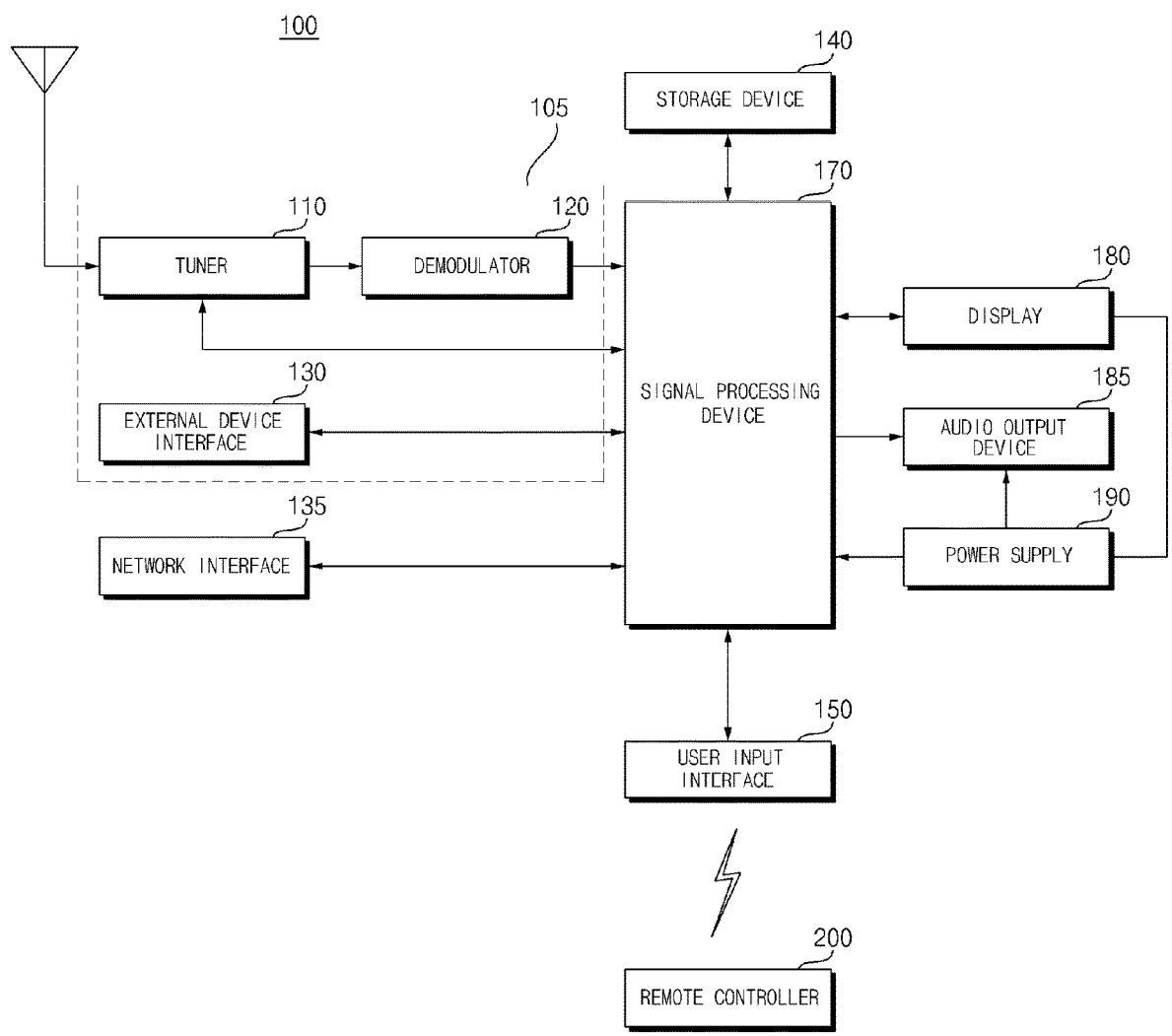
FIG. 2 is an internal block diagram illustrating an image display apparatus of FIG. 1 according to an embodiment of the present disclosure.

FIG. 2 is an internal block diagram illustrating the image display apparatus of FIG. 1.

Referring to FIG. 2, the image display apparatus 100 according to one embodiment of the present disclosure can include an image receiver 105, an external device interface 130, a network interface 135, a storage device 140, a user input interface 150, a sensor device, a signal processing device 170 (e.g., a processor or a controller), a display 180, and an audio output device 185 (e.g., a speaker).

The image receiver 105 can receive an input image. For example, the image receiver 105 can receive a broadcast image, an HDMI image, or an external input image such as a streamed image.

The image receiver 105 can include a tuner 110, a demodulator 120, and an external device interface 130.

Alternatively, the image receiver 105 can include the tuner 110, the demodulator 120, the external device interface 130, and a network interface 135.

The tuner 110 selects a channel selected by a user from among different radio frequency (RF) broadcast signals received through an antenna or an RF broadcast signal corresponding to all pre-stored channels. In addition, the tuner 110 converts the selected RF broadcast signal into a middle-frequency signal, a baseband image, or a voice signal.

To receive broadcast signals of a plurality of channels, a plurality of tuners 110 can be provided. Alternatively, a single tuner to receive a plurality of channels simultaneously can be provided.

The demodulator 120 receives and demodulates a digital IF (DIF) signal converted by the tuner 110.

After performing demodulation and channel decoding, the demodulator 120 can output a stream signal (TS). Herein, the stream signal can be a signal obtained by multiplexing an image signal, voice signal or data signal.

The stream signal output from the demodulator 120 can be input to the signal processing device 170. After performing demultiplexing and image/voice signal processing, the signal processing device 170 outputs an image to the display 180 and voice to the audio output device 185.

The external device interface 130 can transmit or receive data to or from a connected external device, for example, a set-top box.

To this end, the external device interface 130 can include or connect to an A/V input/output device, a wireless transceiver, and the like.

The external device interface 130 can be connected to external devices such as a digital versatile disc (DVD) player, a BLU-RAY player, a gaming device, a camera, a camcorder, a computer (laptop), and a set-top box in a wired/wireless manner, and perform input/output operations with external devices.

The A/V input/output device in the external device interface 130 can receive the image and voice signal of the external device. Meanwhile, the wireless transceiver in the external device interface 130 can perform short-range wireless communication with other electronic devices.

The external device interface 130 can exchange data with a neighboring mobile terminal 600 via the wireless transceiver. In particular, in the mirroring mode, the external device interface 130 can receive device information, information about an executed application and an application image from the mobile terminal 600.

The network interface 135 provides an interface for connecting the image display apparatus to a wired/wireless network including the Internet. For example, the network interface 135 can receive content or data provided by the Internet or a content provider or network operator through a network.

The network interface 135 can include a wireless transceiver.

The storage device 140 can store programs for processing and control of signals in the signal processing device 170, and also store a signal-processed image, voice signal or data signal.

The storage device 140 can function to temporarily store an image signal, a voice signal, or a data signal input through the external device interface 130. In addition, the storage device 140 can store information about a predetermined broadcast channel through the channel memorization function such as a channel map.

While it is illustrated in FIG. 2 that the storage device 140 is provided separately from the signal processing device 170, embodiments of the present disclosure are not limited thereto. The storage device 140 can be included in the signal processing device 170.

The user input interface 150 can transmit a signal input by the user to the signal processing device 170 or transmit a signal from the signal processing device 170 to the user.

For example, the user input interface 150 can transmit/receive user input signals such as power on/off, channel selection, and screen setting to/from the remote controller 200, deliver user input signals input through local keys such as a power key, a channel key, a volume key, or a setting key, deliver user input signals input through a sensor device to sense user gestures to the signal processing device 170, or transmit a signal from the signal processing device 170 to the sensor device.

The signal processing device 170 can demultiplex streams input through the tuner 110, demodulator 120, network interface 135, or external device interface 130, or process demultiplexed signals. Thereby, the signal processing device 170 can generate an output signal for outputting an image or voice.

For example, the signal processing device 170 can receive a broadcast signal or HDMI signal received from the image receiver 105, perform signal processing based on the received broadcast signal or HDMI signal, and output the signal-processed image signal.

An image signal image-processed by the signal processing device 170 can be input to the display 180 and an image corresponding to the image signal can be displayed. In addition, the image signal which is image-processed by the signal processing device 170 can be input to an external output device through the external device interface 130.

A voice signal processed by the signal processing device 170 can be output to the audio output device 185 in the form of sound. In addition, the voice signal processed by the signal processing device 170 can be input to an external output device through the external device interface 130.

Also, the signal processing device 170 can include a demultiplexer, an image processor, and the like. That is, the signal processing device 170 can perform various signal processing, and thus can be implemented in the form of a System On Chip (SOC). This will be described later with reference to FIG. 3.

Additionally, the signal processing device 170 can control overall operation of the image display apparatus 100. For example, the signal processing device 170 can control the tuner 110 to tune to an RF broadcast corresponding to a channel selected by the user or a pre-stored channel.

The signal processing device 170 can control the image display apparatus 100 according to a user command input through the user input interface 150 or an internal program.

The signal processing device 170 can control the display 180 to display an image. Herein, the image displayed on the display 180 can be a still image, a moving image, a 2D image, or a 3D image.

The signal processing device 170 can be configured to display the predetermined object in an image displayed on the display 180. For example, the object can be at least one of an accessed web page (a newspaper, a magazine, or the like), electronic program guide (EPG), various menus, a widget, an icon, a still image, a moving image, or text.

The signal processing device 170 can recognize the location of the user based on an image captured by a capture device (e.g., a camera). For example, the signal processing device 170 can recognize a distance (a z-axis coordinate) between the user and the image display apparatus 100. Additionally, the signal processing device 170 can recognize an x-axis coordinate and a y-axis coordinate corresponding to the location of the user in the display 180.

The display 180 generates drive signals by converting an image signal, data signal, OSD signal, and control signal processed by the signal processing device 170 or an image signal, data signal, and control signal received from the external device interface 130.

The display 180 can be configured as a touch screen and used as an input device in addition to an output device.

The audio output device 185 receives a voice signal processed by the signal processing device 170 and outputs voice.

The capture device captures an image or a video of the user. The capture device can be implemented with one camera, but is not limited thereto, and can be implemented with a plurality of cameras. Image information captured by the capture device can be input to the signal processing device 170.

The signal processing device 170 can sense user gestures based on an image captured by the capture device, a sensed signal from the sensor device, or a combination thereof.

The signal processing device 170 can be implemented in the form of a System On Chip (SOC).

The power supply 190 supplies corresponding power throughout the image display apparatus 100. In particular, the power supply 190 can supply power to the signal processing device 170 implemented in the form of a System On Chip (SOC), the display 180 for displaying images, an audio output device 185 for outputting audio, or the like.

Specifically, the power supply 190 can include a converter to convert alternating current (AC) power into direct current (DC) power and a DC-DC converter to change the level of the DC power.

The remote controller 200 transmits user input to the user input interface 150. To this end, the remote controller 200 can employ BLUETOOTH, radio frequency (RF) communication, infrared (IR) communication, ultra-wideband (UWB), or ZIGBEE. In addition, the remote controller 200 can receive an image signal, a voice signal, or a data signal output from the user input interface 150, and display the signals on the remote controller 200 or voice-output.

The image display apparatus 100 can be a fixed or mobile digital broadcast receiver capable of receiving digital broadcast services.

The block diagram of the image display apparatus 100 illustrated in FIG. 2 is a block diagram for one embodiment of the present disclosure. Constituents of the block diagram can be integrated, combinable, added or omitted according to the specifications of the image display apparatus 100 which is implemented in reality. That is, two or more constituents can be combined into one constituent, or one constituent can be subdivided into two or more constituents, when necessary. In addition, the function performed in each block is simply illustrative, and it should be noted that specific operations or devices of the blocks do not limit the scope of the present disclosure.

Figure 3:
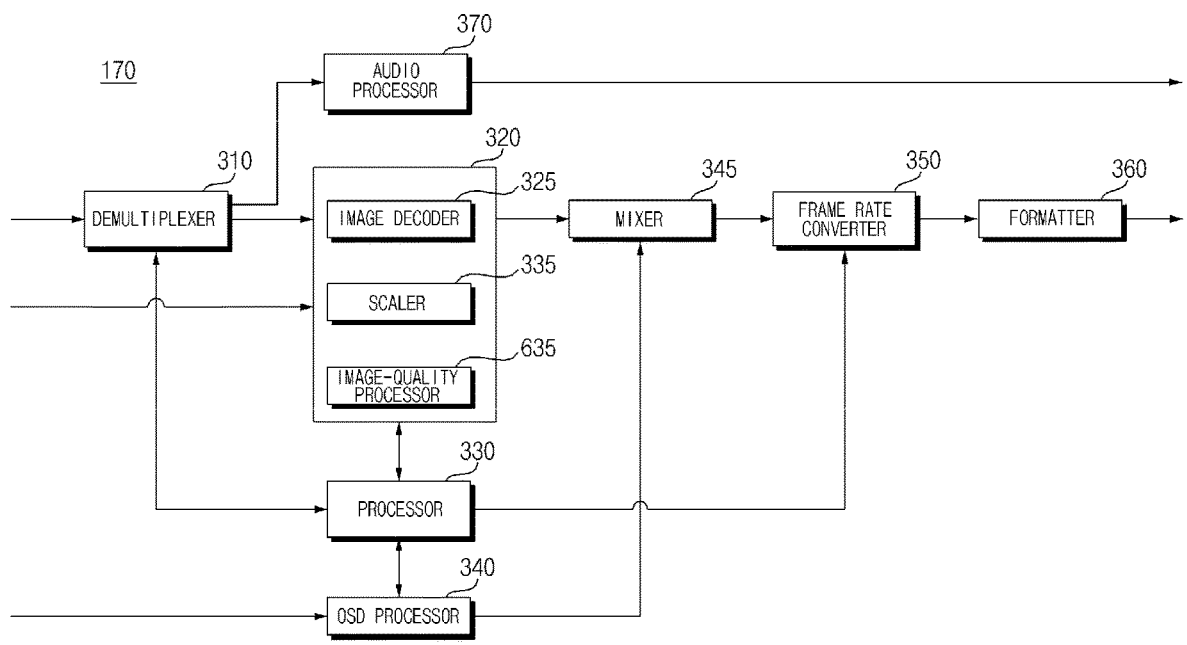
FIG. 3 is an internal block diagram illustrating a signal processing device of FIG. 2 according to an embodiment of the present disclosure.

FIG. 3 is an internal block diagram illustrating the signal processing device of FIG. 2.

Referring to the drawings, the signal processing device 170 according to one embodiment of the present disclosure can include a demultiplexer 310, an image processor 320, a processor 330, and an audio processor 370. In addition, the signal processing device 170 can further include a data processor.

The demultiplexer 310 demultiplexes an input stream. For example, when an MPEG-2 TS is input, the demultiplexer 310 can demultiplex the MPEG-2 TS to separate the MPEG-2 TS into an image signal, a voice signal and a data signal. Herein, the stream signal input to the demultiplexer 310 can be a stream signal output from the tuner 110, the demodulator 120 or the external device interface 130.

The image processor 320 can perform signal processing on an input image. For example, the image processor 320 can perform image processing of an image signal demultiplexed by the demultiplexer 310.

To this end, the image processor 320 includes an image decoder 325, a scaler 335, an image-quality processor 635, an image encoder, an OSD processor 340, a frame rate converter 350, and a formatter 360, and the like.

The image decoder 325 decodes the demultiplexed image signal, and the scaler 335 scales the resolution of the decoded image signal such that the image signal can be output through the display 180.

The image decoder 325 can include decoders of various standards. For example, the image decoder 325 can include an MPEG-2 decoder, an H.264 decoder, a 3D image decoder for color images and depth images, and a decoder for multi-viewpoint images.

The scaler 335 can scale an input image signal that has been image decoded by the image decoder 325 or the like.

For example, the scaler 335 can perform up-scaling when the size or resolution of the input image signal is small, and down-scaling when the size or resolution of the input image signal is large.

The image-quality processor 635 can perform image quality processing on an input image signal that has been image decoded in the image decoder 325 or the like.

For example, the image-quality processor 635 can perform noise removal processing of the input image signal, expand the resolution of gray levels of an input image signal, improve image resolution, perform high dynamic range (HDR) based signal processing, change the frame rate, or perform image quality processing corresponding to panel characteristics, particularly organic light emitting panels or the like.

The OSD processor 340 generates an OSD signal automatically or according to user input. For example, the OSD processor 340 can generate a signal for display of various kinds of information in the form of images or text on the screen of the display 180 based on a user input signal. The generated OSD signal can include various data including the user interface screen window of the image display apparatus 100, various menu screen windows, widgets, and icons. The generated OSD signal can also include a 2D object or a 3D object.

The OSD processor 340 can generate a pointer which can be displayed on the display, based on a pointing signal input from the remote controller 200. In particular, the pointer can be generated by a pointing signal processing device, and the OSD processor 340 can include the pointing signal generator. Of course, it is possible to provide the pointing signal processing device separately from the OSD processor 340.

The frame rate converter (FRC) 350 can convert the frame rate of an input image. The FRC 350 can output frames without performing separate frame rate conversion.

The formatter 360 can change the format of an input image signal into an image signal for display on a display and output the changed image signal.

In particular, the formatter 360 can change the format of the image signal to correspond to the display panel.

Meanwhile, the formatter 360 can change the format of an image signal. For example, the format of the 3D image signal can be changed to any one format of various 3D formats, such as a Side by Side format, a Top/Down format, a Frame Sequential format, an Interlaced format, and a Checker Box format.

The processor 330 can control overall operations within the image display apparatus 100 or signal processing device 170.

For example, the processor 330 can control the tuner 110 to select (tuning) an RF broadcast corresponding to a channel selected by a user or a pre-stored channel.

The processor 330 can control the image display apparatus 100 according to a user command input through the user input interface 150 or an internal program.

The processor 330 can perform data transfer control with the network interface 135 or the external device interface 130.

The processor 330 can control operations of the demultiplexer 310 and the image processor 320 within the signal processing device 170.

An audio processor 370 in the signal processing device 170 can voice-process a demultiplexed voice signal. To this end, the audio processor 370 can include various decoders.

The audio processor 370 in the signal processing device 170 can perform processing such as adjustment of bass, treble, and volume.

The data processor in the signal processing device 170 can perform data processing on a demultiplexed data signal. For example, when the demultiplexed data signal is a coded data signal, the data processor can decode the data signal. The coded data signal can be electronic program guide information including broadcast information, such as a start time and end time of a broadcast program broadcast on each channel.

The block diagram of the signal processing device 170 illustrated in FIG. 3 is a block diagram for one embodiment of the present disclosure. Constituents of the block diagram can be integrated, combinable, added, or omitted according to the specifications of the signal processing device 170 which is implemented in reality.

In particular, the frame rate converter 350 and the formatter 360 can be separately provided in addition to the image processor 320.

Figure 4A:
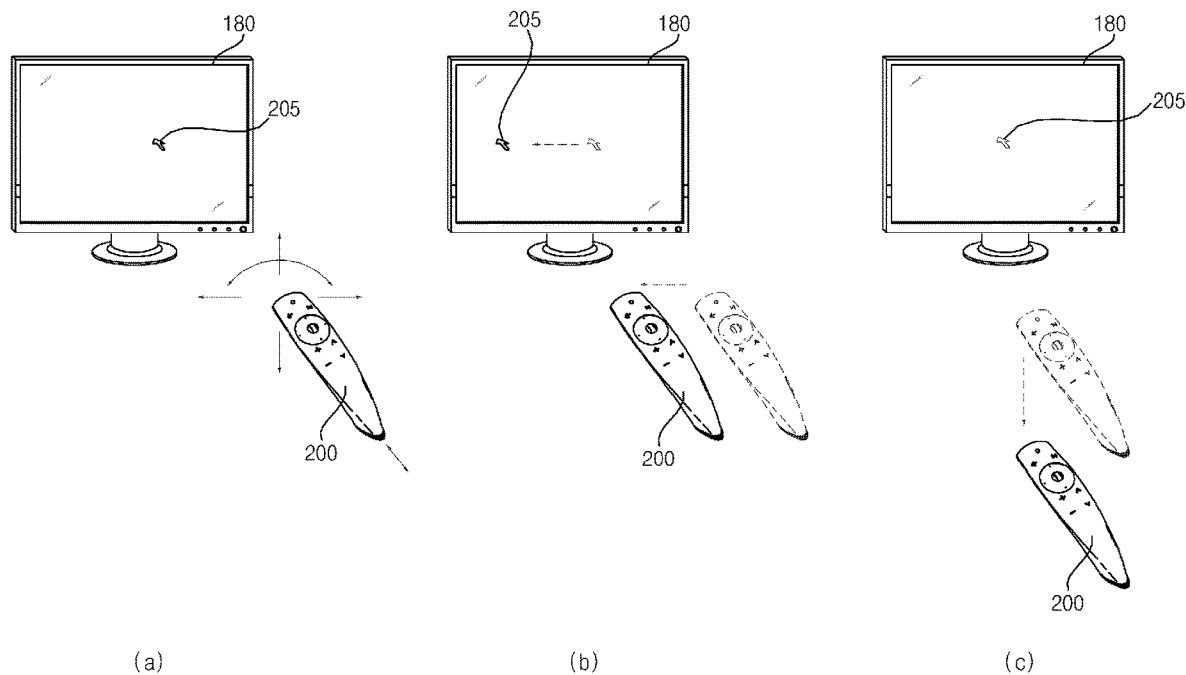
FIG. 4A, including parts (a)-(c), illustrates a method for controlling a remote controller of FIG. 2 according to an embodiment of the present disclosure.

FIG. 4A illustrates a method for controlling the remote controller of FIG. 2.

As illustrated in FIG. 4A(a), a pointer 205 corresponding to the remote controller 200 can be displayed on the display 180.

The user can move the remote controller 200 up and down, left and right (FIG. 4A(b)), or back and forth or in and out (FIG. 4A(c)) or rotate the same. The pointer 205 displayed on the display 180 of the image display apparatus corresponds to the movement of the remote controller 200. As illustrated in the drawings, since the pointer 205 moves according to movement of the remote controller 200 in the 3D space, the remote controller 200 can be referred to as a spatial remote control or a 3D pointing device or a magic remote.

FIG. 4A(b) illustrates a situation where the pointer 205 displayed on the display 180 of the image display apparatus moves to the left when the user moves the remote controller 200 to the left.

Information about movement of the remote controller 200 sensed through a sensor of the remote controller 200 is transmitted to the image display apparatus. The image display apparatus can calculate coordinates of the pointer 205 based on the information about the movement of the remote controller 200. The image display apparatus can display the pointer 205 such that the pointer 205 corresponds to the calculated coordinates.

FIG. 4A(c) illustrates a situation where the user moves the signal processing device 170 away from display 180 in a state where the user presses down a specific button in the remote controller 200. In this situation, a selected area on the display 180 corresponding to the pointer 205 can be zoomed in and displayed with the size thereof increased. On the other hand, when the user moves the remote controller 200 closer to the display 180, the selected area in the display 180 corresponding to the pointer 205 can be zoomed out and displayed with the size thereof reduced. Alternatively, the selected area can be zoomed out when the remote controller 200 moves away from the display 180, and can be zoomed in when the remote controller 200 moves closer to the display 180.

Vertical and lateral movement of the remote controller 200 may not be recognized while the specific button in the remote controller 200 is pressed down. That is, when the remote controller 200 approaches or moves away from the display 180, vertical and lateral movements thereof may not be recognized or temporarily ignored, but back-and-forth movement thereof can be recognized. When the specific button in the remote controller 200 is not pressed down, the pointer 205 only moves according to vertical and lateral movements of the remote controller 200.

The speed and direction of movement of the pointer 205 can correspond to the speed and direction of movement of the remote controller 200.

Figure 4B:
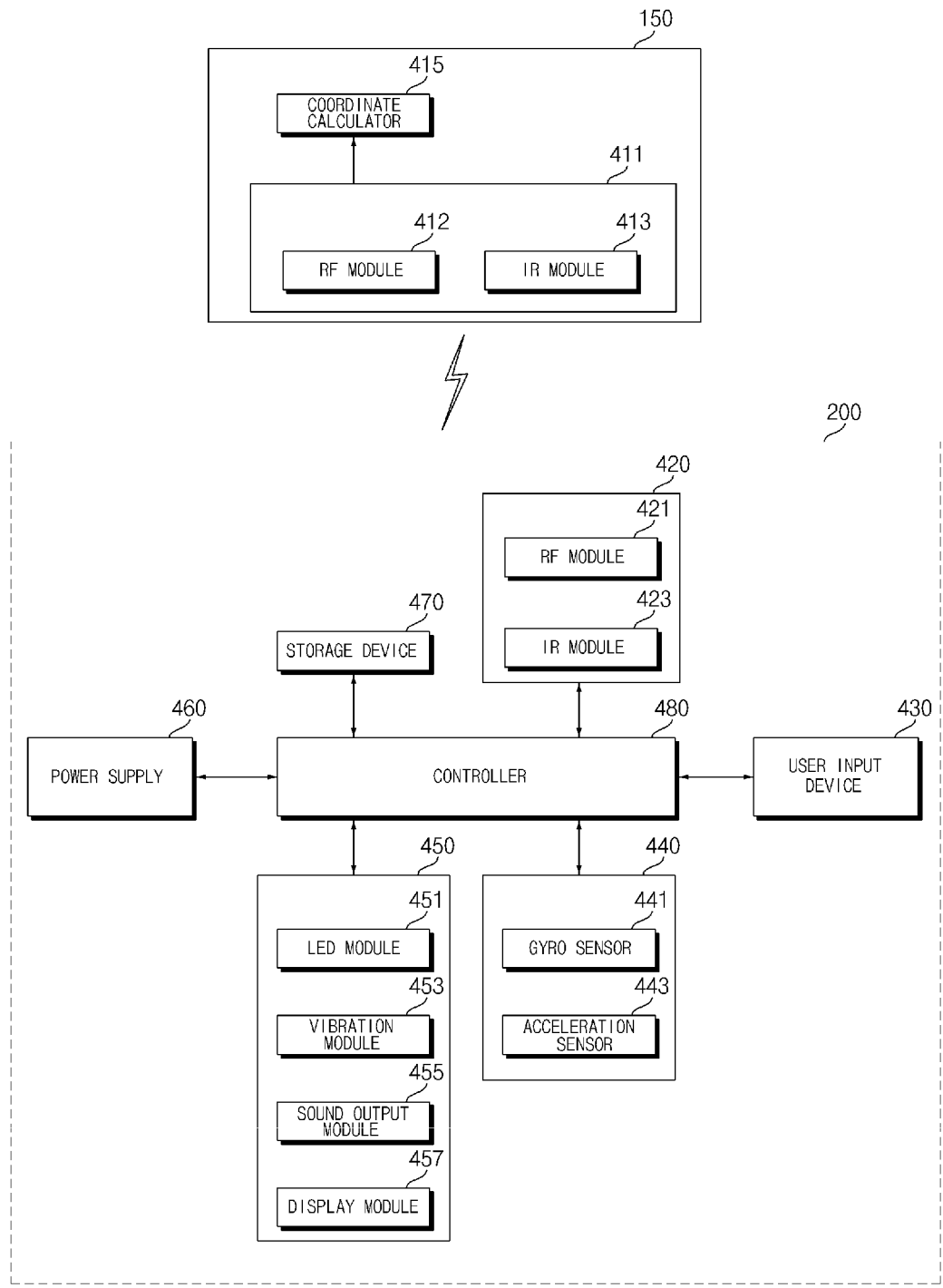
FIG. 4B is an internal block diagram illustrating the remote controller of FIG. 2 according to an embodiment of the present disclosure.

FIG. 4B is an internal block diagram illustrating the remote controller of FIG. 2.

Referring to the drawing, the remote controller 200 can include a wireless transceiver 420, a user input device 430, a sensor device 440, an output device 450, a power supply 460, a storage device 470, and a controller 480 (e.g., a processor).

The wireless transceiver 420 transmits and receives signals to and from one of the image display apparatuses according to embodiments of the present disclosure described above. Hereinafter, one image display apparatus 100 according to one embodiment of the present disclosure will be described.

In this embodiment, the remote controller 200 can include an RF module 421 capable of transmitting and receiving signals to and from the image display apparatus 100 according to an RF communication standard. The remote controller 200 can further include an IR module 423 capable of transmitting and receiving signals to and from the image display apparatus 100 according to an IR communication standard.

In this embodiment, the remote controller 200 transmits a signal including information about movement of the remote controller 200 to the image display apparatus 100 via the RF module 421.

In addition, the remote controller 200 can receive a signal from the image display apparatus 100 via the RF module 421. When necessary, the remote controller 200 can transmit commands related to power on/off, channel change, and volume change to the image display apparatus 100 via the IR module 423.

The user input device 430 can include a keypad, a button, a touchpad, or a touchscreen. The user can input a command related to the image display apparatus 100 with the remote controller 200 by manipulating the user input device 430. When the user input device 430 includes a hard key button, the user can input a command related to the image display apparatus 100 with the remote controller 200 by pressing the hard key button. When the user input device 430 includes a touchscreen, the user can input a command related to the image display apparatus 100 with the remote controller 200 by touching a soft key on the touchscreen. The user input device 430 can include various kinds of input means such as a scroll key and a jog key which are manipulatable by the user, but it should be noted that this embodiment does not limit the scope of the present disclosure.

The sensor device 440 can include a gyro sensor 441 or an acceleration sensor 443. The gyro sensor 441 can sense information about movement of the remote controller 200.

For example, the gyro sensor 441 can sense information about movement of the remote controller 200 with respect to the X, Y and Z axes. The acceleration sensor 443 can sense information about the movement speed of the remote controller 200. The sensor device 440 can further include a distance measurement sensor to sense a distance to the display 180.

The output device 450 can output an image signal or voice signal corresponding to manipulation of the user input device 430 or a signal transmitted from the image display apparatus 100. The user can recognize, via the output device 450, whether the user input device 430 is manipulated or the image display apparatus 100 is controlled.

For example, the output device 450 can include an LED module 451 to be turned on when the user input device 35 is operated or signals are transmitted to and received from the image display apparatus 100 via the wireless transceiver 420, a vibration module 453 to generate vibration, a sound output module 455 to output sound, or a display module 457 to output an image.

The power supply 460 supplies power to the remote controller 200. When the remote controller 200 does not move for a predetermined time, the power supply 460 can stop supplying power to save power. The power supply 460 can resume supply of power when the predetermined key provided to the remote controller 200 is manipulated.

The storage device 470 can store various kinds of programs and application data necessary for control or operation of the remote controller 200. When the remote controller 200 wirelessly transmits and receives signals to and from the image display apparatus 100 via the RF module 421, the remote controller 200 and the image display apparatus 100 can transmit and receive signals in a predetermined frequency band. The controller 480 of the remote controller 200 can store, in the storage device 470, information about, for example, a frequency band enabling wireless transmission and reception of signals to and from the image display apparatus 100 which is paired with the remote controller 200, and reference the same.

The controller 480 controls overall operation related to control of the remote controller 200. The controller 480 can transmit, via the wireless transceiver 420, a signal corresponding to manipulation of a predetermined key in the user input device 430 or a signal corresponding to movement of the remote controller 200 sensed by the sensor device 440 to the image display apparatus 100.

The user input interface 150 of the image display apparatus 100 can include a wireless transceiver 151 capable of wirelessly transmitting and receiving signals to and from the remote controller 200 and a coordinate calculator 415 capable of calculating coordinates of the pointer corresponding to operation of the remote controller 200.

The user input interface 150 can wirelessly transmit and receive signals to and from the remote controller 200 via an RF module 412. In addition, the user input interface 150 can receive, via an IR module 413, a signal transmitted from the remote controller 200 according to an IR communication standard.

The coordinate calculator 415 can calculate coordinates (x, y) of the pointer 205 to be displayed on the display 180, by correcting hand tremor or an error in a signal corresponding to operation of the remote controller 200 which is received via the wireless transceiver 151.

The transmitted signal of the remote controller 200 input to the image display apparatus 100 via the user input interface 150 is transmitted to the signal processing device 170 of the image display apparatus 100. The signal processing device 170 can determine information about an operation of the remote controller 200 or manipulation of a key from the signal transmitted from the remote controller 200, and control the image display apparatus 100 according to the information.

As another example, the remote controller 200 can calculate coordinates of the pointer corresponding to movement thereof and output the same to the user input interface 150 of the image display apparatus 100. In this situation, the user input interface 150 of the image display apparatus 100 can transmit, to the signal processing device 170 of the image display apparatus 100, information about the received coordinates of the pointer without separately correcting hand tremor or the error.

As another example, the coordinate calculator 415 can be provided in the signal processing device 170 of the image display apparatus 100 rather than in the user input interface 150.

Figure 5:
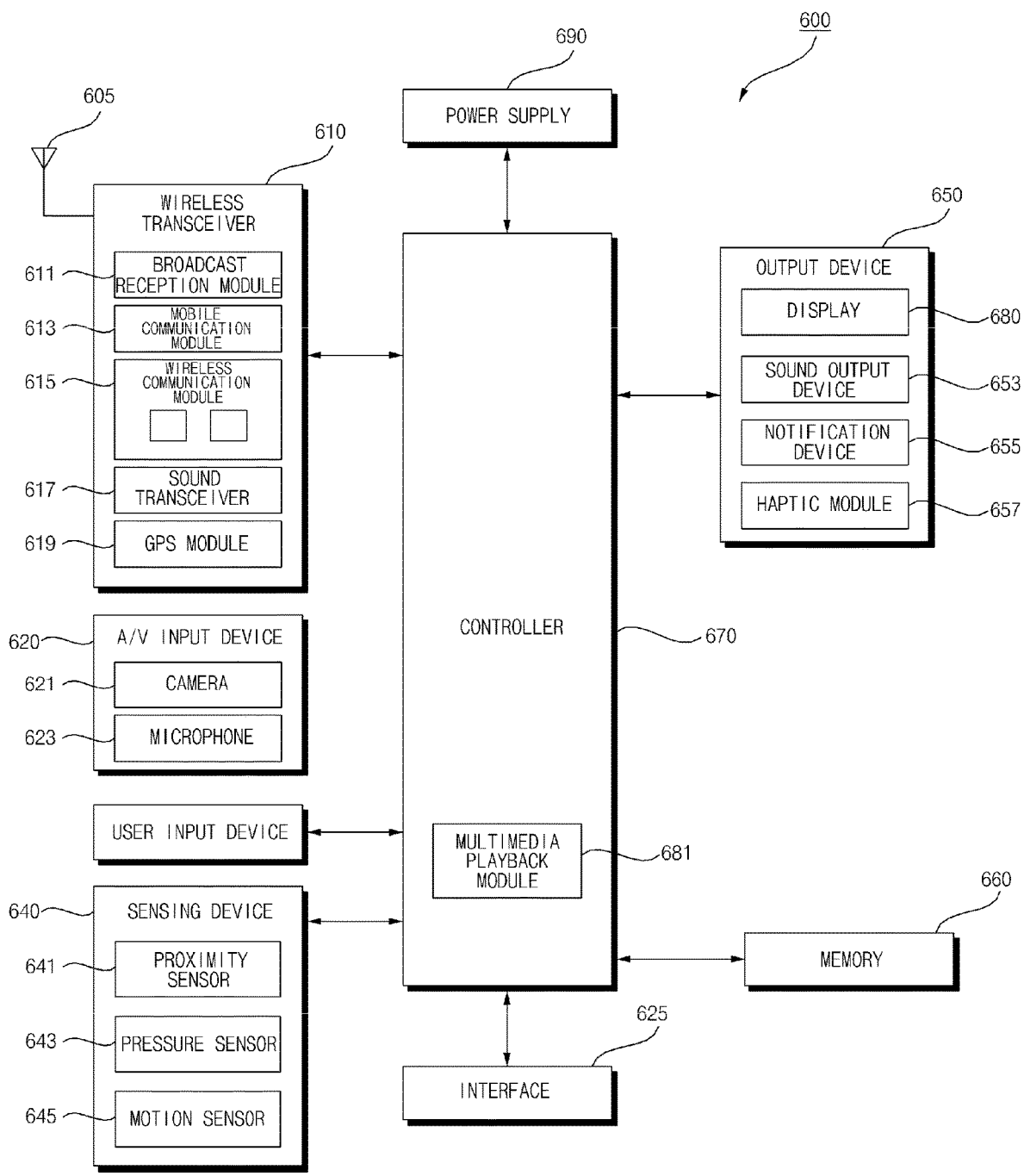
FIG. 5 is an internal block diagram illustrating a mobile terminal of FIG. 1 according to an embodiment of the present disclosure.

FIG. 5 is an internal block diagram illustrating the mobile terminal of FIG. 1.

Referring to the drawing, the mobile terminal 600 can include a wireless transceiver 610, an audio/video (AN) input device 620, a user input device, a sensing device 640, and an output device 650, a memory 660, an interface 625, a controller 670 (e.g., a processor) and a power supply 690.

The wireless transceiver 610 can include a broadcast reception module 611, a mobile communication module 613, a wireless communication module 615, a sound transceiver 617, and a GPS module 619.

The broadcast reception module 611 can receive at least one of a broadcast signal or broadcast-related information from an external broadcast management server over a broadcast channel. Herein, the broadcast channel can include a satellite channel and a terrestrial channel.

The broadcast signal and/or broadcast-related information received through the broadcaster reception module 611 can be stored in the memory 660.

The mobile communication module 613 transmits and receives a radio signal to and from at least one of a base station, an external terminal or a server over a mobile communication network. Herein, the radio signal can include a voice call signal, a video call signal, or various kinds of data according to transmission and reception of a text/multimedia message.

The wireless communication module 615, which refers to a module for wireless communication access, can be installed inside or outside the mobile terminal 600. For example, the wireless communication module 615 can perform Wi-Fi-based wireless communication or Wi-Fi Direct-based wireless communication.

The sound transceiver 617 can perform sound communication. In the sound communication mode, the sound transceiver 617 can add data of predetermined information to audio data which is to be output and output sound. In addition, in the sound communication mode, the sound transceiver 617 can extract data of predetermined information from received sound.

Applicable short-range communication technologies can include BLUETOOTH, radio frequency identification (RFID), Infrared Data Association (IrDA), Ultra-Wideband (UWB), and ZIGBEE.

The GPS module 619 can receive location information from a plurality of GPS satellites.

The A/V input device 620 is used for input of an audio signal or a video signal and can include a camera 621 and a microphone 623.

The user input device 630 generates key input data input by the user to control operation of a terminal of the user. To this end, the user input device 630 can include a keypad, a dome switch, and a touchpad (resistive touchpad/capacitive touchpad). In particular, the touchpad can form a layered architecture together with the display 680, thereby realizing a touchscreen.

The sensing device 640 can generate a sensing signal for controlling operation of the mobile terminal 600 by sensing the current state of the mobile terminal 600, for example by sensing whether the mobile terminal 600 is in the open or closed position, where the mobile terminal 600 is located, and whether the user contacts the mobile terminal 600.

The sensing device 640 can include a proximity sensor 641, a pressure sensor 643 and a motion sensor 645. The motion sensor 645 can employ an acceleration sensor, a gyro sensor, a gravity sensor and the like to sense movement or the location of the mobile terminal. In particular, the gyro sensor, which is used to measure an angular speed, can sense orientation (angle) of the mobile terminal with respect to a reference direction.

The output device 650 can include a display 680, an audio output device 653, a notification device 655, and a haptic module 657.

The display 680 outputs and displays information processed by the mobile terminal 600.

As described above, when the display 680 forms a layered architecture with the touchpad to implement a touchscreen, the display 680 can be used not only as an output device but also as an input device for input of information according to user touch.

The audio output device 653 outputs audio data received from the wireless transceiver 610 or stored in the memory 660. The audio output device 653 can include a speaker and a buzzer.

The notification device 655 outputs a signal for reporting occurrence of an event in the mobile terminal 600. For example, the notification device 655 can output a signal in the form of vibration.

The haptic module 657 generates various haptic effects which can be felt by the user. A typical example of the haptic effects generated by the haptic module 657 is vibration.

The memory 660 can store a program for processing and control of the controller 670, and functions to temporarily store input data or output data (e.g., a phonebook, a message, a still image, a moving image, or the like).

The interface 625 serves as an interface for all devices connected to the mobile terminal 600. The interface 625 can serve to receive data or power from external devices and transfer the same to the internal constituents of the mobile terminal 600 and to transmit data from the mobile terminal 600 to external devices.

The controller 670 typically controls operations of the aforementioned respective elements, thereby controlling overall operation of the mobile terminal. For example, the controller 670 can perform control or processing related to voice communication, data communication, video communication, and the like. The controller 670 can also include a multimedia playback module 681 to reproduce multimedia. The multimedia playback module 681 can be provided in the controller 670 as hardware or can be configured separately from the controller 670.

The power supply 690 supplies power necessary for operations of the respective constituents according to control of the controller 670 when external power or internal power is applied thereto.

The block diagram of the mobile terminal 600 illustrated in FIG. 5 is simply illustrative. The respective constituents of the block diagram can be integrated, added or omitted according to the specifications of the mobile terminal 600. That is, two or more constituents can be combined into one constituent, or one constituent can be subdivided into two or more constituents, when necessary. In addition, the function performed in each block is simply illustrative, and it should be noted that specified operations or devices of the blocks do not limit the scope of the present disclosure.

Figure 6:
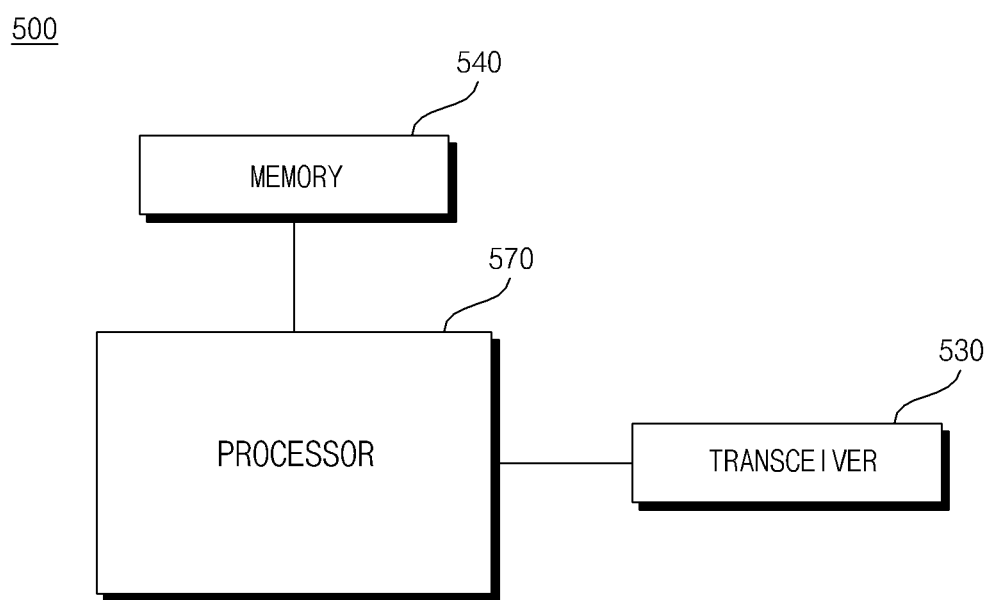
FIG. 6 is an internal block diagram of a server of FIG. 1 according to an embodiment of the present disclosure.

FIG. 6 is an internal block diagram of the server of FIG. 1.

Referring to the drawing, the server 500 includes a transceiver 530 exchanging data with the external image display apparatus 100 and the mobile terminal 600, a memory 540 storing various data, and a processor 570 processing data.

The processor 570 in the server 500 can be configured to arrange and transmit the collected chatting conversation contents to the outside in response to a request for chatting conversation content for a specific broadcast image or a specific broadcast program from the image display apparatus 100 or the mobile terminal 600.

In particular, the processor 570 in the server 500 can perform a control operation to perform grouping by region based on location information received from the image display apparatus 100 or the mobile terminal 600, collect chatting conversation contents for a broadcast image based on a specific region, and transmit the collected chatting conversation contents to the image display apparatus 100 or the mobile terminal 600. For example, the broadcast image can include a TV channel, a broadcast program, a game, a TV program, a show, a movie, a streaming program and the like.

Alternatively, the processor 570 in the server 500 can perform a control operation to perform grouping by viewing age, grouping by viewing gender, or grouping by viewing propensity based on viewer information received from the image display apparatus 100 or the mobile terminal 600, collect chatting conversation contents for a broadcast image based on a specific region, and transmit the collected chatting conversation contents to the image display apparatus 100 or the mobile terminal 600.

When the conversation content information according to the conversation content input is received from the image display apparatus 100 or the mobile terminal 600, the processor 570 in the server 500 can perform a control operation to update the conversation content information and provide the updated chatting conversation content to the image display apparatus 100, the mobile terminal 600, or the like.

Figure 7:
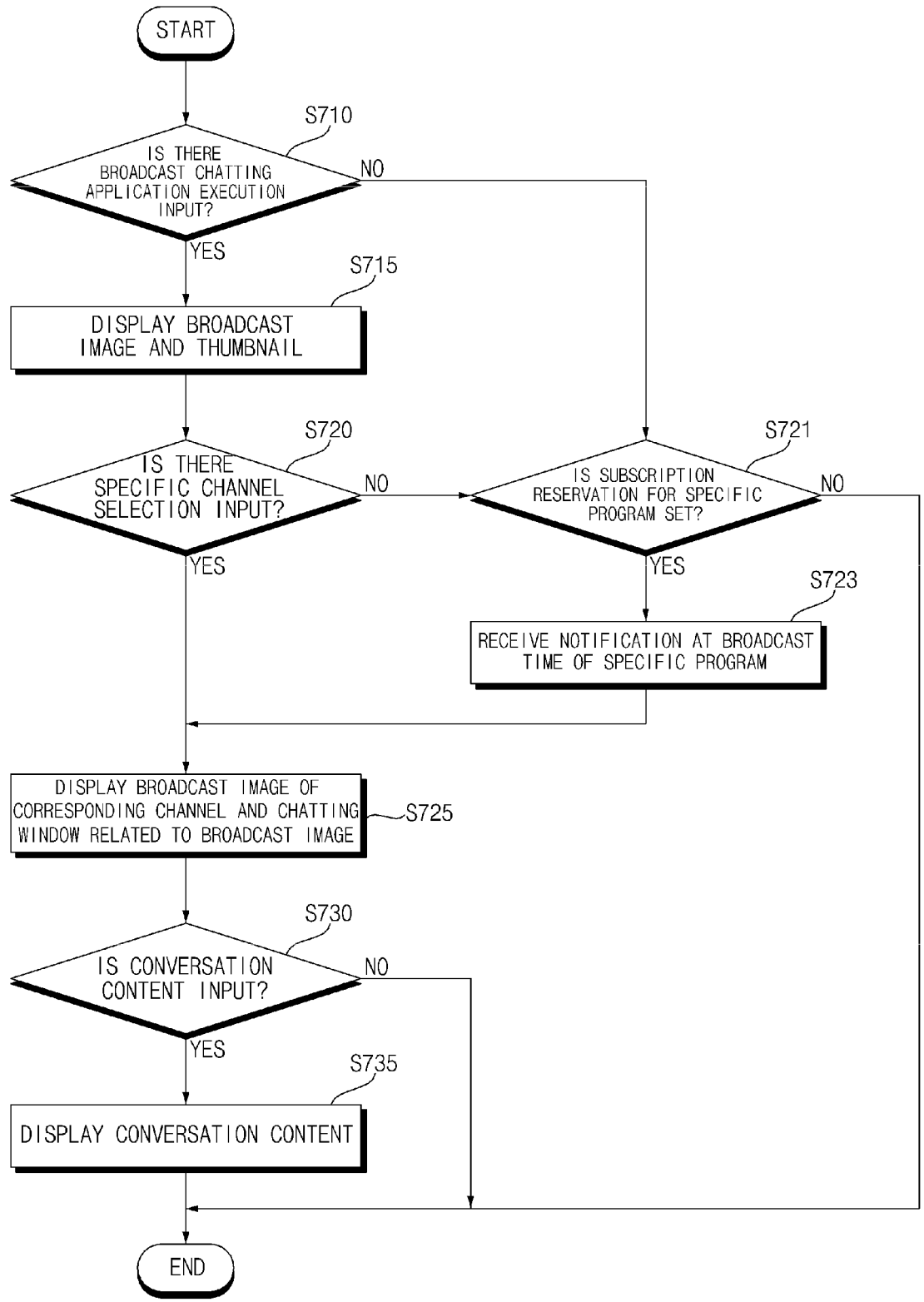
FIG. 7 is a flowchart illustrating an example of an operating method of the image display apparatus according to an embodiment of the present disclosure.

FIG. 7 is a flowchart illustrating an example of an operating method of the image display apparatus according to one embodiment of the present disclosure, and FIGS. 8A to 20B are diagrams referenced for description of the operating method of FIG. 7.

Referring to the drawings, the signal processing device 170 in the image display apparatus 100 determines whether there is a broadcast chatting application execution input has been received based on the signal from the remote controller 200 (S710), and when there is the broadcast chatting application execution input, the signal processing device 170 can be configured to display the broadcast image and the plurality of broadcast channel thumbnails (S715).

Figure 8A:
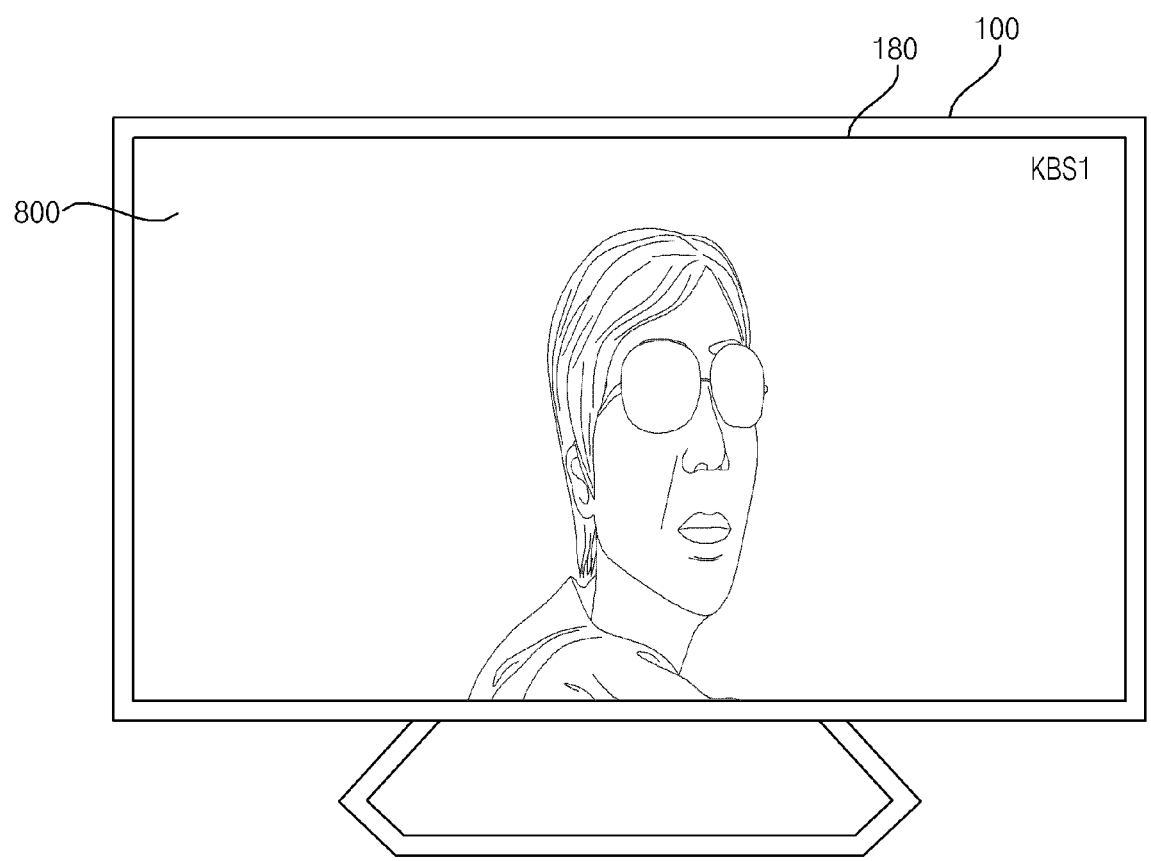
FIGS. 8A to 20B are diagrams referenced for description of the operation method of FIG. 7 according to embodiments of the present disclosure.

For example, the signal processing device 170 in the image display apparatus 100 can be configured to display a broadcast image 800 of a first channel (e.g., TV channel KBS1), as illustrated in FIG. 8A.

At this time, the broadcast image 800 of the first channel can be a broadcast image corresponding to a broadcast signal received by the tuner 110 in the image receiver 105 or a broadcast signal received through an external device interface 130, such as an HDMI terminal.

Alternatively, the broadcast image 800 of the first channel can be a stream-based broadcast image received through the network interface 135.

The signal processing device 170 in the image display apparatus 100 can receive an application display input based on a specific key operation or pointer operation in the remote controller 200.

Figure 8B:
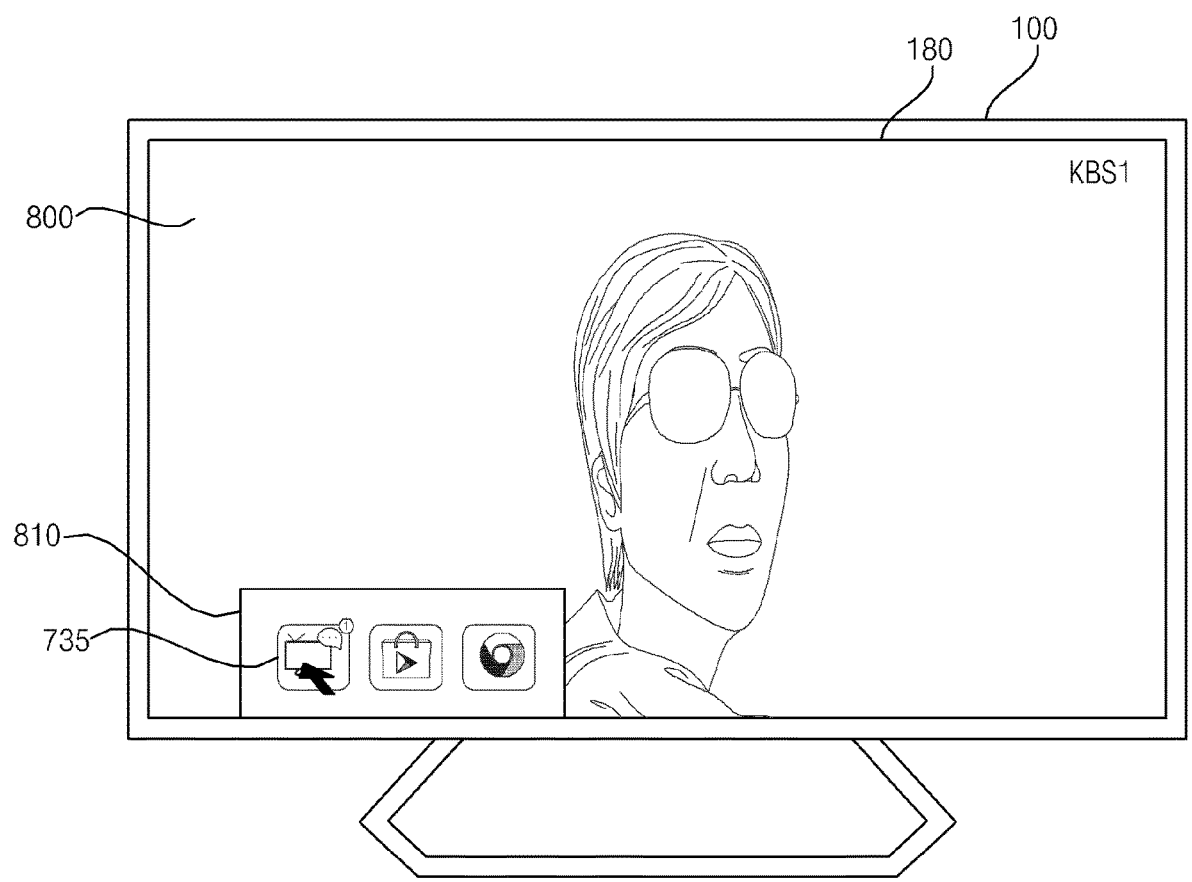

When an application display input is received, the signal processing device 170 in the image display apparatus 100 can be configured to display an application list 810 including a plurality of applications together with the broadcast image 800 as illustrated in FIG. 8B.

At this time, the application list 810 can include a broadcast chatting application 735. For example, an icon or thumbnail for broadcast chatting application 735 can be display in a menu together with icons or thumbnails for other applications.

The signal processing device 170 in the image display apparatus 100 can receive a broadcast chatting application execution input based on a specific key operation or pointer operation in the remote controller 200.

Figure 8C:
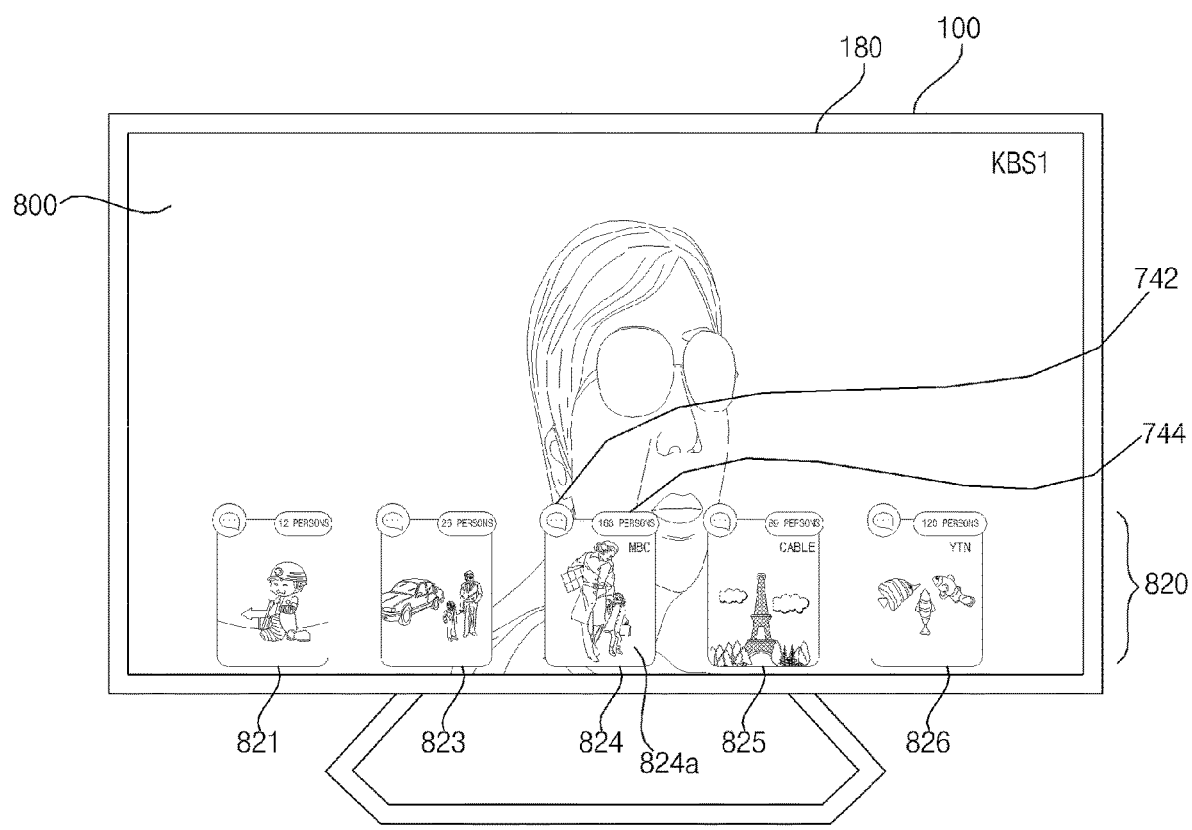

For example, as illustrated in FIG. 8B, when a broadcast chatting application 735 in the application list 810 is selected based on a specific key operation in the remote controller 200 or an operation of the pointer 205, the signal processing device 170 in the display device 100 can be configured to display the broadcast image 800 and the plurality of broadcast channel thumbnails 820, as illustrated in FIG. 8C. For example, a menu including application icons can be replaced with or transition to a menu showing the plurality of broadcast channel thumbnails 820.

The plurality of broadcast channel thumbnails 820 include a thumbnail of a broadcast channel received from the tuner 110 and a thumbnail of a broadcast channel received from an external device interface 130 such as an external input terminal.

The plurality of broadcast channel thumbnails 820 can further include a thumbnail of the broadcast channel received from the network interface 135.

A portion 824 of the plurality of broadcast channel thumbnails 820 can include a broadcast video image 824a, an object 742 representing a chatting window, and information on the number of viewers 744.

In FIG. 8C, five broadcast channel thumbnails 821, 823, 824, 825, and 826 are exemplified as the plurality of broadcast channel thumbnails 820, and it is exemplified that each of the broadcast channel thumbnails 821, 823, 824, 825, and 826 includes the broadcast video image, the object representing the chatting window, and the information on the number of viewers.

In this way, by displaying the object representing a chatting window, when a specific broadcast channel thumbnail is selected, it is possible to easily recognize that chatting conversation content related to the corresponding broadcast image can be provided, thus improving user convenience.

By displaying information on the number of viewers, it is possible to easily recognize viewer interest or the like in a corresponding broadcast and popular shows or popular channels can be conveniently identified to the viewer.

Among the five broadcast channel thumbnails 821, 823, 824, 825, and 826 of FIG. 8C, a third broadcast channel thumbnail 824 can be a thumbnail of a channel corresponding to a broadcast signal received from the tuner 110, and among the five broadcast channel thumbnails 821, 823, 824, 825, and 826, fourth and fifth broadcast channel thumbnails 825 and 826 can be channel thumbnails corresponding to broadcast signals received from the external device interface 130.

Next, the signal processing device 170 in the image display apparatus 100 determines whether there is a specific channel selection input based on the signal from the remote controller 200 (S720), and when there is the specific channel selection input, the signal processing device 170 performs a control operation so that a chatting window including a broadcast image of the corresponding channel and a chatting conversation content of the corresponding broadcast are displayed (S725).

When there is no specific channel selection input, the signal processing device 170 in the image display apparatus 100 determines whether a broadcast program subscription reservation for a specific channel has been set (S721), and when there is the broadcast program subscription reservation, the signal processing device 170 receives notification at the broadcast time of the corresponding broadcast program (S723) and can perform a control operation so that a chatting window including the broadcast image of the corresponding broadcast program and a chatting conversation content of the broadcast image are displayed.

In response to input of the conversation content based on the signal from the remote controller 200 in a state where the broadcast image and the chatting conversation content are displayed, the signal processing device 170 in the image display apparatus 100 can be configured to transmit that the conversation content input to the server 500 and highlight and display the input conversation content in the chatting window (S735).

Accordingly, the signal processing device 170 can access the server 500 providing the chatting conversation content 750, and input or display the conversation content while displaying the broadcast image 830 corresponding to a selected channel among the plurality of broadcast channels and the chatting conversation content 750 together. Furthermore, selection of the broadcast channel and the chatting conversation content 750 can be performed conveniently through the plurality of broadcast channel thumbnails 820.

Figure 8D:
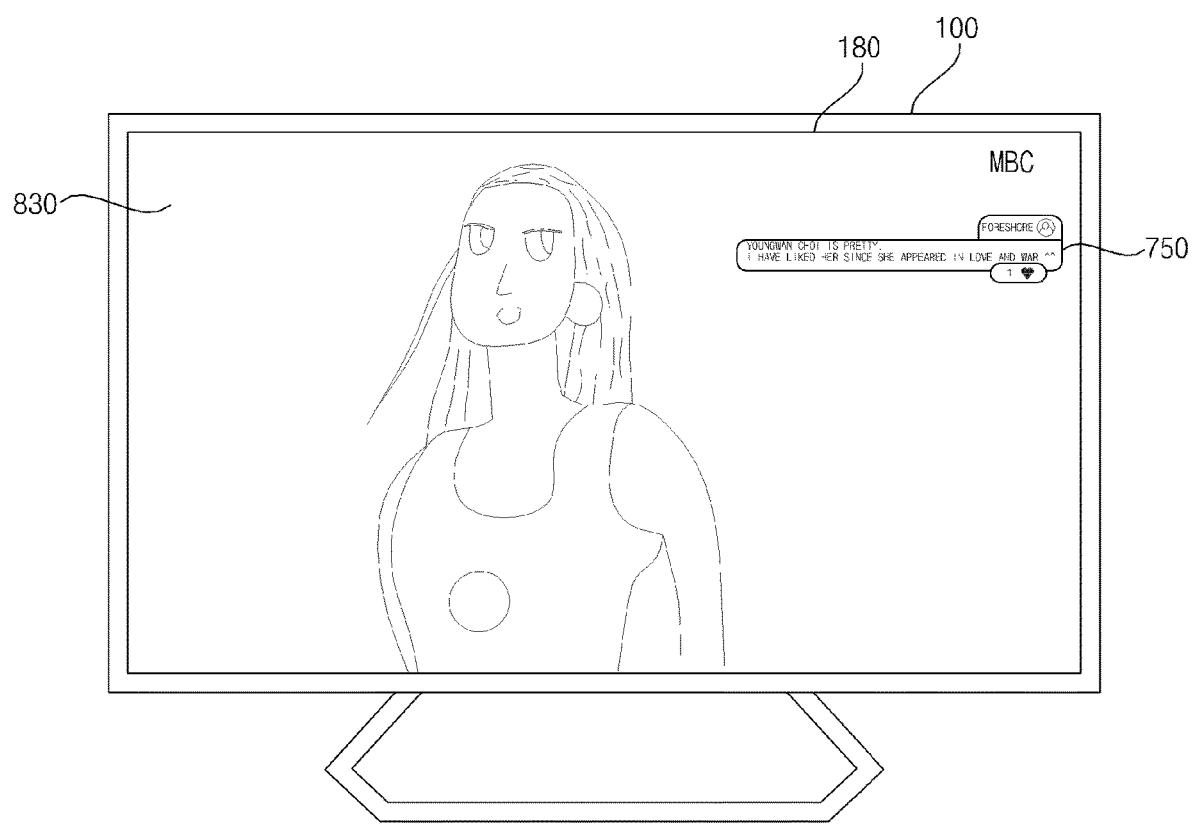

As illustrated in FIG. 8C, when the broadcast channel thumbnail 824 of the second channel (e.g., MBC) is selected based on a specific key operation or an operation of the pointer 205 in the remote controller 200 in a state where the plurality of broadcast channel thumbnails 820 are displayed, the signal processing device 170 in the image display apparatus 100 receives the broadcast image 830 corresponding to the selected thumbnail from the image receiver 105, accesses the server 500 through the network interface 135 to receive the chatting conversation content 750 corresponding to the broadcast image 830, synchronizes the broadcast image 830 and the chatting conversation content 750, and can be configured to overlay the chatting conversation content 750 on the broadcast image 800 and be displayed as illustrated in FIG. 8D.

For synchronization of the broadcast image 830 and the chatting conversation content 750, the signal processing device 170 can be configured to synchronize the timing information of the chatting conversation content 750 from the server 500 received from the interface 135 with the timing information of the broadcast image 830 received from the image receiver 105. Accordingly, it is possible to share the chatting conversation content with other users while watching the same broadcast image 830. For example, users can exchange and view messages at an appropriate timing that is synchronized or linked to a current or recent image or scene, so that their exchange corresponds with what they are watching or with what has been recently viewed.

As illustrated in FIG. 8B, when the broadcast chatting application 810 is executed, the signal processing device 170 can be configured to synchronize the chatting conversation content 750 from the server 500 received from the interface 135 with the broadcast image 830 received from the image receiver 105 and can be configured to overlay the chatting conversation content 750 on the broadcast image 830 as illustrated in FIG. 8D. Accordingly, it is possible to check the broadcast image 830 and the chatting conversation content 750 together.

Figure 9A:
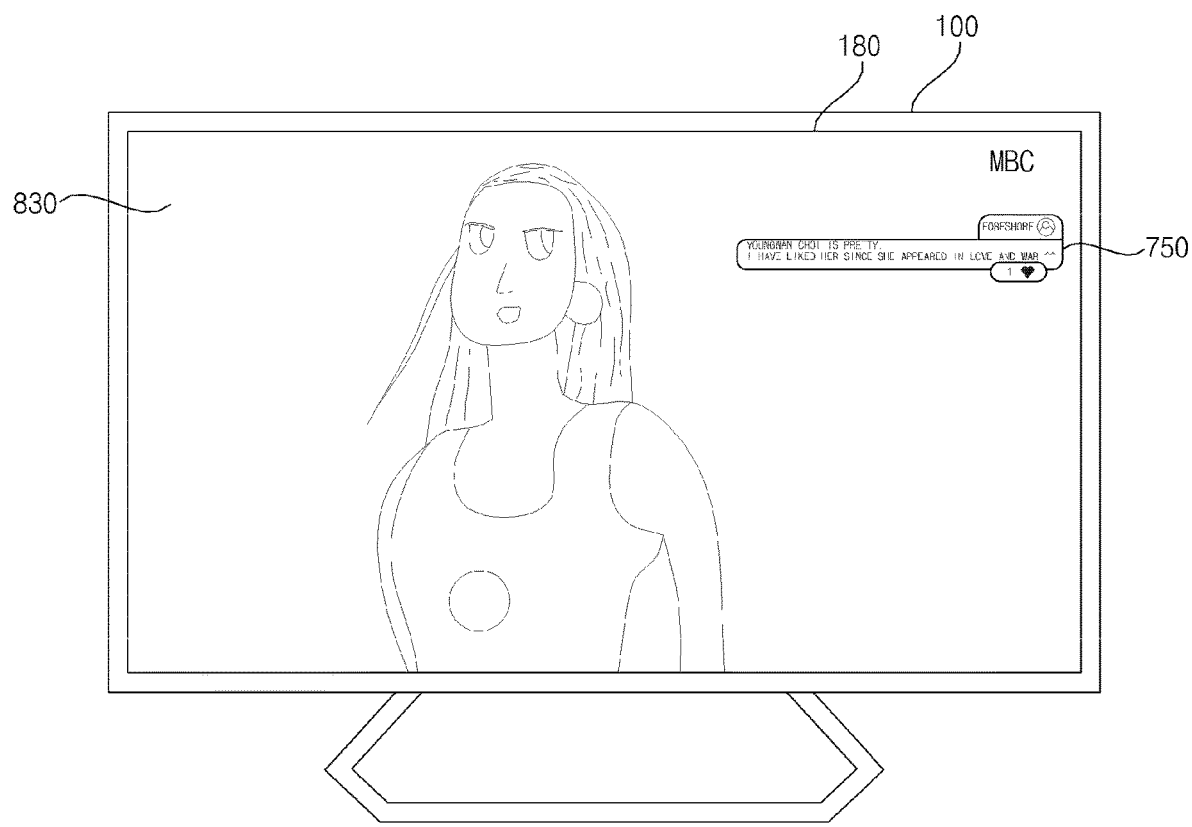
Figure 9B:
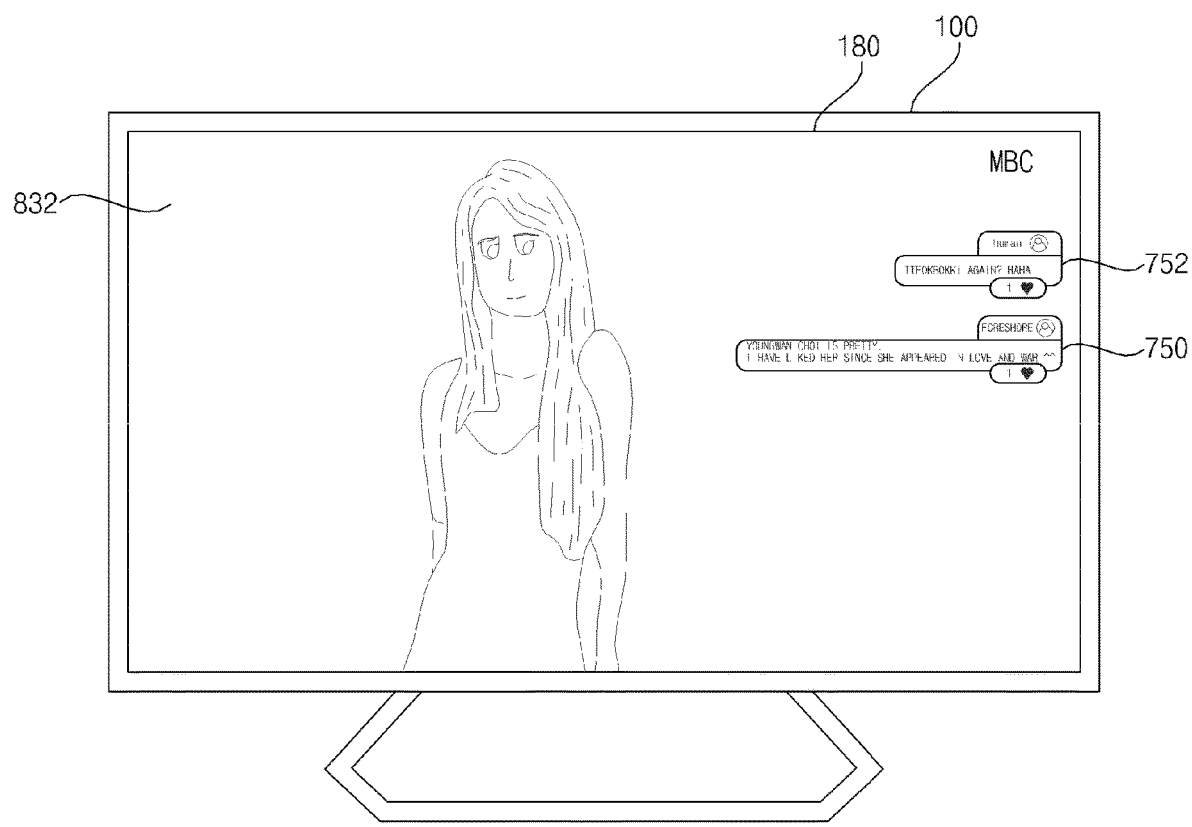

FIG. 9A illustrates that the broadcast image 830 of the second channel and the chatting conversation content 750 are overlaid and displayed at a first time point, and FIG. 9B illustrates that the broadcast image 832 of the second channel and the chatting conversation contents 750 and 752 are overlaid and displayed at a second time point after the first time point.

The server 500 can receive the chatting conversation content from a plurality of image display apparatuses or a plurality of mobile terminals and transmit the chatting conversation content to each of the plurality of image display apparatuses or the plurality of mobile terminals. For example, a virtual group viewing party can be implemented for a broadcast image or broadcast channel.

Accordingly, at the second time point after the first time point, the number of displayed chatting conversation contents is greater than that at the first time point.

In order to secure the visibility of the chatting conversation content, the signal processing device 170 can be configured to display the newly updated chatting conversation content on the top right of the screen as illustrated in the drawing.

In FIG. 9B, the existing chatting conversation content 750 is moved to the bottom, and the new chatting conversation content 752 is placed in the top right.

When an interval of the chatting conversation content received from the server 500 is within a first interval, the signal processing device 170 can set the interval to a second interval greater than the first interval in order to secure the visibility of the chatting conversation content and can be configured to display the subsequent chatting conversation content.

Figure 10A:
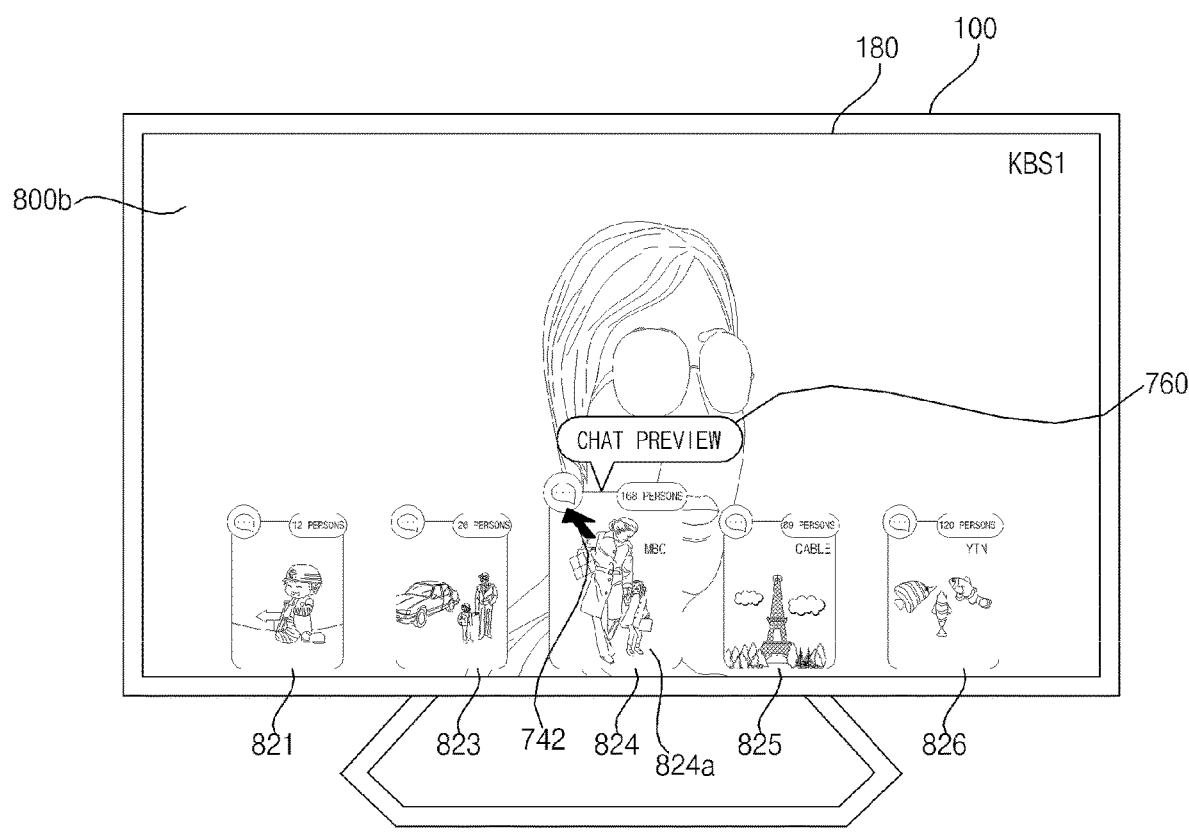

When the broadcast chatting application 810 is executed, the signal processing device 170 can be configured to display the broadcast image 800b and the plurality of broadcast channel thumbnails 820 together, as illustrated in FIG. 10A.

At this time, unlike FIG. 10A, the signal processing device 170 can be configured to display the chatting conversation content of the first channel corresponding to the broadcast image 800b of the first channel.

In a state where the broadcast image 800b of the first channel and the chatting conversation content of the first channel are displayed, based on the signal of the remote controller 200, when a chatting window object within the thumbnail of the second channel among the plurality of broadcast channel thumbnails 820 is selected, the chatting conversation content of the second channel can be controlled to be displayed on the broadcast image 800b of the first channel. Accordingly, it is possible to conveniently provide chatting conversation content of another channel.

As illustrated in FIG. 10A, in a state in which the broadcast image 800b and the plurality of broadcast channel thumbnails 820 are displayed together, the first thumbnail 824 corresponding to the second channel among the plurality of broadcast channel thumbnails 820 is focused on based on the signal of the remote controller 200, the signal processing device 170 can be configured to display a preview item 760 of the chatting conversation content corresponding to the first thumbnail 824. For example, a user can focus on one of the plurality of broadcast channel thumbnails 820 by hovering the pointer over a desired broadcast channel thumbnail and/or by pressing a button on the remote controller, and that broadcast channel thumbnail can be emphasized to indicate that it is being focused on (e.g., enlarging the thumbnail, highlighting, boarder change, color change, etc.).

When the preview item 760 is selected based on the signal of the remote controller 200, the signal processing device 170 can be configured to display a preview screen of the chatting conversation content of the second channel.

Specifically, when the preview item 760 is selected based on the signal of the remote controller 200, in a situation where a broadcast image 800b of the first channel rather than the broadcast image of the second channel is displayed, the signal processing device 170 can be configured to display a preview screen of the chatting conversation content of the second channel. Accordingly, chatting conversation content of a channel other than being displayed can be conveniently provided, and channel switching can be induced. In this way, the viewer can conveniently see if there is sufficient "buzz" or whether a lively or popular discussion is ongoing for a different broadcast image before deciding to change channels (e.g., switching from channel KBS1 to channel MBC).

In a state in which the broadcast image 800b and the plurality of broadcast channel thumbnails 820 are displayed together, the first thumbnail 824 corresponding to the second channel among the plurality of broadcast channel thumbnails 820 is focused on or emphasized based on the signal of the remote controller 200, the signal processing device 170 can be configured to not display the preview item 760 of FIG. 10A, and display the most recommended conversation content or the most frequent or most popular chatting conversation content of the chatting conversation contents corresponding to the first thumbnail. Accordingly, the most recommended conversation content or the most preferred conversation content among the chatting conversation contents of a channel of interest can be conveniently provided, and channel conversion can be induced.

Figure 10B:
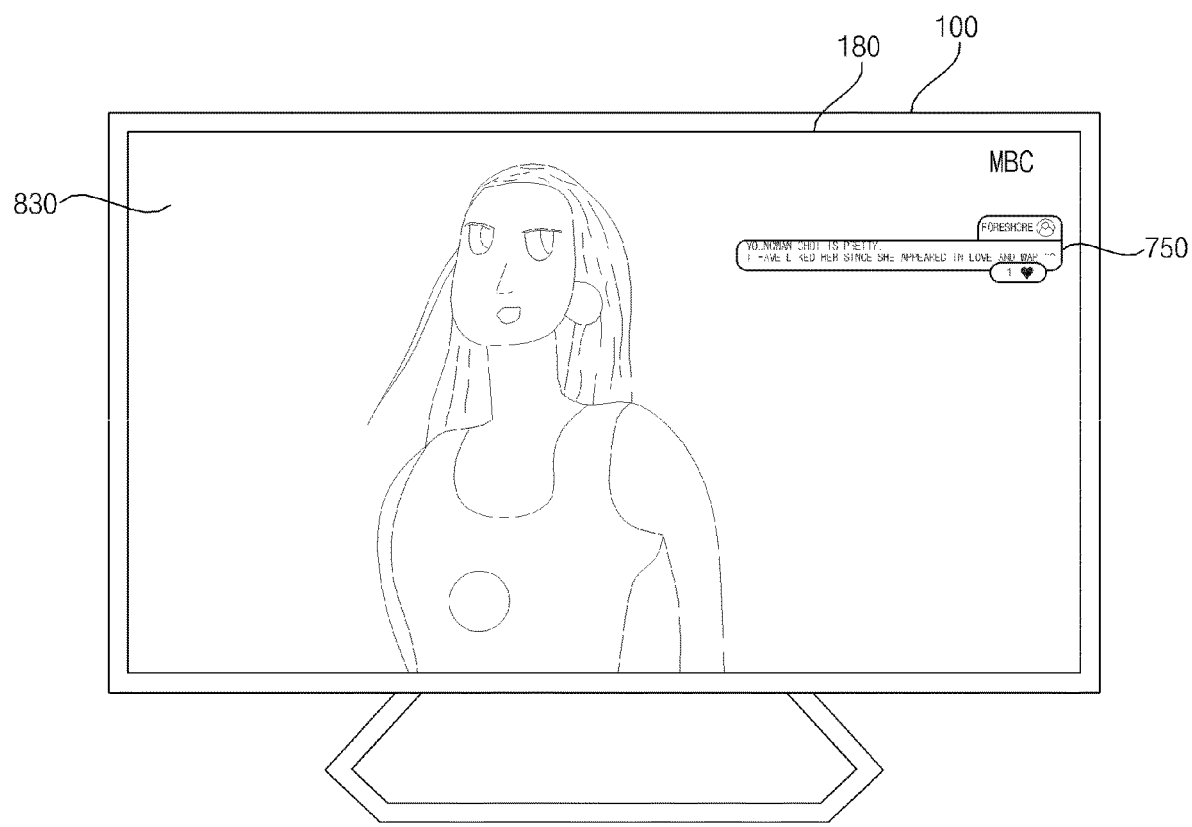

Meanwhile, as illustrated in FIG. 10A, in a state in which a broadcast image 800b and a plurality of broadcast channel thumbnails 820 are displayed together, when the first thumbnail 824 corresponding to the second channel among the plurality of broadcast channel thumbnails 820 is selected based on the signal of the remote controller 200, the signal processing device 170 can be configured to overlay and display the broadcast image 830 of the second channel and the chatting conversation content 750 as illustrated in FIG. 10B.

Figure 11A:
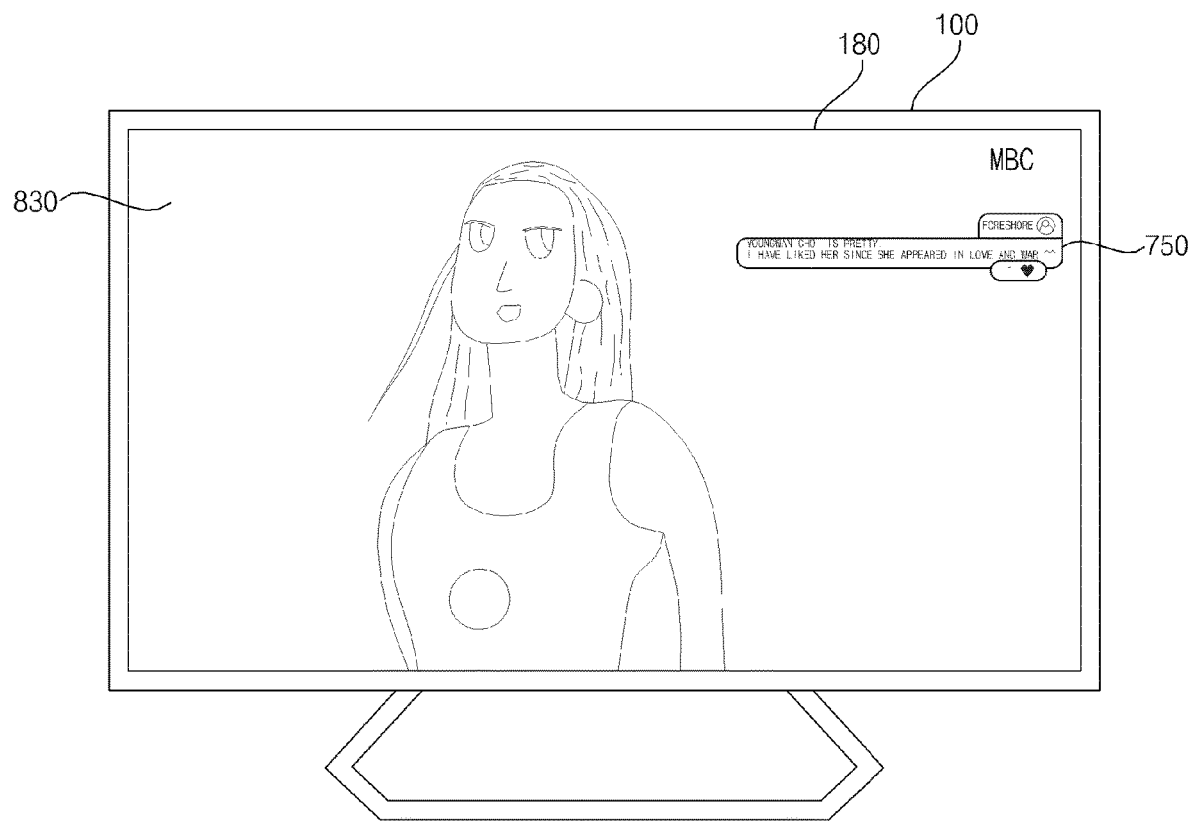
Figure 11B:
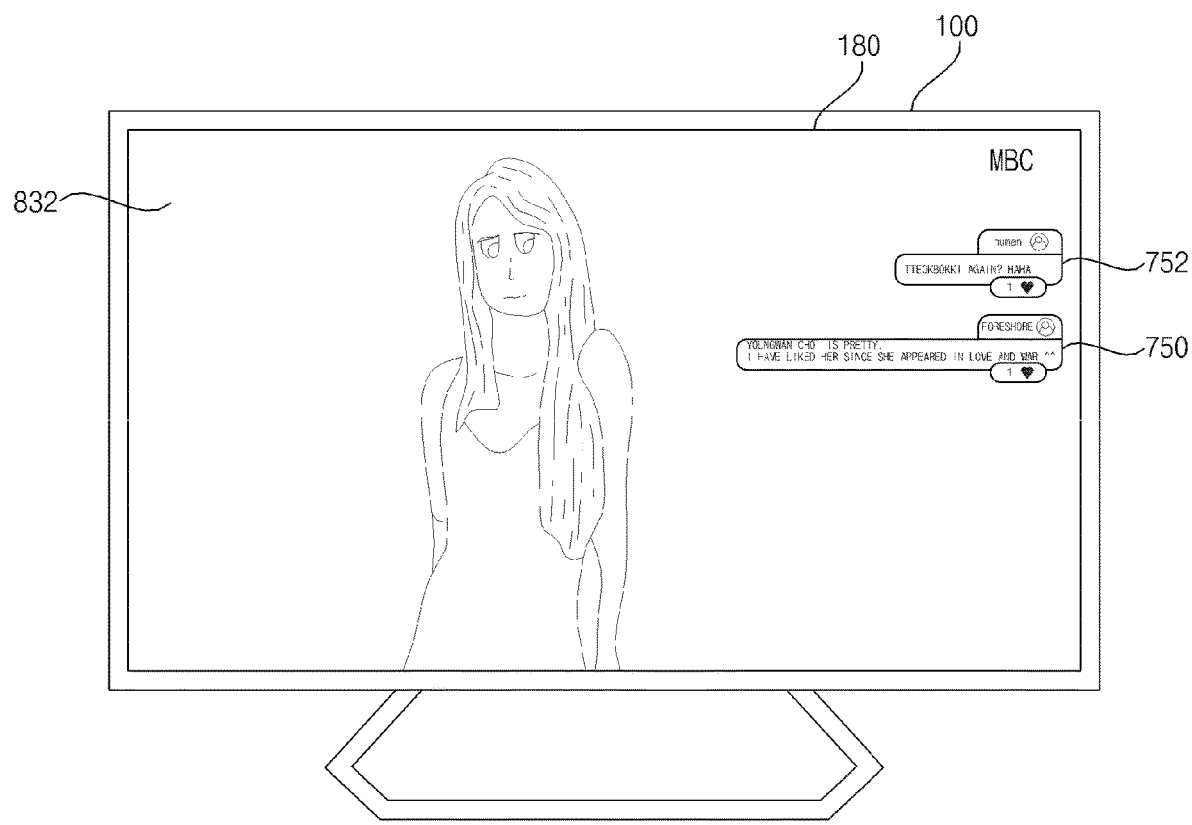
Figure 11C:
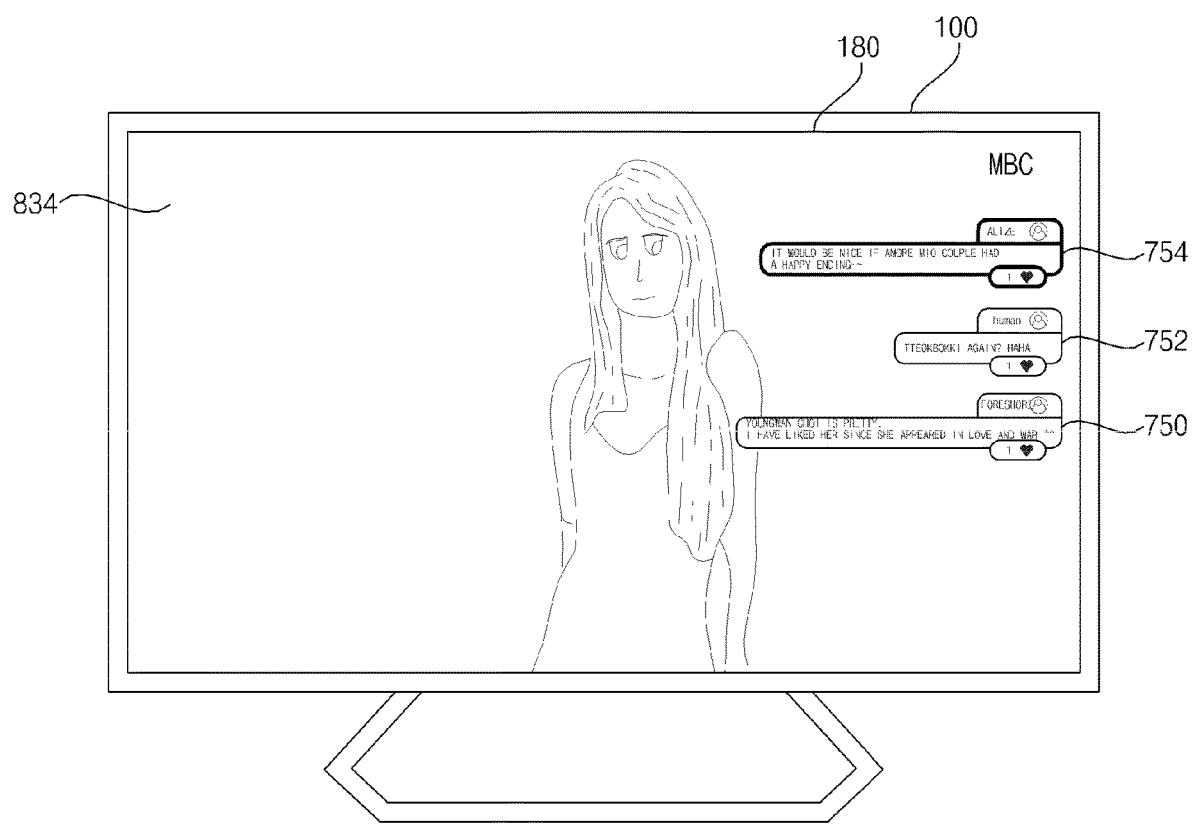

FIG. 11A illustrates that the broadcast image 830 of the second channel (e.g., MBC) and the chatting conversation content 750 are overlaid and displayed at the first time point, and FIG. 11B illustrates that the broadcast image 832 of the second channel and the chatting conversation contents 750 and 752 are overlaid and displayed at the second time point after the first time point, and FIG. 11C illustrates that the broadcast image 834 of the second channel and the chatting conversation contents 750, 752, and 754 are overlaid and displayed at a third time point after the second time point.

Referring to FIGS. 11A to 11C, the chatting conversation content 750 can correspond to the conversation content input based on the first ID, the second chatting conversation content 752 can correspond to the conversation content input based on the second ID, and the third chatting conversation content 754 can correspond to the conversation content input based on the ID of the image display apparatus 100.

In response to input of the conversation content based on the signal from the remote controller 200, the signal processing device 170 can be configured to transmit the conversation content input to the server 500, and highlight and display the input conversation content in the chatting window.

FIG. 11C illustrates that the third chatting conversation content 754 is highlighted in a different size from the other conversation content 750 and 752. Accordingly, it is possible to input or display conversation content while displaying the broadcast image and the chatting conversation content together. For example, the most recent conversation content can be emphasized or highlighted, and/or conversation content personally submitted by the user of image display apparatus 100 can be emphasized or highlighted. Also, according to an embodiment, any conversation content personally submitted by the user of image display apparatus 100 can remain emphasized or highlighted (e.g., to help the user see his or her own comments in the group discussion).

Figure 12A:
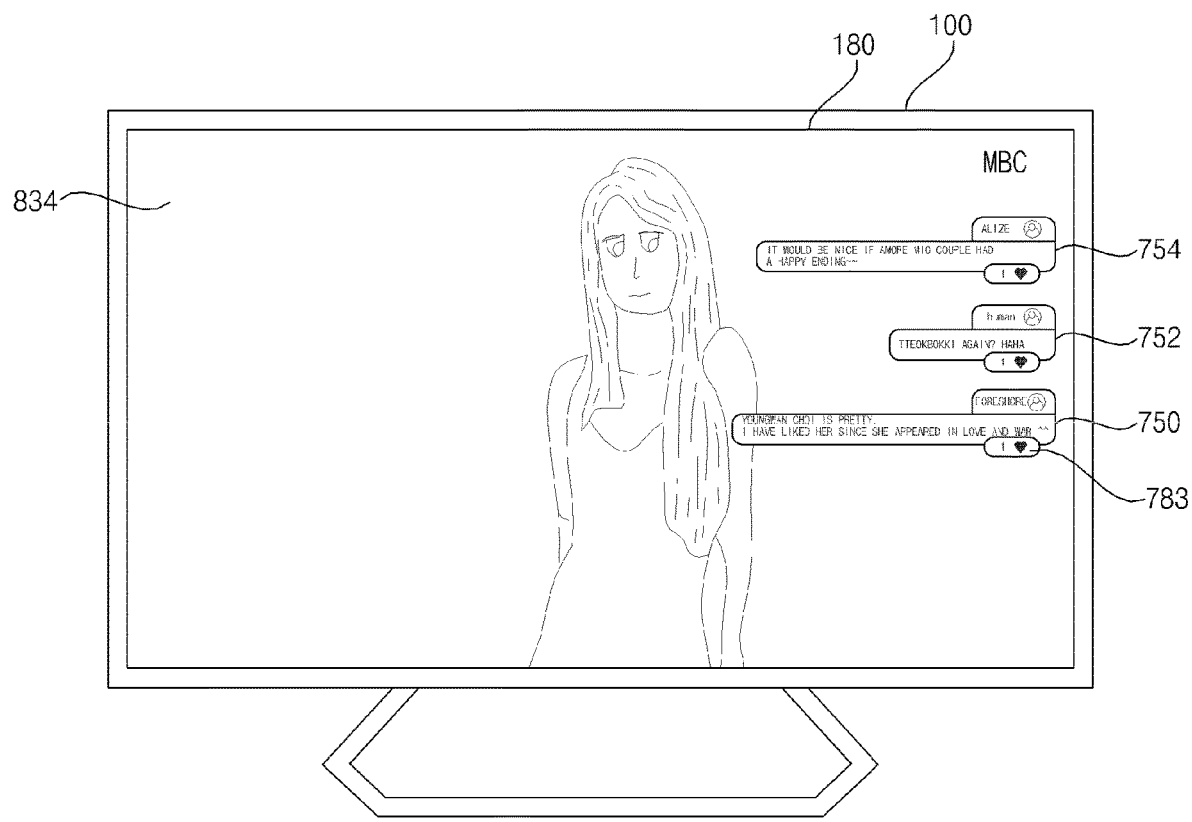
Figure 12B:
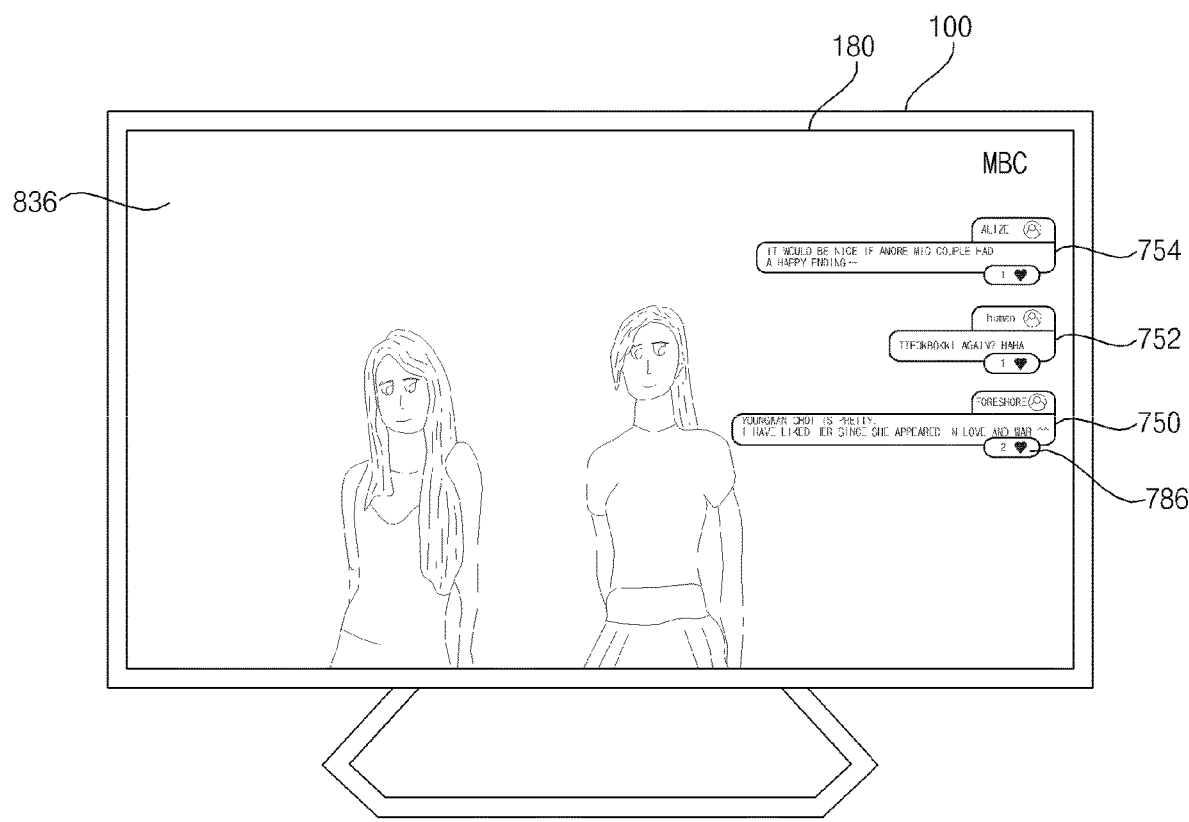

FIG. 12A illustrates that the broadcast image 834 and chatting conversation content 750, 752, and 754 are overlaid and displayed, and FIG. 12B illustrates that preference or recommendation number information 786 of the first chatting conversation content 750 increases (e.g., a comment receiving more "likes" or "favorites").

Referring to the drawings, a preference item or the recommendation item 783 for the first chatting conversation content 750 among the plurality of chatting conversation contents 750, 752, and 754 displayed based on the signal from the remote controller 200 is selected, the signal processing device 170 can be configured to transmit the preference or recommendation information for the first chatting conversation content 750 to the server 500, and as illustrated in FIG. 12B, can be configured to display the increased number of preferences or recommendations for the first chatting conversation content 750 (e.g., one heart increased to two hearts).

In FIG. 12A, in a state where the preference or recommendation number information 783 of the first chatting conversation content 750 is displayed as "1", when the preference item or recommendation item 783 for the first chatting conversation content 750 is selected, the signal processing device 170 can be configured to display the preference or recommendation number information 786 of the first chatting conversation content 750 increases to "2" and, as illustrated in FIG. 12B. Accordingly, it is possible to provide the number of preferences or recommendations while performing the preferences or recommendations for the chatting conversation content based on other IDs.

Figure 13A:
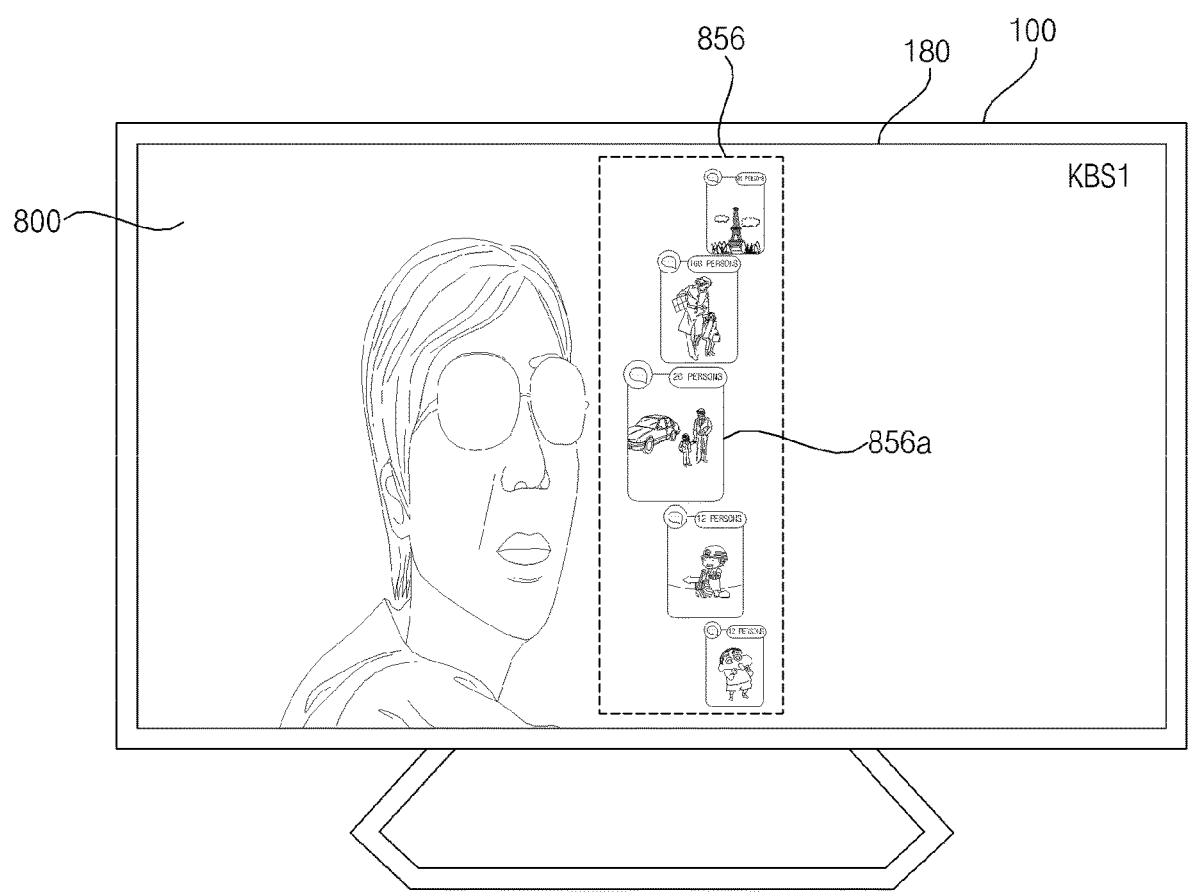

FIG. 13A illustrates that the broadcast image 800 and the plurality of broadcast channel thumbnails 856 aligned in the vertical direction are displayed together.

Referring to the drawing, based on a signal from the remote controller 200, as illustrated in FIG. 13A, the signal processing device 170 can be configured to display the broadcast image 800 of the first channel and the plurality of broadcast channel thumbnails 856 aligned in the vertical direction together.

The plurality of broadcast channel thumbnails 856 are aligned in the vertical direction, and one of the thumbnails can be focused on and displayed in the largest size.

Some of the plurality of broadcast channel thumbnails 856 can include the broadcast video image, the object representing the chatting window, and information on the number of viewers.

Figure 13B:
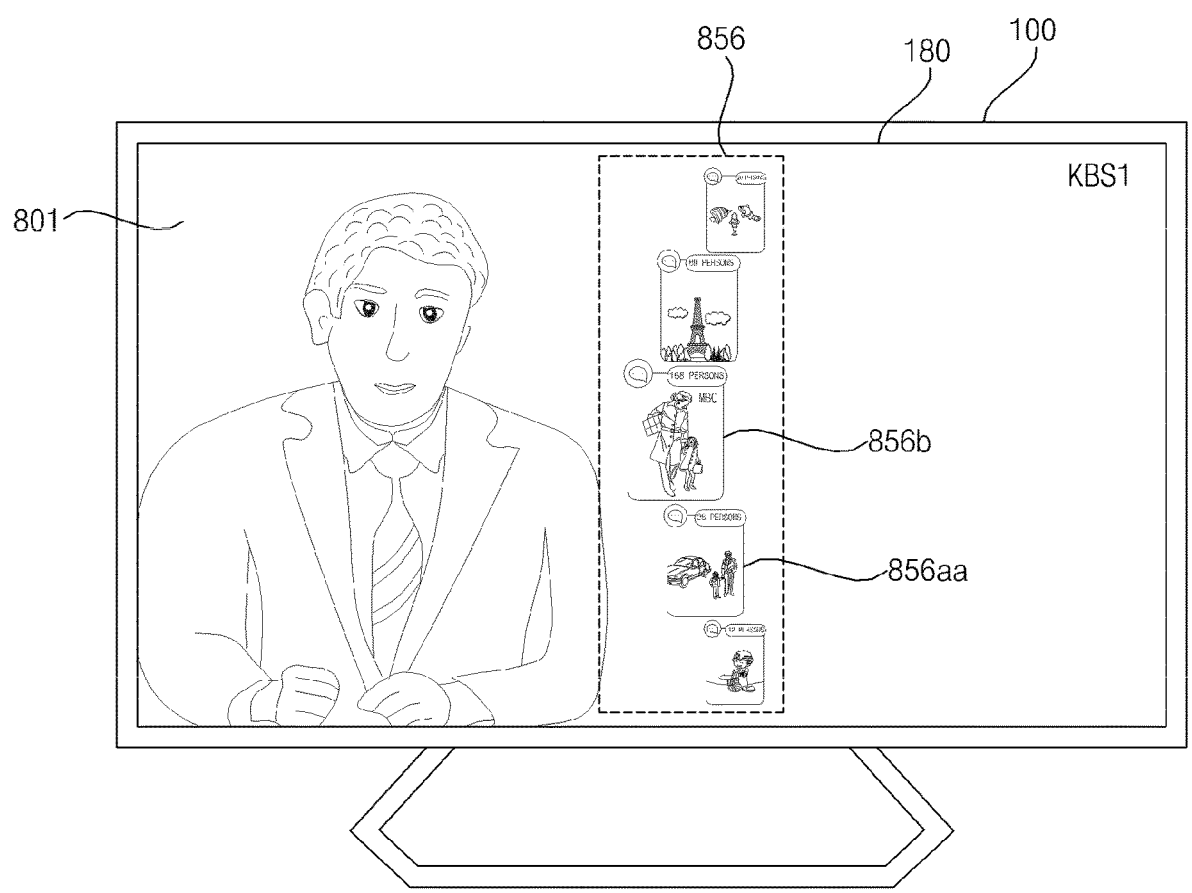

In a state in which a first thumbnail 856a of the plurality of broadcast channel thumbnails 856 is focused on, when an up or down key of the remote controller 200 operates, the signal processing device 170 can be configured to, based on the signal from the remote controller 200, as illustrated in FIG. 13B, move the first thumbnail 856a downward, move the second thumbnail 856b to a central area, and focus and display the first and the second thumbnails (e.g., the thumbnail can be scrolled through in a circular manner or repeating order).

Meanwhile, when a channel up or channel down signal from the remote controller 200 is received in a state where the first thumbnail 856a of the plurality of broadcast channel thumbnails 856 is focused, the focusing can be controlled to be moved to the second thumbnail 856b disposed above or below the first thumbnail 856a.

Based on the signal from the remote controller 200, as illustrated in FIG. 13A, when the second thumbnail 856b corresponding to the second channel among the plurality of broadcast channel thumbnails 856 is focused on in a state where the broadcast image 800 of the first channel and the plurality of broadcast channel thumbnails aligned in the vertical direction 856 are displayed, similar to FIG. 10A, the signal processing device 170 can be configured to display the chatting preview item 760 and display the chatting conversation content corresponding to the second channel on a preview screen when the chatting preview item 760 is selected.

When the first thumbnail 856a of the first channel among the plurality of broadcast channel thumbnails 856 is focused on, the signal processing device 170 can be configured to display the chatting conversation content corresponding to the first channel on a preview screen. Moreover, when the second thumbnail 856b of the second channel among the plurality of broadcast channel thumbnails 856 is focused on, the signal processing device 170 can be configured to display the chatting conversation content corresponding to the second channel on the preview screen. Accordingly, it is possible to conveniently provide the preview of the chatting conversation content according to the focusing movement.

Figure 13C:
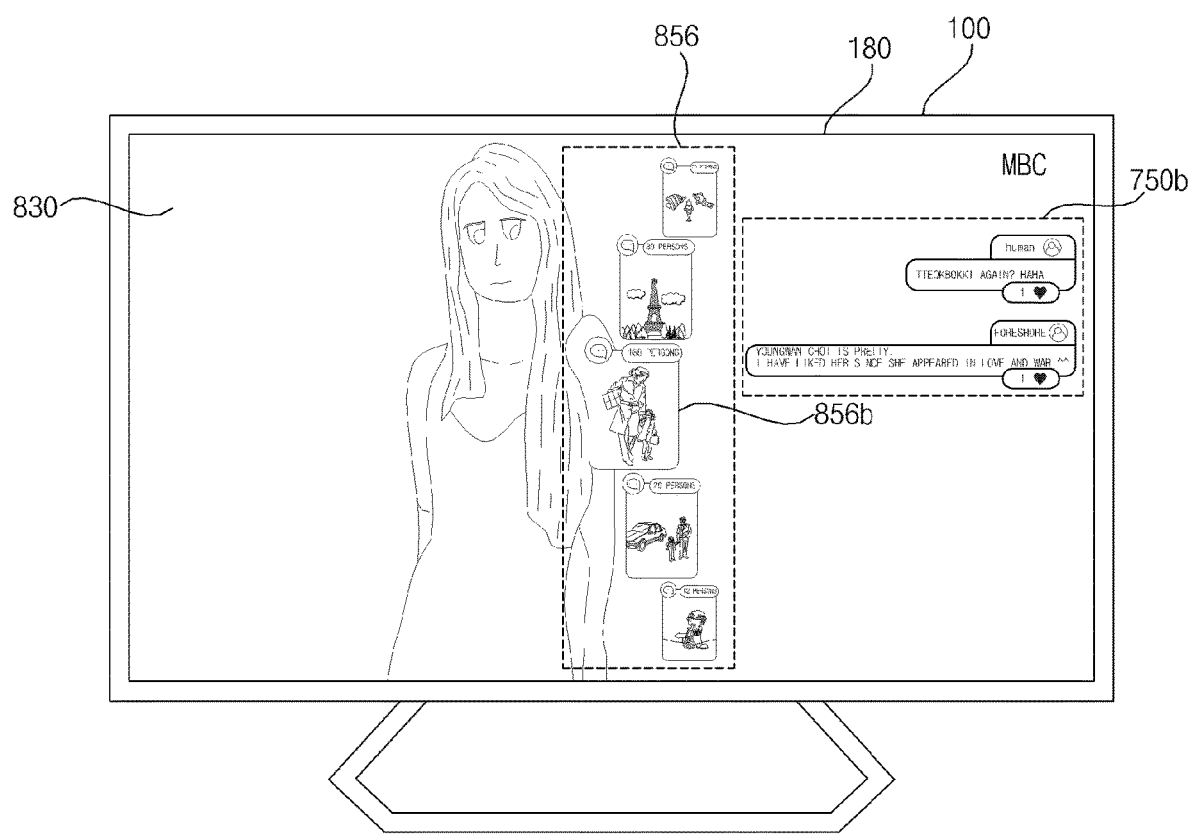

When the second thumbnail 856b corresponding to the second channel is selected from among the plurality of broadcast channel thumbnails 856 illustrated in FIG. 13B, the signal processing device 170 can be configured to display the broadcast image 830 of the second channel and the chatting conversation content 750b corresponding to the second channel, as illustrated in FIG. 13C (e.g., change channels from KBS1 to MBC).

The signal processing device 170 can be configured to display the plurality of broadcast channel thumbnails 856 together in addition to the broadcast image 830 of the second channel and the chatting conversation content 750b corresponding to the second channel, as illustrated in FIG. 13C.

The signal processing device 170 can be configured to display the indicator for the menu guide, based on the signal from the remote controller 200.

For example, when the pointer of the remote controller 200 moves to the right end of the display 180, the signal processing device 170 can be configured to display an indicator 905 for the hidden menu guide.

Figure 14A:
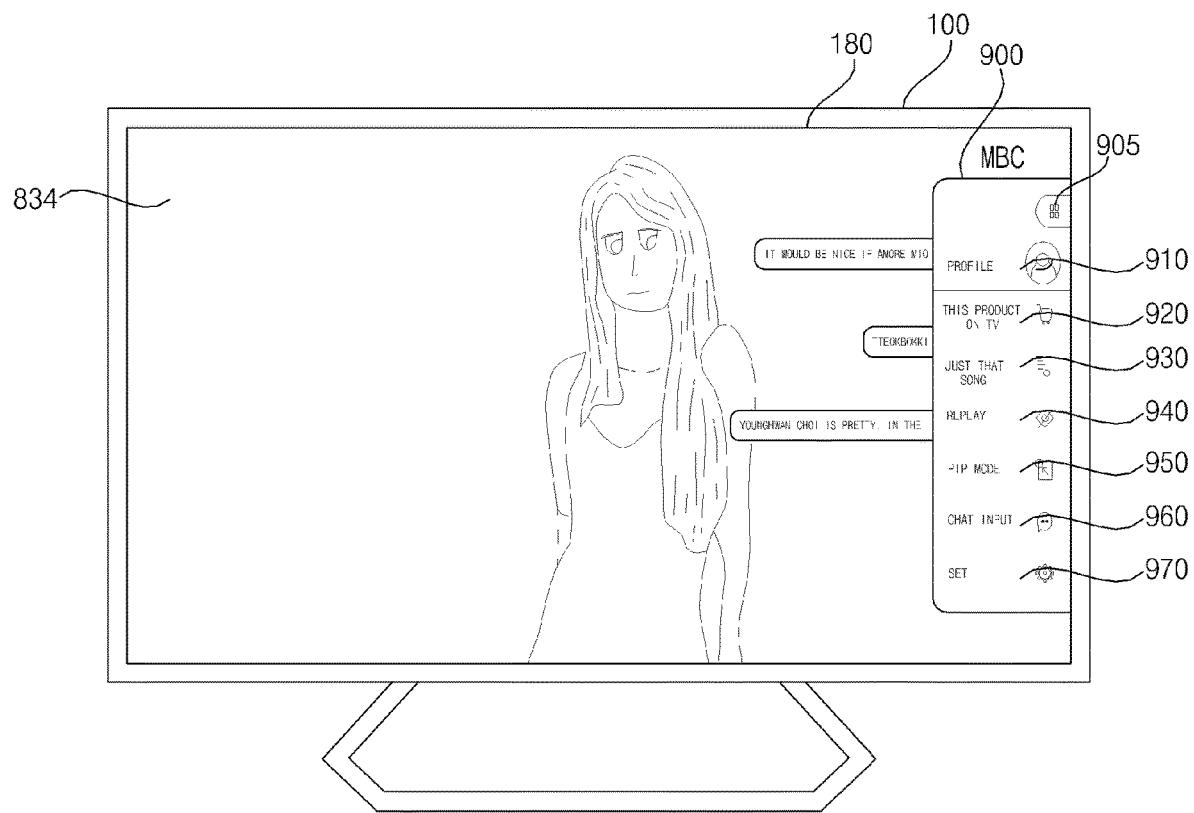

When the indicator 905 for the menu guide is focused on or selected based on the signal from the remote controller 200, the signal processing device 170 can be configured to display the menu 900 including a chatting input item 960, as illustrated in FIG. 14A.

FIG. 14A illustrates that the menu 900 including a chatting input item 960 is displayed in a state in which the broadcast image 834 and the chatting conversation content are displayed.

Referring to the drawing, the menu 900 includes a profile item 910, a product item 920, a music item 930, a replay item 940, a PIP item 950, a chatting input item 960, and a setting item 970.

Figure 14B:
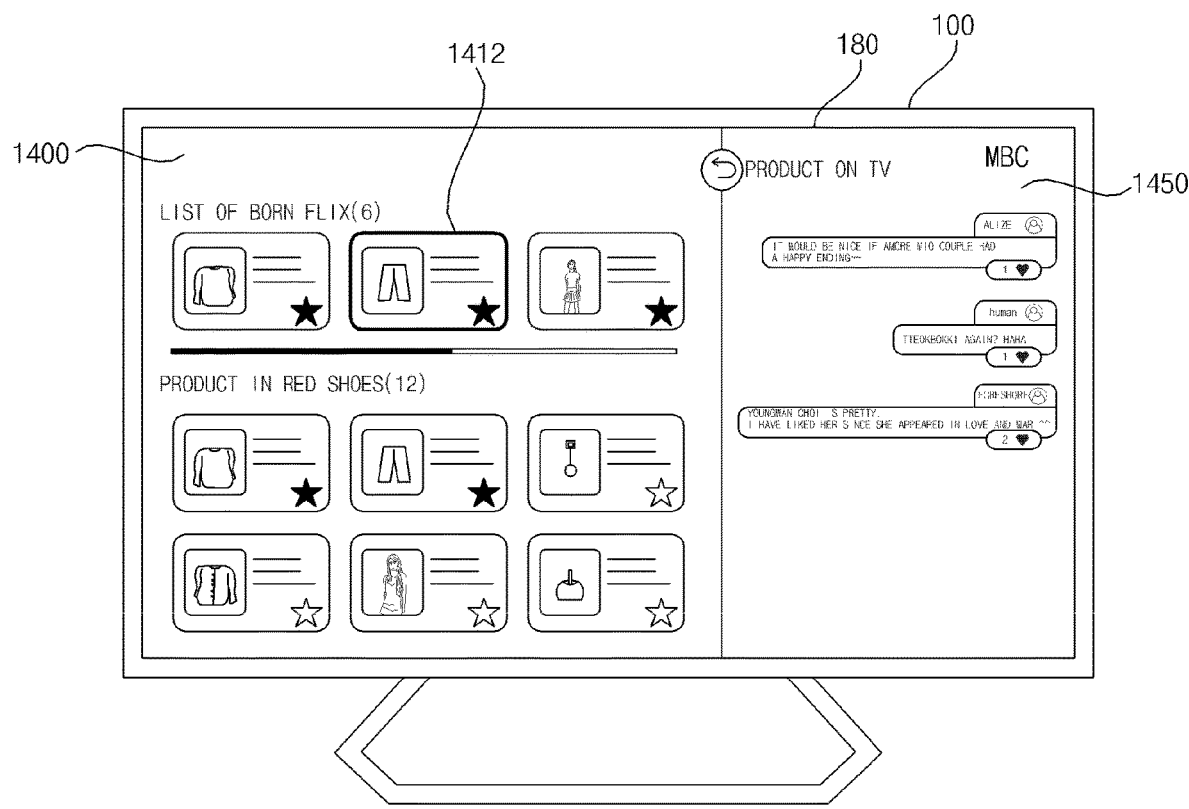

When the product item 920 in the menu 900 is selected based on the signal from the remote controller 200, the signal processing device 170 can be configured to display a product list screen 1400 including product items related to the broadcast image, as illustrated in FIG. 14B.

In this situation, the signal processing device 170 can be configured to display the product list screen 1400 is displayed instead of the broadcast image 834 and the chatting conversation content 1450 as it is. Accordingly, the product items related to the broadcast images can be provided.

Figure 14C:
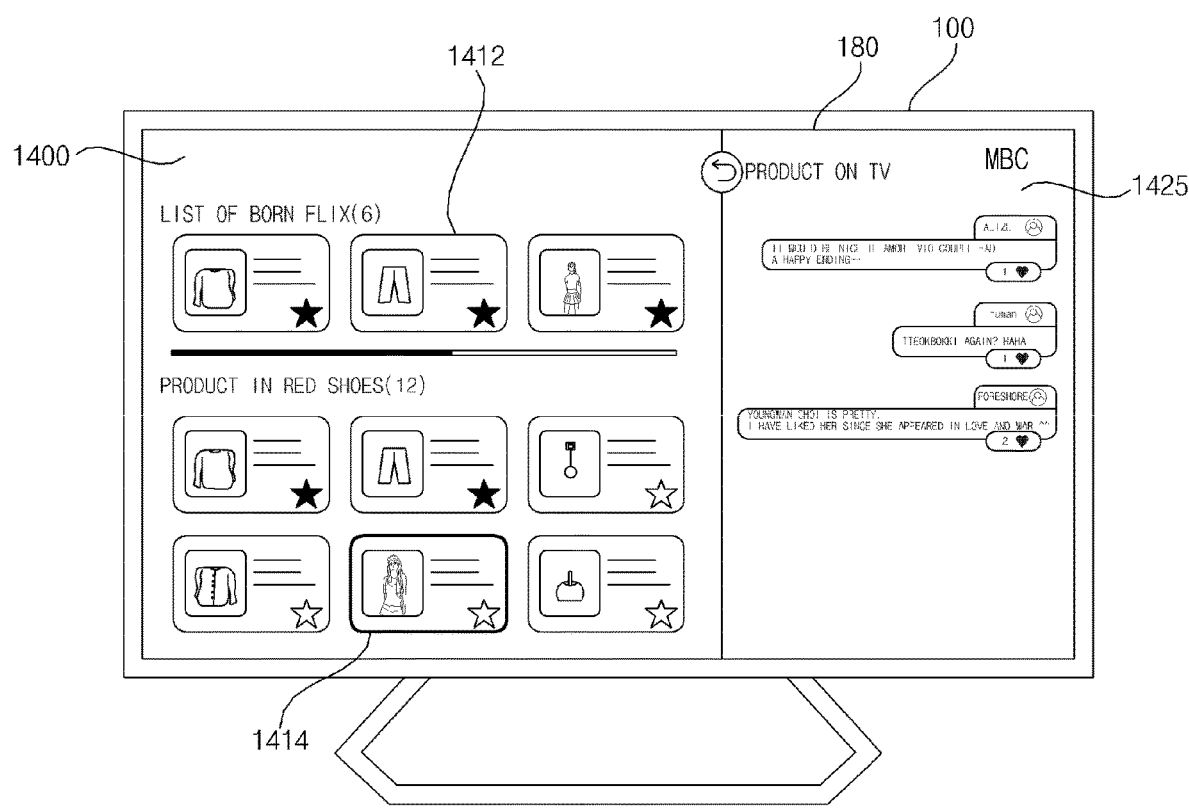

FIG. 14C illustrates that a first product item 1414 in the product list screen 1400 is focused on or selected. For example, an item can be focused on by the user by hovering the pointer of the remote controller over the item and/or based on a button press or input on the remote controller.

Referring to the drawing, the signal processing device 170 can be configured to focus on the first product item 1414 among the plurality of product items in the product list screen 1400, based on the signal from the remote controller 200.

When the first product item 1414 is focused on or selected among the plurality of product items, the signal processing device 170 can be configured to display a screen related to purchase of the first product item 1414.

Figure 15A:
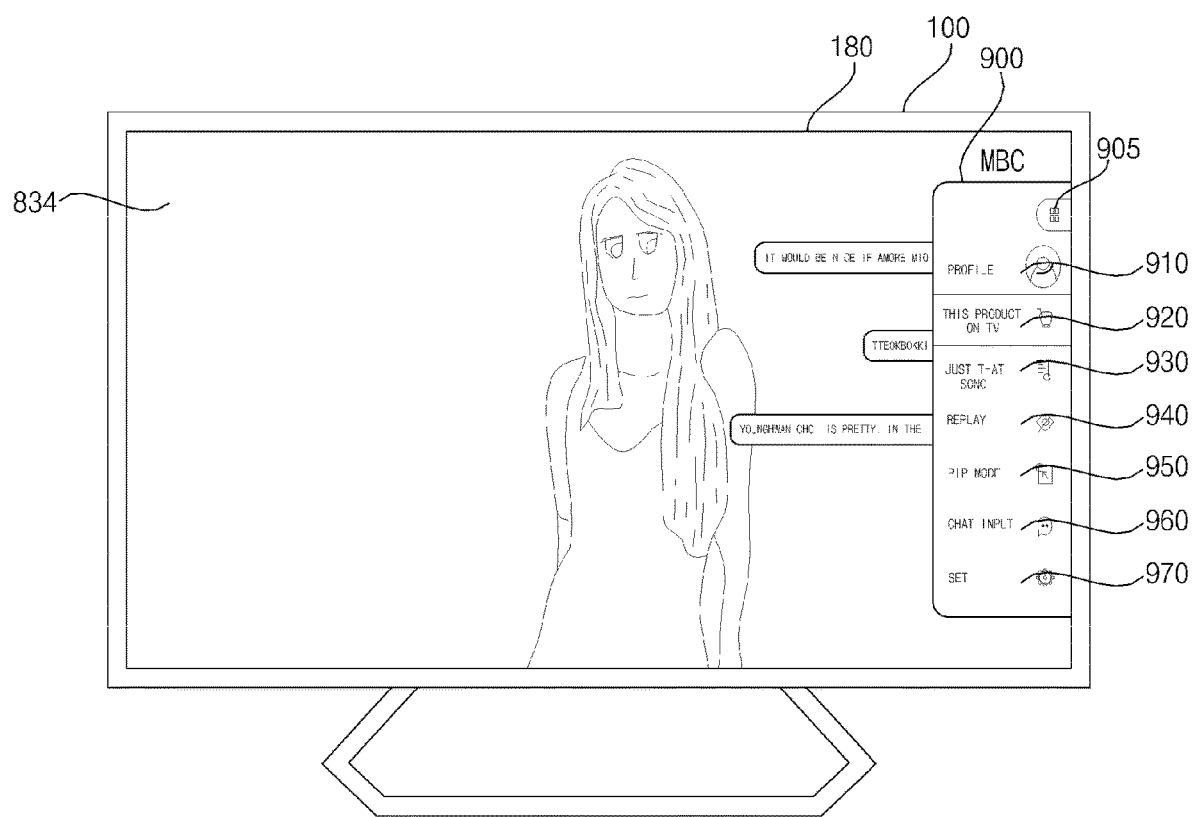

FIG. 15A illustrates that the menu 900 including the plurality of items is displayed in a state in which the broadcast image 834 and the chatting conversation content are displayed.

Figure 15B:
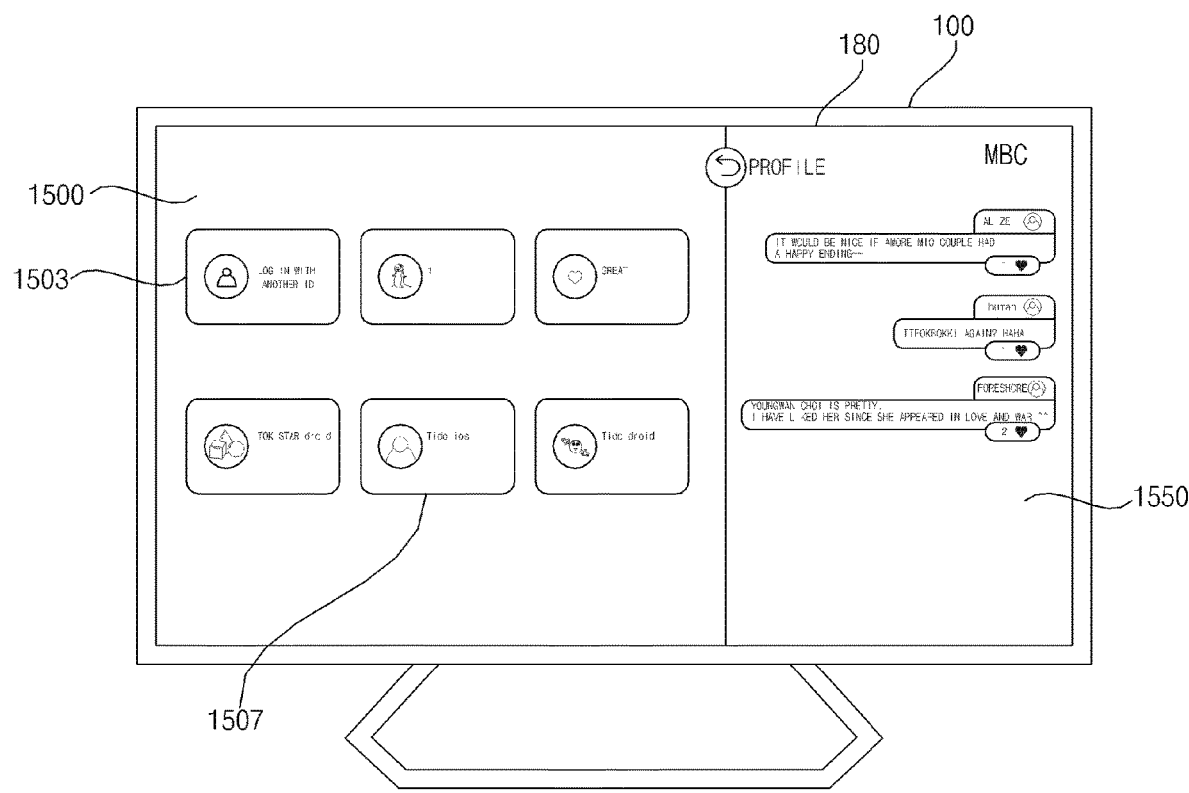

When the profile item 910 in the menu 900 is selected based on the signal from the remote controller 200, the signal processing device 170 can be configured to set an ID for setting a profile or display a profile screen 1500 including the ID information, as illustrated in FIG. 15B.

The profile screen 1500 of FIG. 15B can include a plurality of pieces of ID information 1503 and 1507. For example, different profiles can be provided for different users (e.g., family members) for login, in order to carry out a chat conversation under that specific profile.

In this situation, the signal processing device 170 can be configured to display the profile screen 1500 instead of displaying the broadcast image 834 and the chatting conversation content 1550 as it is.

Figure 16A:
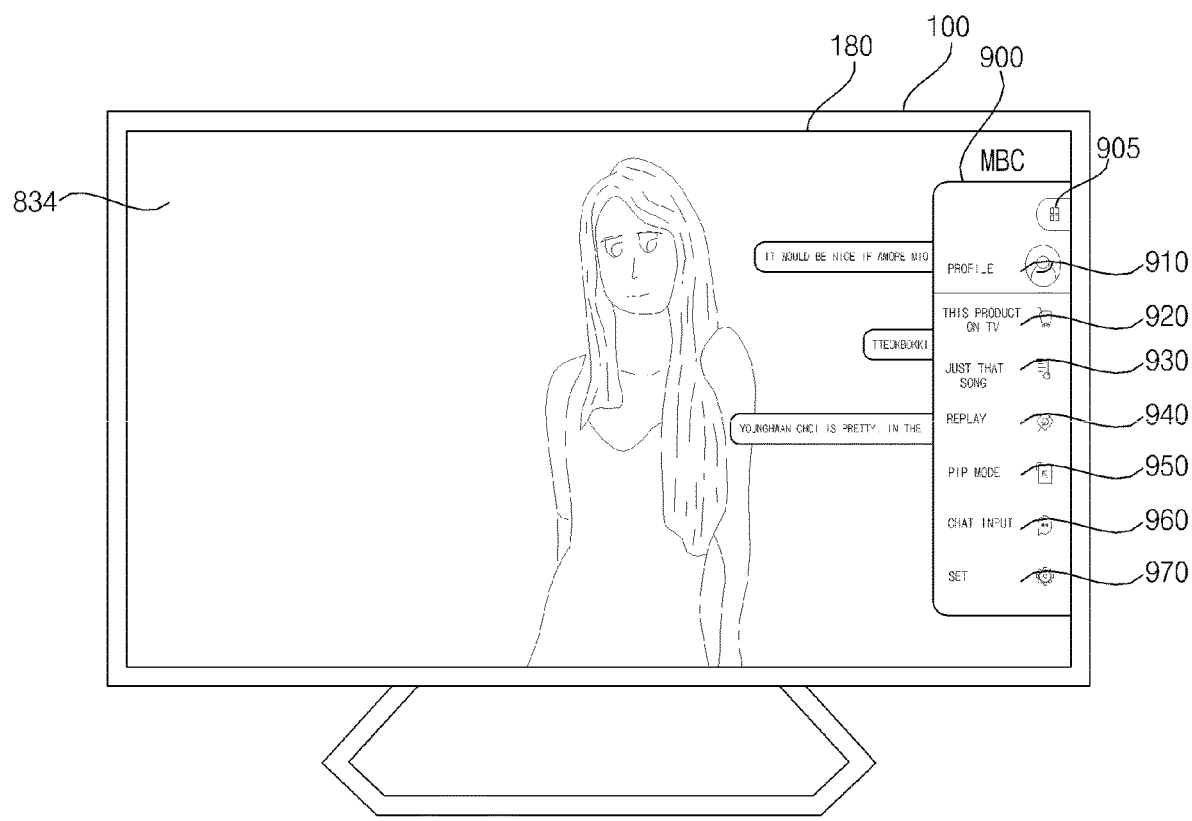

FIG. 16A illustrates that the menu 900 including the plurality of items is displayed in a state in which the broadcast image 834 and the chatting conversation content are displayed.

Figure 16B:
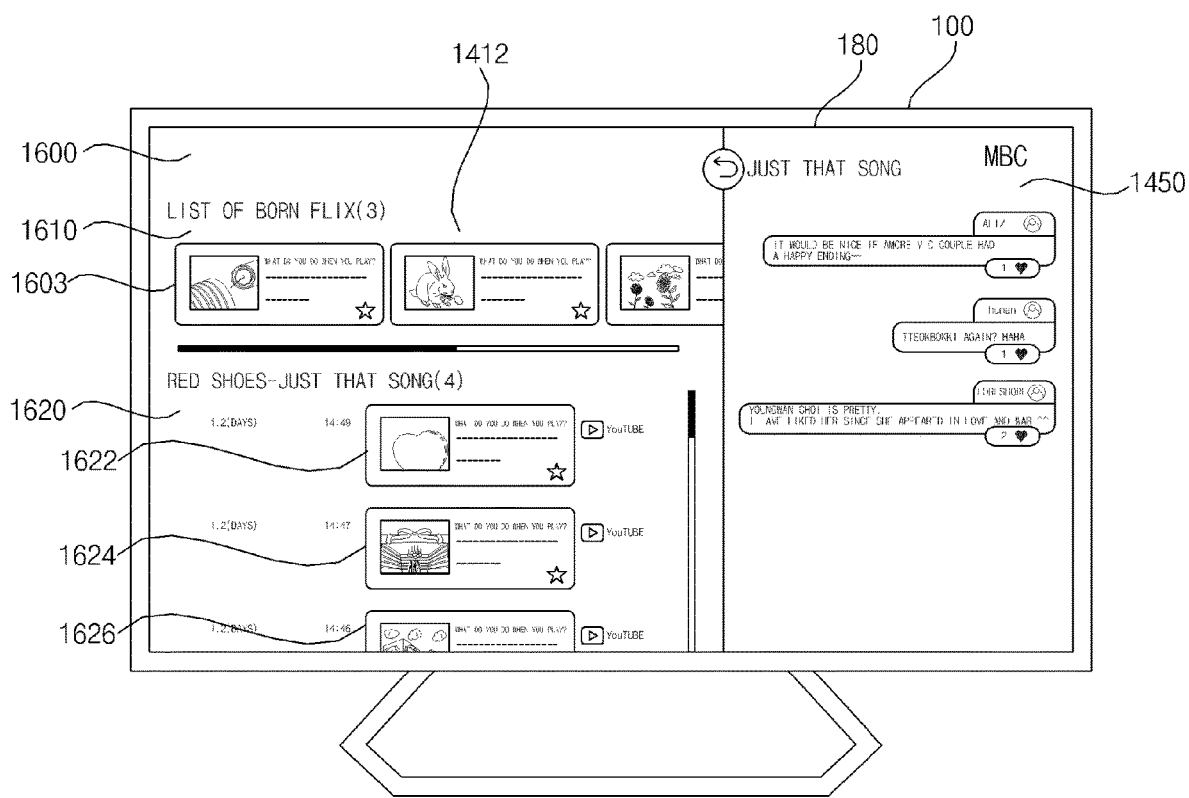

When the music item 930 in the menu 900 is selected based on the signal from the remote controller 200, the signal processing device 170 can be configured to display a music list screen 1600 including the music list related to the broadcast image 834, as illustrated in FIG. 16B.

The music list screen 1600 of FIG. 16B can include a first list 1620 including a plurality of music items or music listings 1622, 1624, and 1626 related to the broadcast image 834, and a second list 1610 including a previous music list 1610.

At this time, the signal processing device 170 can be configured to display the music list screen 1600 instead of displaying the broadcast image 834 and the chatting conversation content 1450 as it is.

Figure 16C:
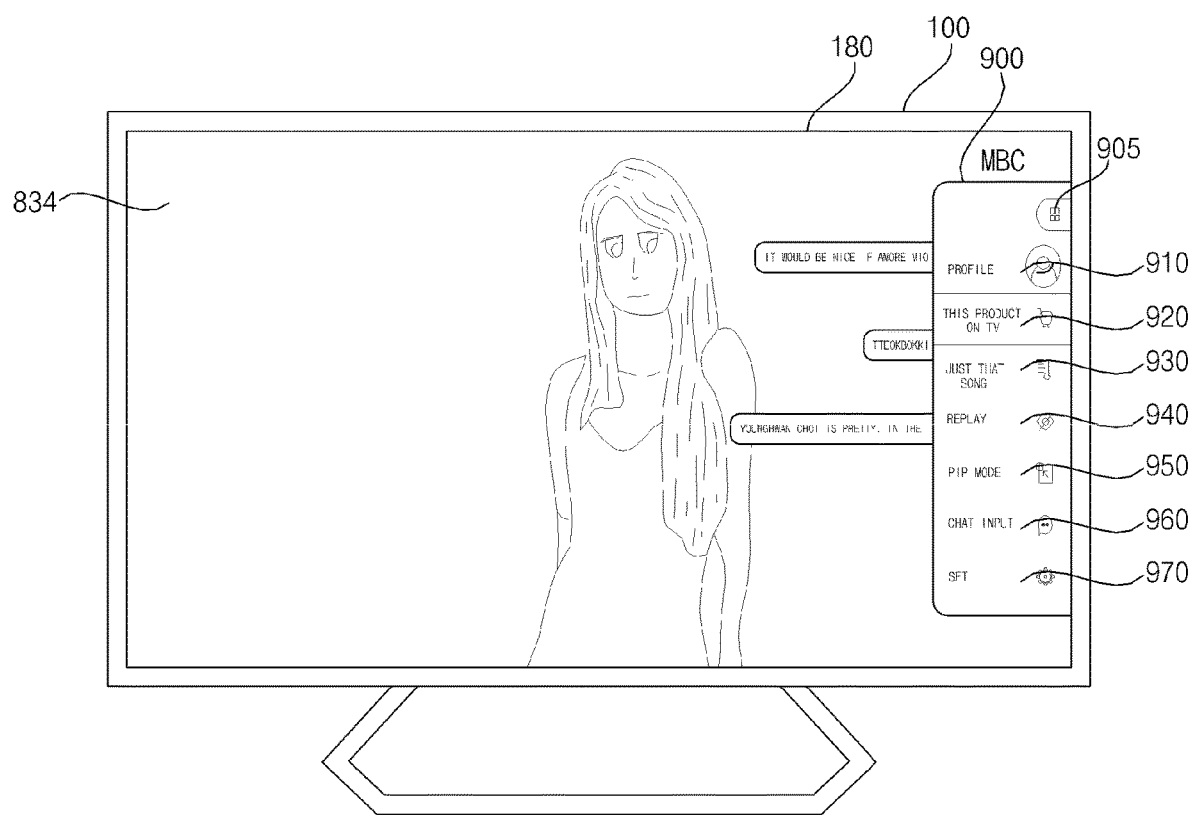

FIG. 16C illustrates that the menu 900 including a plurality of items is displayed in a state in which broadcast image 834 and the chatting conversation content are displayed.

Figure 16D:
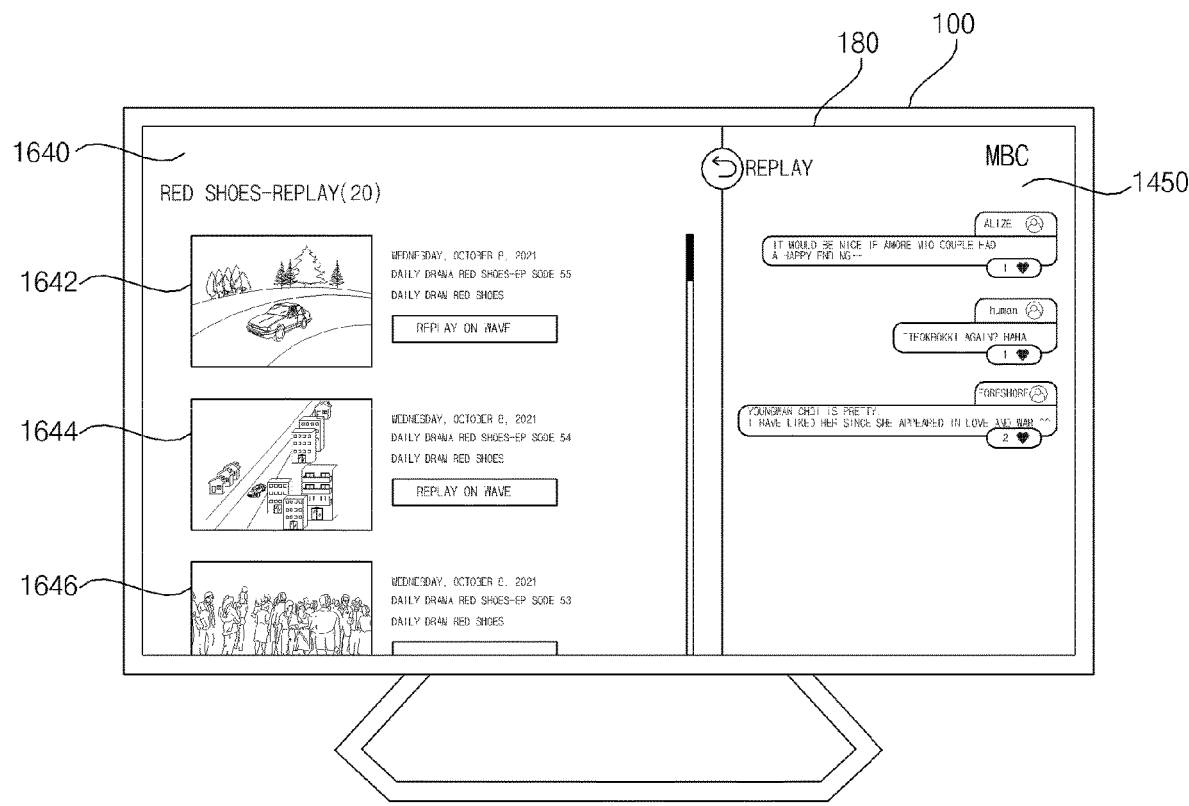

When the replay item 940 in the menu 900 is selected based on the signal from the remote controller 200, the signal processing device 170 can be configured to display a replay list screen 1640 including a replay list related to the broadcast image 834, as illustrated in FIG. 16D.

The replay list screen 1640 of FIG. 16D can include the broadcast image 834 and replay lists 1642, 1644, and 1646 of different times.

At this time, the signal processing device 170 can be configured to display the replay list screen 1640 instead of displaying the broadcast image 834 and the chatting conversation content 1450 as it is.

Figure 17A:
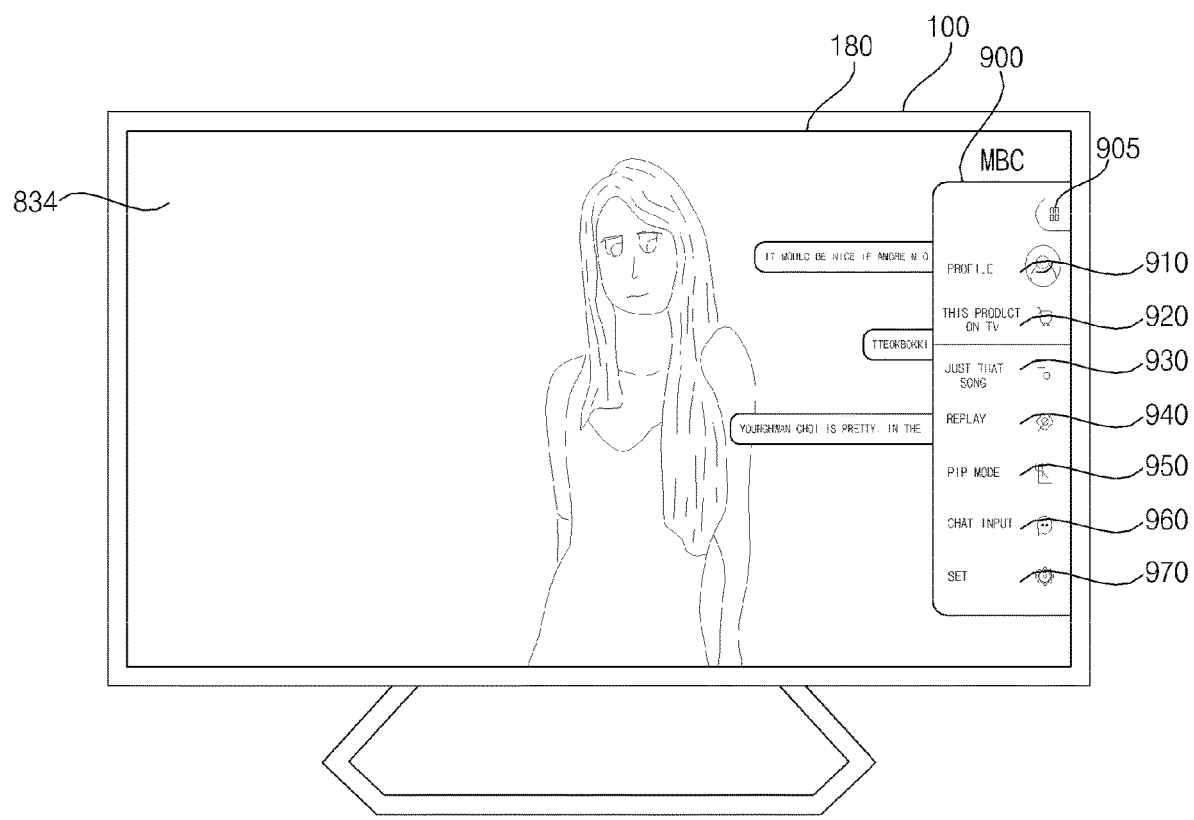

FIG. 17A illustrates that the menu 900 including a plurality of items is displayed in a state in which the broadcast image 834 and the chatting conversation content are displayed.

Figure 17B:
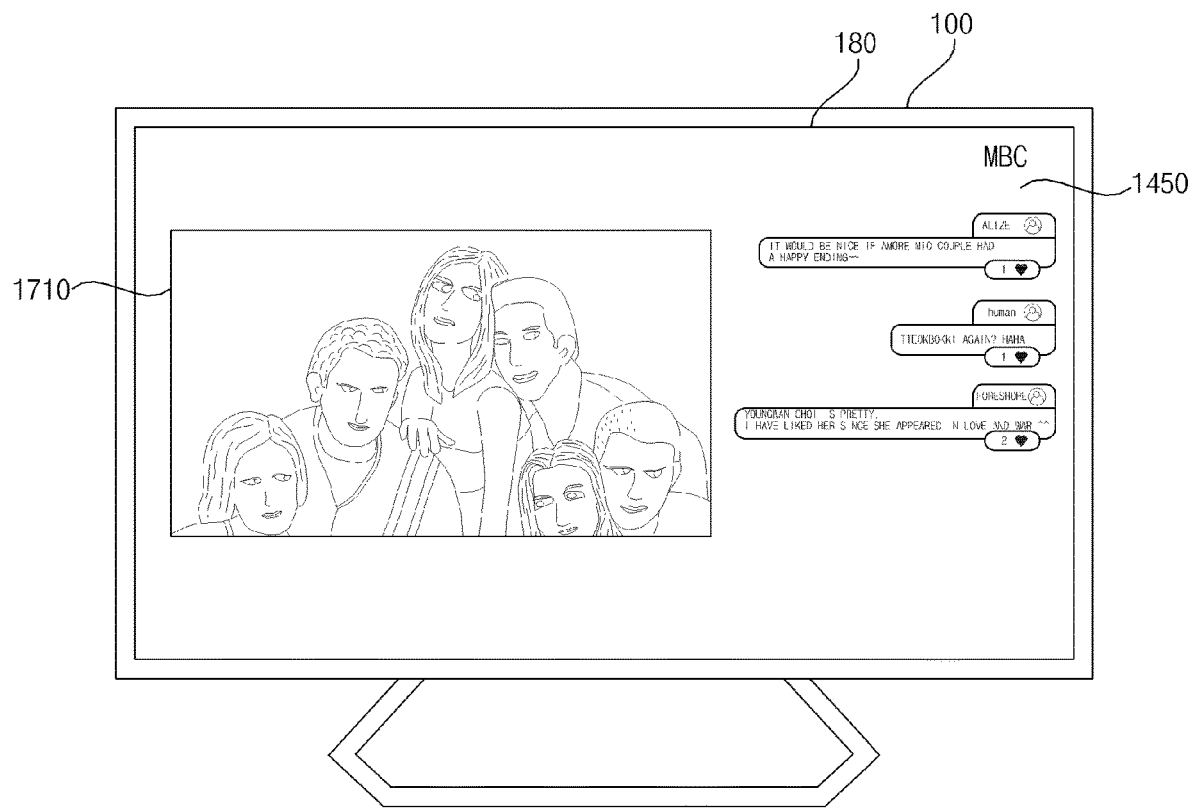

When the PIP item 950 in the menu 900 is selected based on the signal from the remote controller 200, as illustrated in FIG. 17B, the signal processing device 170 can be configured to separate the chatting conversation content 1450 displayed on the broadcast image 834 based on the PIP input, and display the chatting conversation content 1450 on the first area at a distant from the broadcast image. Accordingly, the visibility of the chatting conversation content 1450 can be improved.

Specifically, as the screen size of the broadcast image 834 decreases based on the selection of the PIP item 950, the size-reduced broadcast image 1710 separates from the chatting conversation content 1450, and the signal processing device 170 can be configured to display the broadcast image 1710 at a distance away from the chatting conversation content 1450.

Figure 17C:
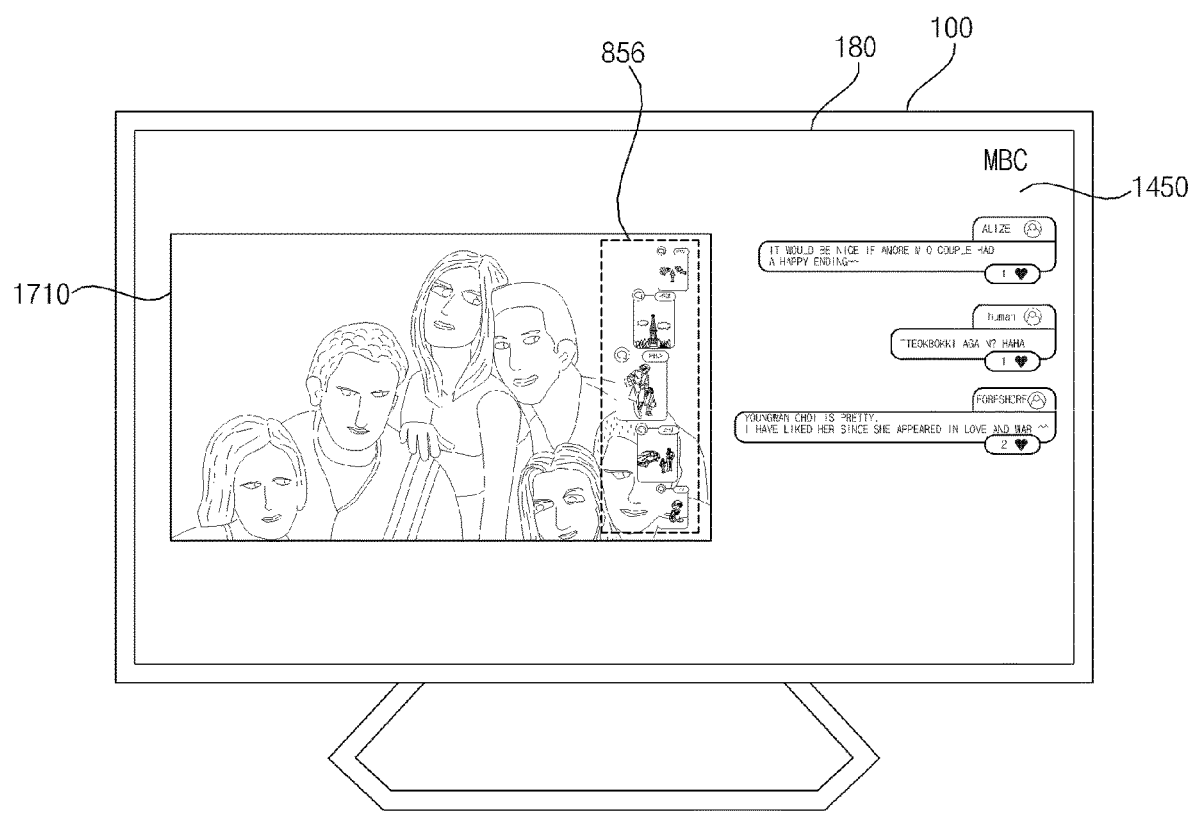

FIG. 17C illustrates that the broadcast image 1710 and the chatting conversation content 1450 are displayed in the PIP mode, but unlike FIG. 17B, the plurality of thumbnails 856 are arranged in the vertical direction within the broadcast image 1710.

Based on the selection of the PIP item 950, the signal processing device 170 can be configured to display the broadcast image 1710 including the plurality of thumbnails 856 at a distance from the chatting conversation content 1450. Accordingly, the visibility of the chatting conversation content 1450 can be improved.

In a state in which the broadcast image 1710 including the plurality of thumbnails 856 is displayed at a distance away from the chatting conversation content 1450, when the first thumbnail is focused on based on the remote-control signal, the signal processing device 170 can be configured to display the chatting conversation content of the channel corresponding to the first thumbnail on the first area. Accordingly, it is possible to conveniently provide chatting conversation content of another channel. For example, a user can maintain a current chatting conversation while channel surfing or switching between different broadcast images or channels.

Figure 18A:
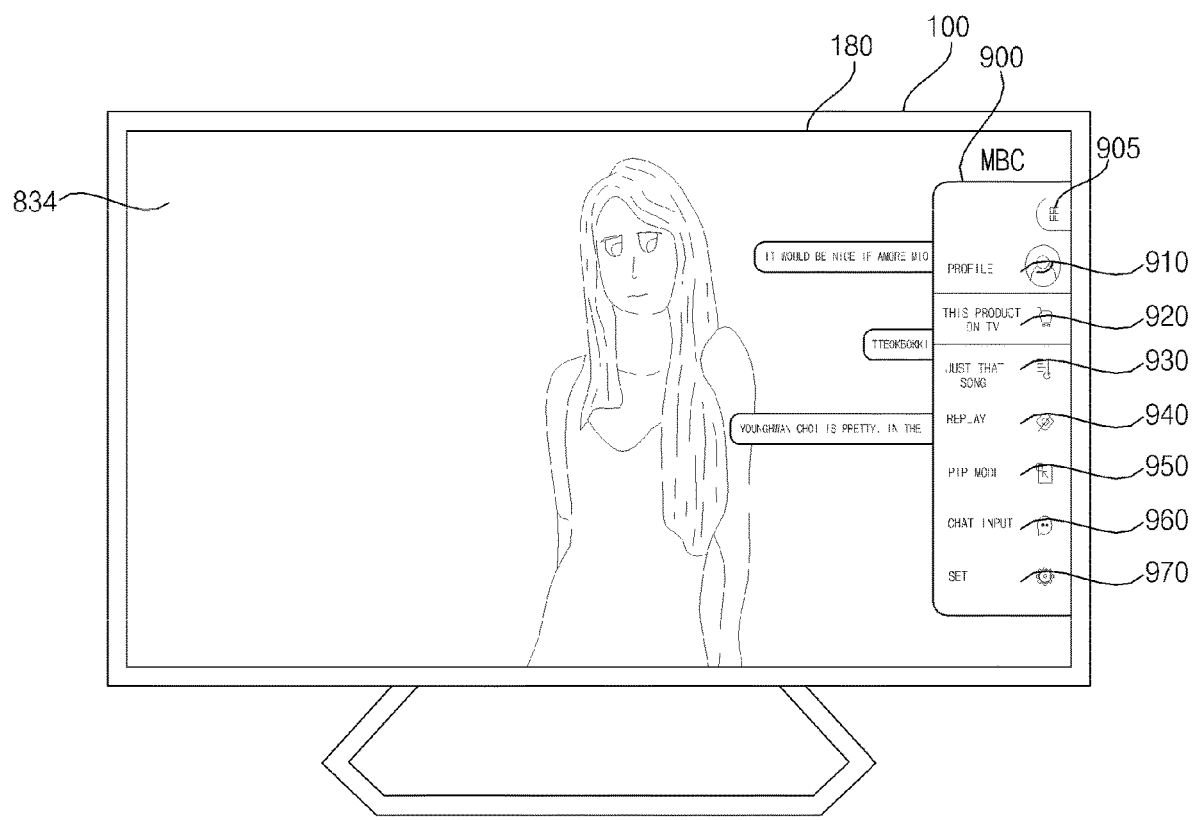

FIG. 18A illustrates that the menu 900 including the plurality of items is displayed in a state in which the broadcast image 834 and the chatting conversation content are displayed.

Figure 18B:
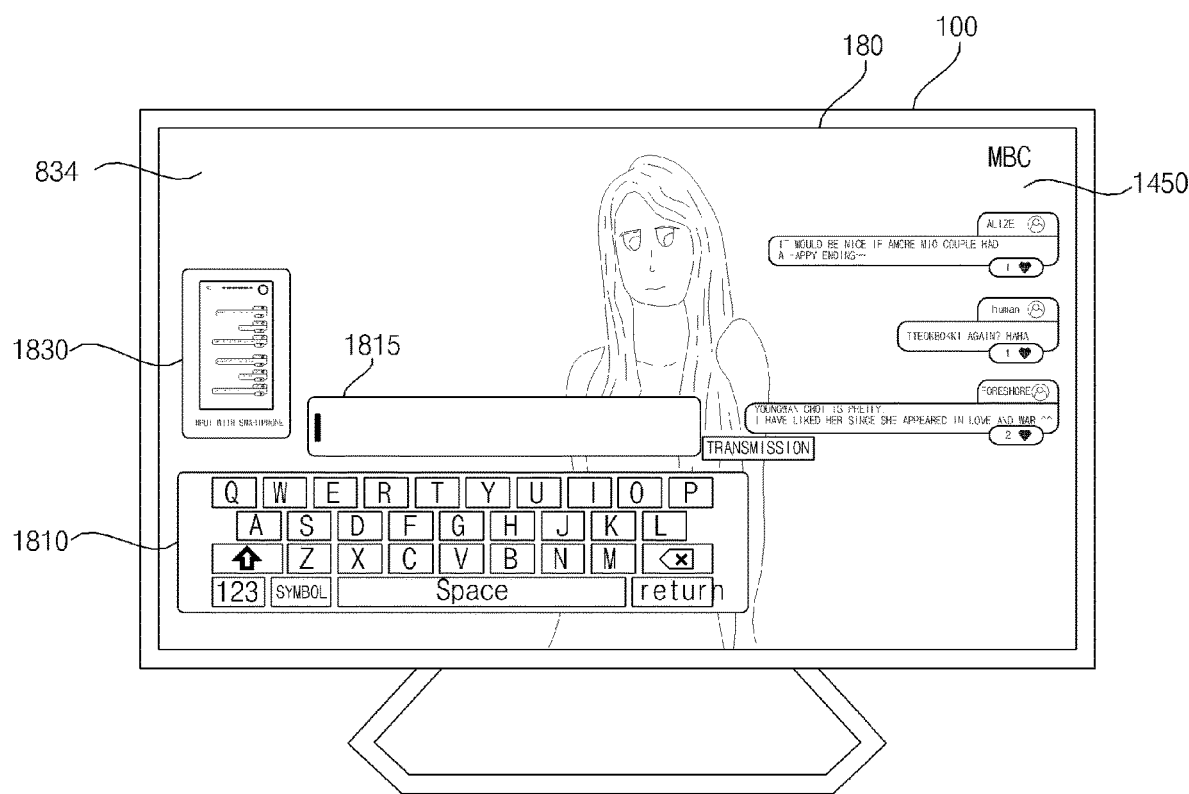

When the chatting input item 960 in the menu 900 is selected based on the signal from the remote controller 200, the signal processing device 170 can be configured to display a keyboard display window 1810 and a text input window 1815, as illustrated in FIG. 18B.

When a text in the keyboard display window 1810 is selected based on the signal from the remote controller 200, the signal processing device 170 can be configured to display the selected text on the text input window 1815.

Then, when a transmission item for transmission of the text input in the text input window 1815 is selected, the signal processing device 170 can be configured to transmit the input text to the server 500 and display input text transmitted to the server 500 as the conversation content in the chatting window. Accordingly, in response to input of the conversation content based on a signal from the remote controller 200, the conversation content can be easily input or displayed.

When the chatting input item 960 in the menu 900 is selected based on the signal from the remote controller 200, the signal processing device 170 can be configured to further display a mobile terminal input item 1830 in addition to the keyboard display window 1810 and the text input window 1815, as illustrated in FIG. 18B.

Figure 18C:
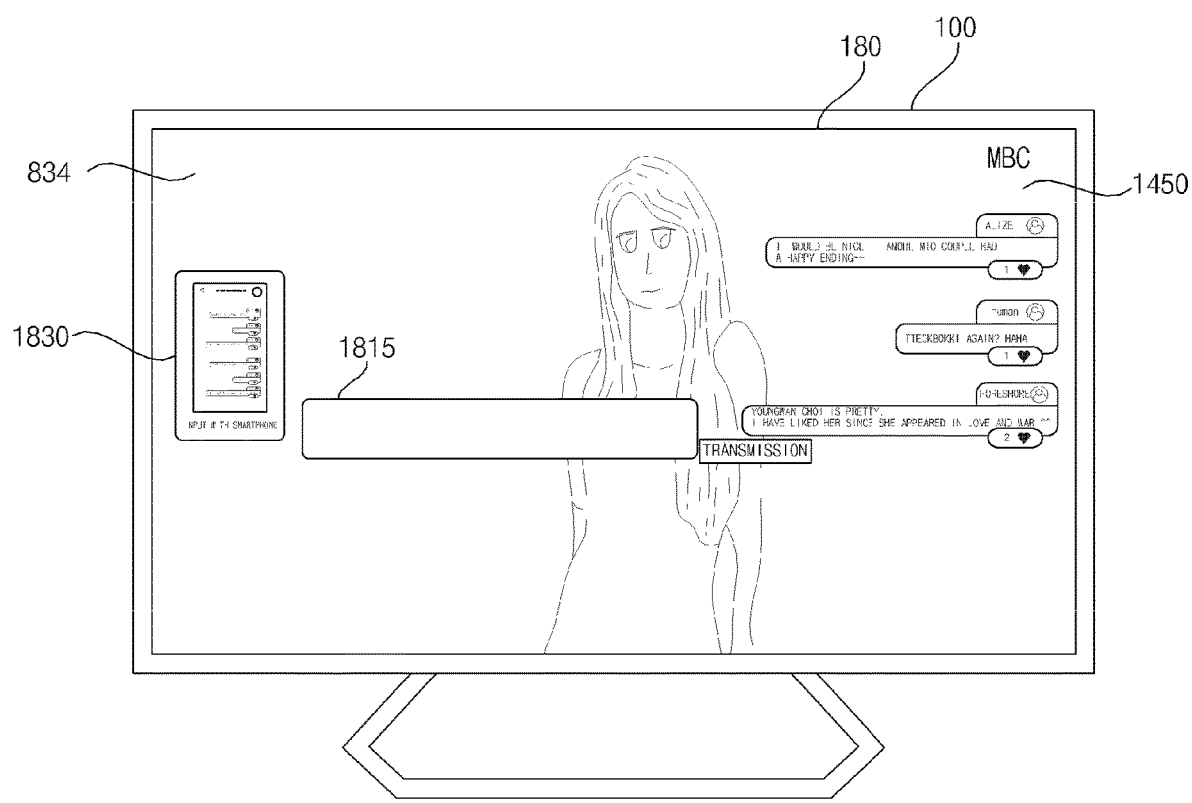

FIG. 18C illustrates that the keyboard display window 1810 disappears when the mobile terminal input item 1830 is focused or selected by the remote controller 200.

As illustrated in FIG. 18B, when the mobile terminal input item 1830 is focused on or selected by the remote controller 200 in a state where the keyboard display window 1810, the text input window 1815, and the mobile terminal input item 1830 are displayed, the signal processing device 170 can be configured to remove keyboard display window 1810.

Figure 18D:
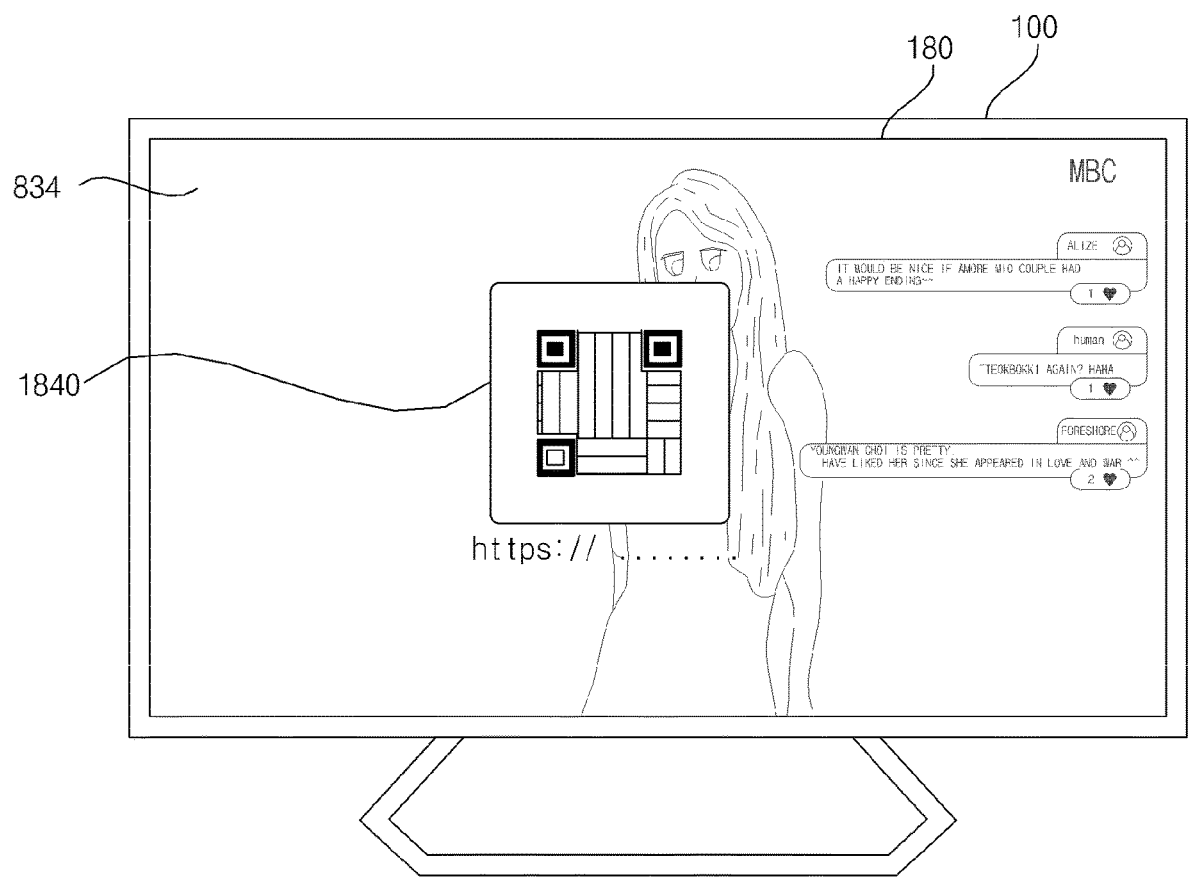

When the mobile terminal input item 1830 is focused on or selected by the remote controller 200, as illustrated in FIG. 18D, the signal processing device 170 can be configured to display a code image 1840 (e.g., a QR code) for installing a chatting application in the mobile terminal 600 or for pairing the mobile terminal 600 with image display apparatus 100. In this way, the user can use his or her smart phone for inputting text for the chat conversation displayed on the image display apparatus 100.

For example, when the mobile terminal input item 1830 is focused on or selected by the remote controller 200, the signal processing device 170 wirelessly accesses the preset mobile terminal 600 to check whether or not the chatting application is installed, and when the chatting application is not installed, the signal processing device 170 can be configured to display the code image 1840 for installing the chatting application.

When it is checked that the chatting application is already installed in the mobile terminal 600, the signal processing device 170 can be configured to not display the code image 1840 of FIG. 18D.

The mobile terminal 600 can be configured to display the chatting input window according to the installation or execution of the chatting application, transmit the input text to the server 500, and display the input text transmitted to the server 500 as the conversation content in the chatting window.

Accordingly, the text input through the mobile terminal 600 can be displayed on the image display apparatus 100.

Figure 19A:
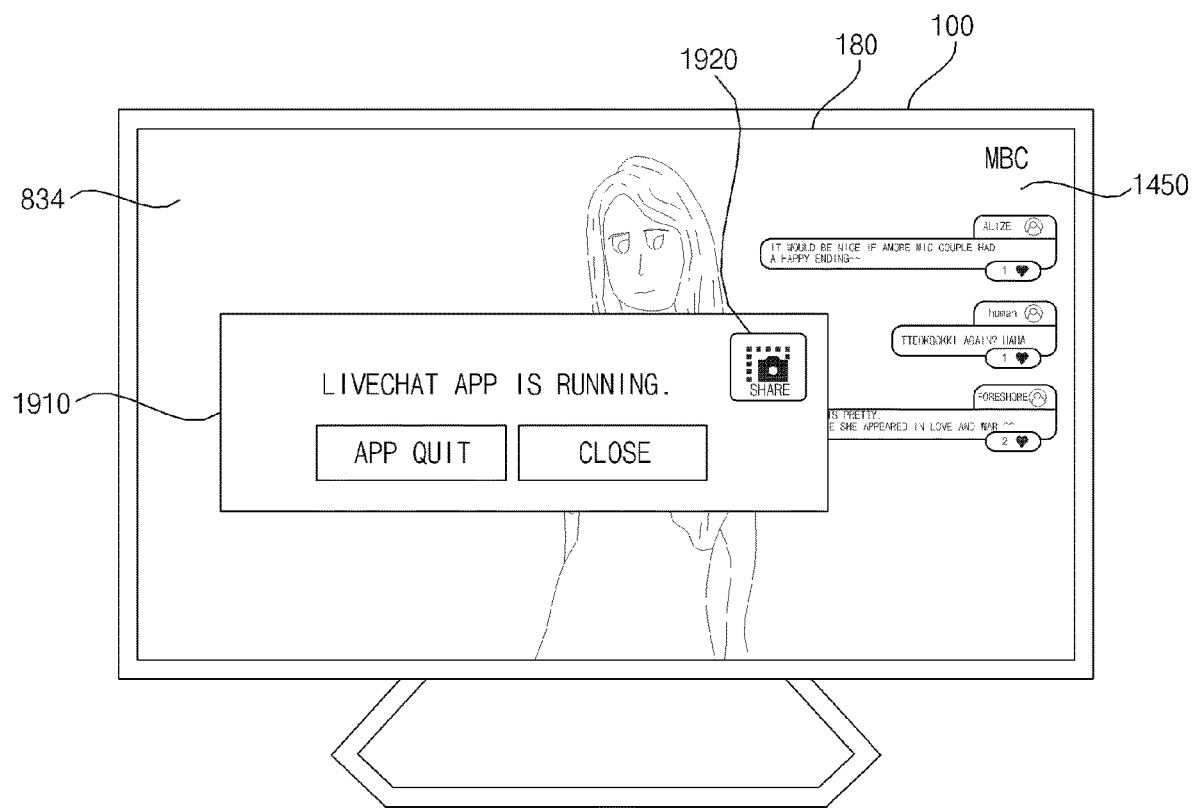

FIG. 19A illustrates that an object for continuously displaying or ending the chatting conversation content 1450 is displayed based on the signal from the remote controller 200 in a state where the broadcast image 834 and the chatting conversation content 1450 are displayed.

Referring to the drawing, based on the signal from the remote controller 200 in a state where the broadcast image 834 and the chatting conversation content 1450 are displayed, the signal processing device 170 can be configured to display the object for continuously displaying or ending the chatting conversation content 1450.

The object 1910 can include a continuing display item or an end item of the chatting conversation content 1450.

The object 1910 can further include a shared item 1920 as illustrated in the drawing.

When the shared item 1920 in the object 1910 is selected based on the signal from the remote controller 200, the signal processing device 170 can perform image capture or moving image capture of the broadcast image 834.

Figure 19B:
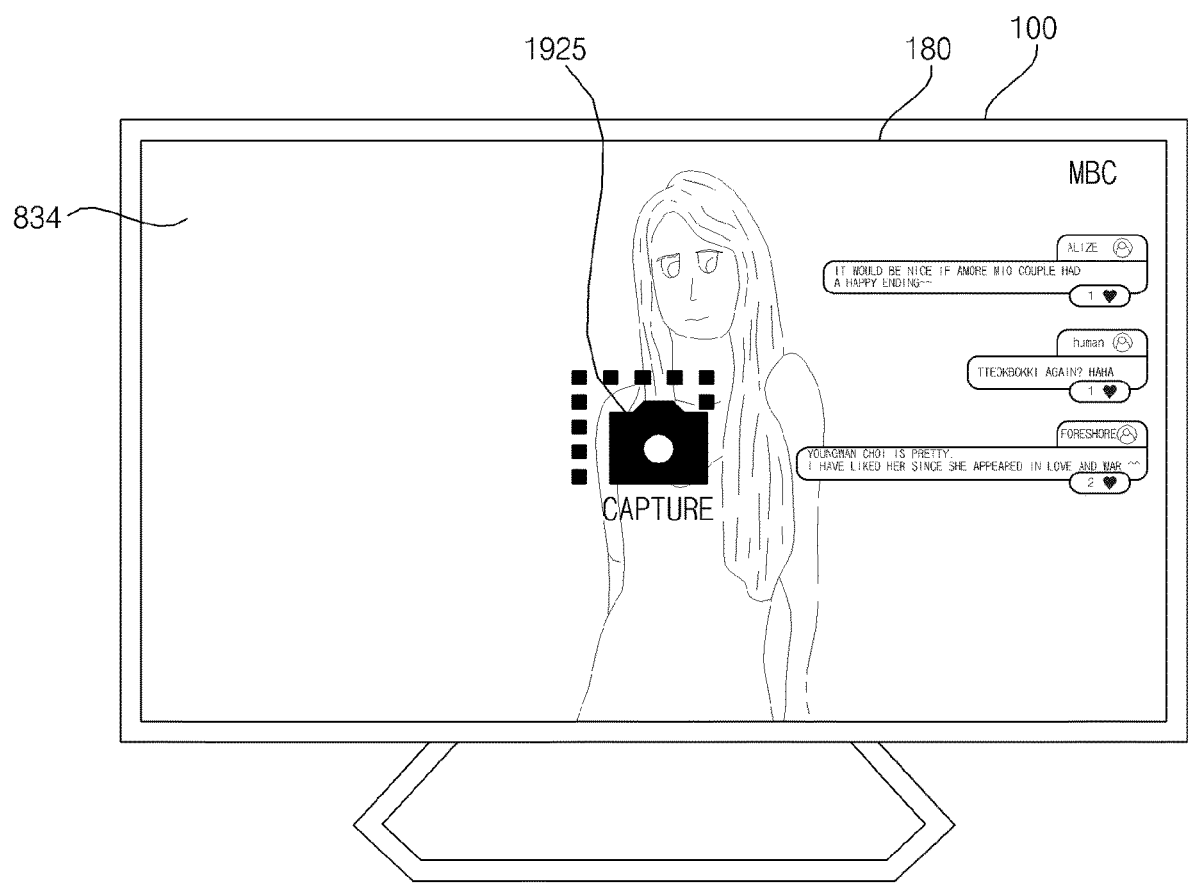

FIG. 19B is a diagram illustrating the image capture or moving image capture of the broadcast image 834.

Referring to the drawing, when the shared item 1920 in the object 1910 is selected based on the signal from the remote controller 200, the signal processing device 170 can be configured to display the object 1925 indicating that the capturing is being performed while performing the image capture or the moving image capture of the broadcast image 834.

In this situation, the captured image or moving image can include the chatting conversation content as well as the broadcast image.

Figure 19C:
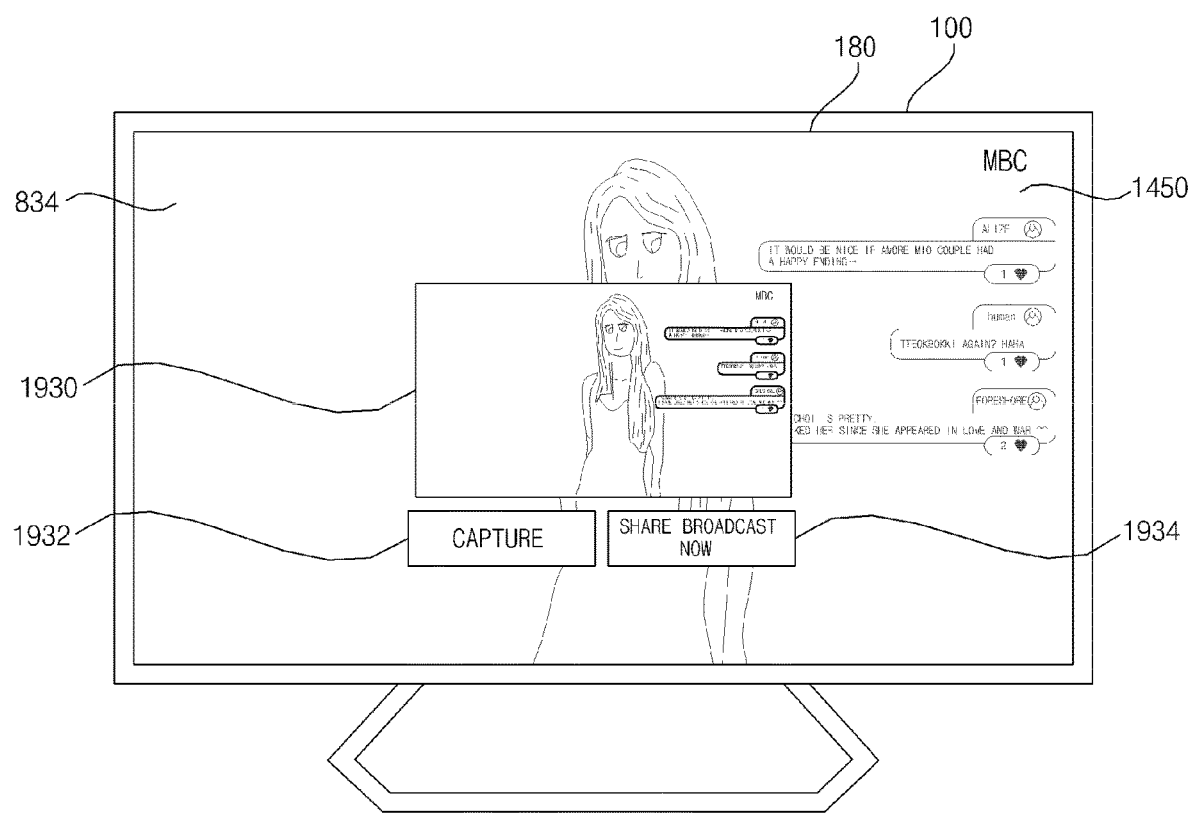

After completion of the capturing, the signal processing device 170 can be configured to display a recapture item 1932 and a transfer item 1934 together while the captured image or moving image 1930 is displayed as illustrated in FIG. 19C.

When the recapture item 1932 is selected, the signal processing device 170 can perform the image capture or moving image capture of the broadcast image 834 again.

When the transmission item 1934 is selected, the signal processing device 170 can be configured to transmit the captured image or moving image or video clip the server 500.

That is, the signal processing device 170 can be configured to transmit the captured image or moving image or video clip to the server 500 for sharing in the chatting window in which the chatting conversation content 1450 is displayed.

Figure 19D:
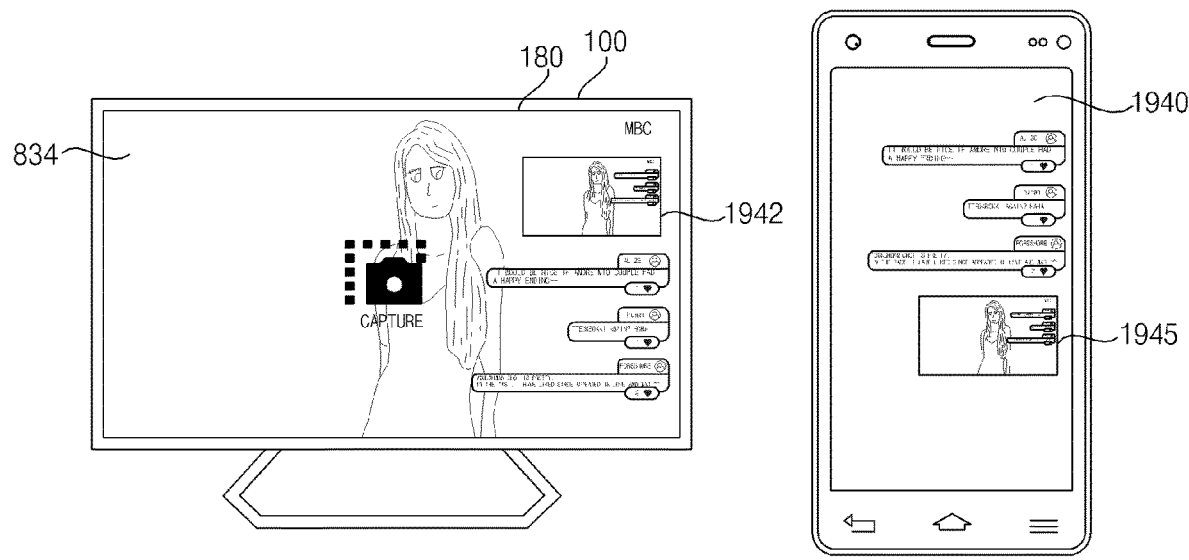

FIG. 19D illustrates that the captured image or moving image is displayed on the top right of the image display apparatus 100 and displayed on the lower side of the mobile terminal 600.

The signal processing device 170 can be configured to display the captured and shared image or the moving image 1942 at the top right to secure visibility.

That is, the signal processing device 170 of the image display apparatus 100 can be configured to display the latest conversation content in the top right to secure visibility, unlike the mobile terminal 600 displayed in the bottom.

Figure 20A:
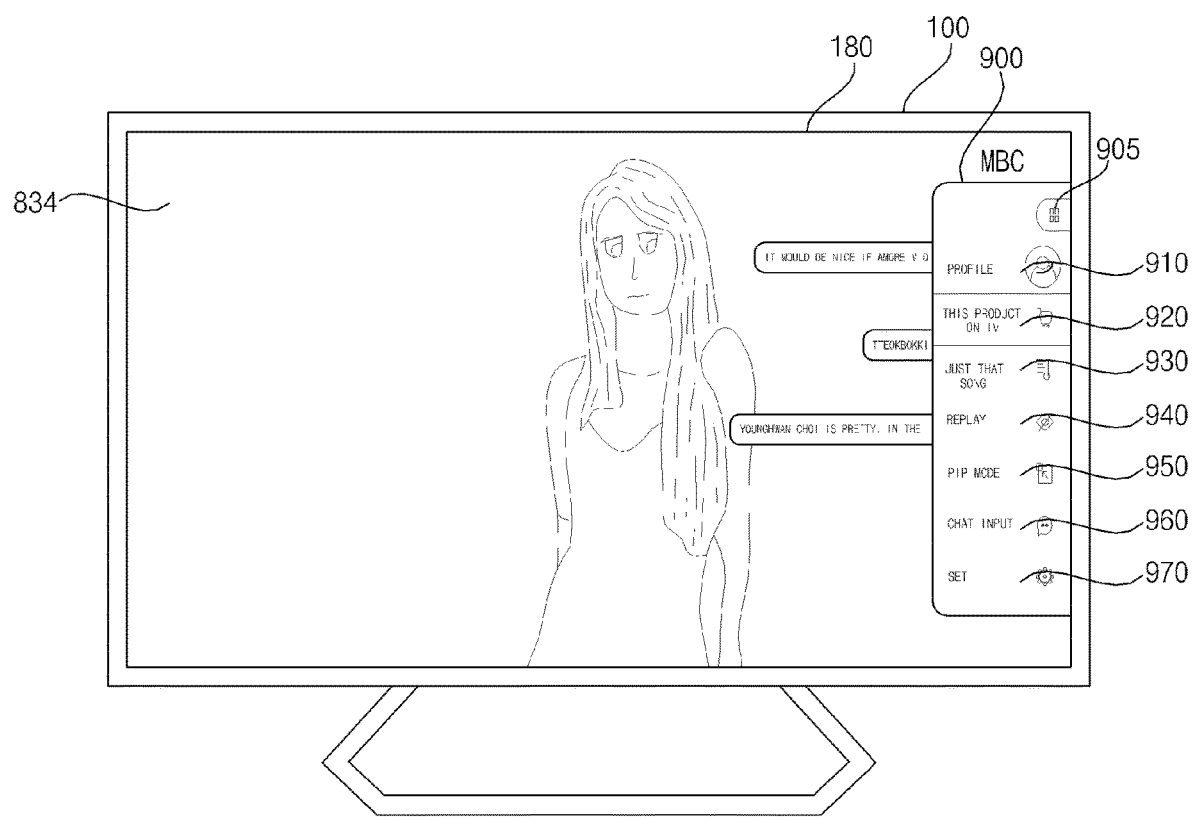

FIG. 20A illustrates that the menu 900 including the plurality of items is displayed in a state in which the broadcast image 834 and the chatting conversation content are displayed.

Figure 20B:
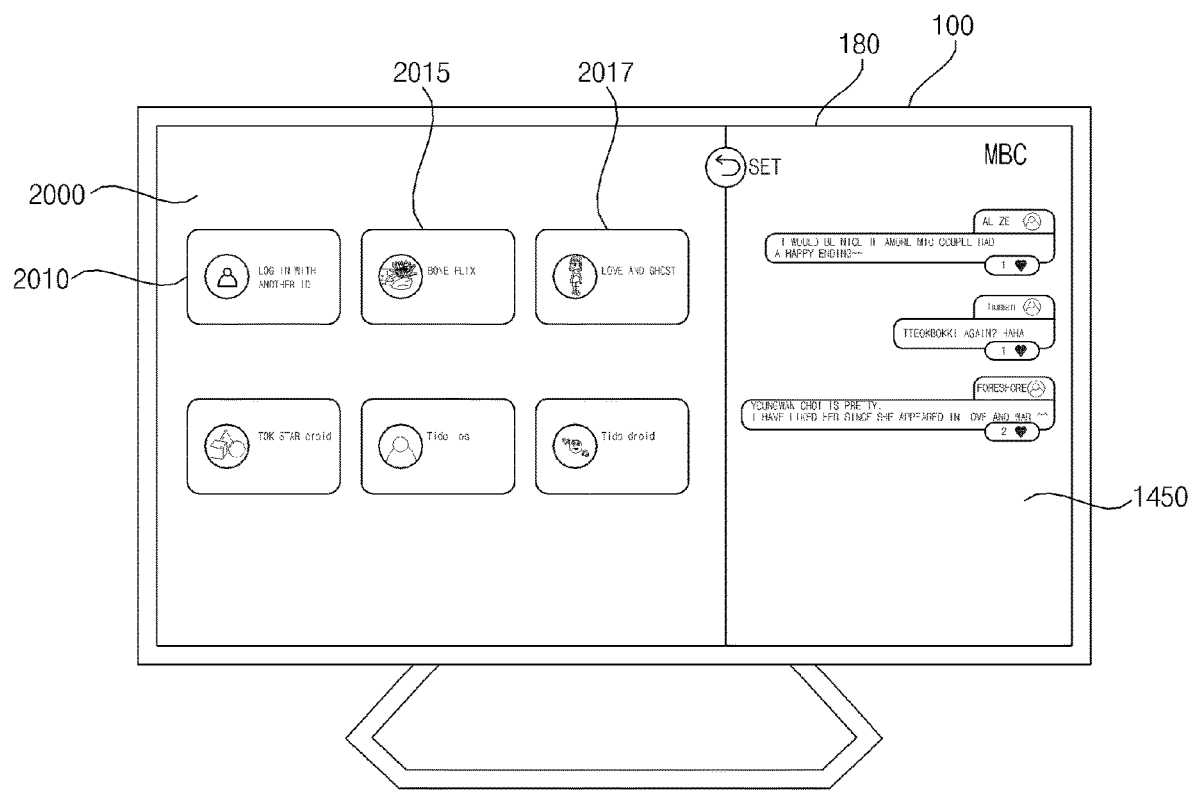

When the setting item 970 in the menu 900 is selected based on the signal from the remote controller 200, the signal processing device 170 can be configured to display a setting screen 2000 including a plurality of setting items 2010, 2015, and 2017, as illustrated in FIG. 20B.

In this situation, the signal processing device 170 can be configured to display the setting screen 2000 instead of the broadcast image 834 and the chatting conversation content 1450 as it is.

The server 500 can be configured to separate the chatting windows according to the number of image display apparatuses 100 or the number of mobile terminals 600 accessing the chatting window related to a predetermined broadcast image, and execute a plurality of chatting windows.

Specifically, when the number of image display apparatuses 100 or mobile terminals 600 accessing a chatting window related to a predetermined broadcast image exceeds a reference value, the server 500 can create and provide a new chatting window. Accordingly, it is possible to prevent access overload of a specific chatting window. For example, according to an embodiment, a user of the image display apparatuses 100 can control which people or who many people are to be included in the group conversation (e.g., a group of friends at different locations, family members in a same house, or a large public chat group or private chat group set to a maximum member limit, etc.).

For example, when the number of image display apparatuses 100 or mobile terminals 600 accessing a chatting window related to a predetermined broadcast image is 1999 and the reference value is set to 1000, the server 500 can perform a control operation so that 1000 image display apparatuses or 1000 mobile terminals access the first chatting window, and 999 image display apparatuses or 999 mobile terminals access a second chatting window.

The reference value can be changed and, for example, can be set to 667 instead of 1000.

For example, when the number of image display apparatuses 100 or mobile terminals 600 accessing the chatting window related to a predetermined broadcast image is 1999 and the reference value is set to 667, the server 500 can perform a control operation so that 667 image display apparatuses or 667 mobile terminals access the first chatting window, and 665 image display apparatuses or 665 mobile terminals access a third chatting window.

The server 500 can be configured to share the conversation content having a high number of preferences or recommendations in a first chatting window among the plurality of chatting windows with other chatting windows.

For example, while the image display apparatus 100 accesses the first chatting window and receives and displays the chatting conversation content from the server 500, the image display apparatus 1000 can be configured to receive, from the server 500, the conversation content for which the number of preferences or recommendations in the second chatting window is equal to or greater than the reference number, and display the conversation content at a specific location in the first chatting window at all times. Accordingly, it is possible to share the conversation content with a large number of preferences or recommendations.

The image display apparatus 100 can change the display speed of the chatting conversation content when the number of conversation content input from the outside is greater than or equal to the reference number.

For example, when the number of conversation contents input from the outside is equal to or greater than the reference number, the image display apparatus 100 can be configured to display one chatting conversation content every 3 seconds, and when the number of conversation contents is less than the reference number, the image display apparatus 100 can be configured to display one chatting conversation content every 5 seconds. Accordingly, the visibility of the conversation content can be improved.

The image display apparatus 100 can be configured to set the change in the display speed of chatting conversation content based on an on/off item on the chatting setting screen. Accordingly, it is possible to selectively change the display speed of chatting conversation content.

Although preferred embodiments of the present disclosure have been illustrated and described above, the present disclosure is not limited to the specific embodiments described above, various modifications can be made by those skilled in the art to which the invention pertains without departing from the gist of the present disclosure claimed in claims, and these modified embodiments should not be individually understood from the technical idea or perspective of the present disclosure.

What is claimed is:

1. An image display apparatus comprising:
a display configured to display an image;
an image receiver configured to receive a broadcast signal;
a signal processing device configured to output an image signal to the display based on the broadcast signal; and
an interface configured to exchange data with a mobile terminal or a server,
wherein the signal processing device is further configured to:
display a plurality of broadcast channel thumbnails,
in response to receiving a selection of one of the plurality of broadcast channel thumbnails, obtain a broadcast image corresponding to the one of the plurality of broadcast channel thumbnails from the image receiver, receive chatting conversation content corresponding to the broadcast image from the server through the interface, and overlay the chatting conversation content on the broadcast image,
in response to a selection of a chatting input item from a remote controller, display a mobile terminal input item, a keyboard display window, and a text input window while displaying the broadcast image and the chatting conversation content,
in response to receiving conversation content input through the text input window based on a signal from the remote controller, display the input conversation content together with the broadcast image and the chatting conversation content, and
in response to a selection of the mobile terminal input item, make the keyboard display window disappear and keep the text input window to display.

2. The image display apparatus of claim 1, wherein the signal processing device is further configured to:
synchronize the chatting conversation content from the server received through the interface with the broadcast image received from the image receiver, and overlay the chatting conversation content on the broadcast image in synchronization.

3. The image display apparatus of claim 1, wherein at least one of the plurality of broadcast channel thumbnails includes a broadcast video image, an object representing a chatting window, and information on a number of viewers of the broadcast video image.

4. The image display apparatus of claim 1, wherein the signal processing device is further configured to:
in response to execution of a broadcast chatting application, display a broadcast image and the plurality of broadcast channel thumbnails together, and
in response to a selection of a chatting window object in a thumbnail of a second channel among the plurality of broadcast channel thumbnails while displaying a broadcast image of a first channel and chatting conversation content of the first channel, display conversation content of the second channel on the broadcast image of the first channel.

5. The image display apparatus of claim 1, wherein the signal processing device is further configured to:
display a broadcast image and the plurality of broadcast channel thumbnails together, and
display chatting conversation content corresponding to a first thumbnail on a preview screen in response to focus of the first thumbnail among the plurality of broadcast channel thumbnails.

6. The image display apparatus of claim 1, wherein the signal processing device is further configured to:
display a broadcast image and the plurality of broadcast channel thumbnails together, and
in response to a first thumbnail of the plurality of broadcast channel thumbnails being focused on based on a signal from the remote controller, display a most recommended conversation content or a most preferred conversation content among chatting conversation contents corresponding to the first thumbnail.

7. The image display apparatus of claim 1, wherein the signal processing device is further configured to:
in response to receiving the input conversation content based on the signal from the remote controller, transmit the input conversation content to the server, and highlight and display the input conversation content in a chatting window.

8. The image display apparatus of claim 1, wherein the signal processing device is further configured to:
in response to receiving a selection of a preference item or a recommendation item for a first chatting conversation content from among the plurality of displayed chatting conversation contents based on a signal from the remote controller, transmit preference information or recommendation information for the first chatting conversation content to the server and display an increased number or an increased indicator corresponding to the first chatting conversation content.

9. The image display apparatus of claim 1, wherein the signal processing device is further configured to:
display a broadcast image and the plurality of broadcast channel thumbnails together and aligned in a vertical direction,
in response to a first thumbnail of the plurality of broadcast channel thumbnails being focused on based on a signal from the remote controller, display chatting conversation content corresponding to the first thumbnail on a preview screen, and
in response to receiving a channel up or channel down signal from the remote controller while the first thumbnail of the plurality of broadcast channel thumbnails is being focused on, move a focus from the first thumbnail to a second thumbnail disposed above or below the first thumbnail to focus on the second thumbnail, and display chatting conversation content corresponding to the second thumbnail on a preview screen.

10. The image display apparatus of claim 1, wherein the signal processing device is configured to:
display an indicator for a menu guide based on a signal from the remote controller, and
in response to the indicator being focused on based on a signal from the remote controller or a selection of the indicator, display a menu including the chatting input item.

11. The image display apparatus of claim 10, wherein the signal processing device is further configured to:
in response to a selection of the mobile terminal input item, in a state that a chatting application is not installed in the mobile terminal, display a code image for installing the chatting application in the mobile terminal or for pairing the image display apparatus with the mobile terminal.

12. The image display apparatus of claim 10, wherein the signal processing device is further configured to:
in response to receiving a selection of a profile item in the menu, display a profile screen for ID setting or for selecting a profile.

13. The image display apparatus of claim 10, wherein the menu includes a profile item, a product item, a music item, a replay item, a picture-in-picture (PIP) item, the chatting input item, and a setting item, and
wherein the signal processing device is further configured to separate and display the chatting conversation content displayed on the broadcast image at a distance away from the broadcast image, in response to a selection of the PIP item.

14. The image display apparatus of claim 1, wherein the signal processing device is further configured to:
display an object for continuing or ending the chatting conversation content, and
in response to a selection of a shared item in the object, capture an image or a moving image of the broadcast image to generate a captured image or a captured moving image.

15. The image display apparatus of claim 14, wherein the signal processing device is further configured to:
transmit the captured image or the captured moving image to the server for sharing a chatting window on which the chatting conversation content is displayed.

16. The image display apparatus of claim 1, wherein the signal processing device is further configured to:
separate and display the chatting conversation content displayed on the broadcast image in a first area at a distance away from the broadcast image based on an input corresponding to the PIP item, and
in response to a first thumbnail being focused on based on a signal from the remote controller while a plurality of thumbnails are displayed, display chatting conversation content corresponding to the broadcast image on the first area.

17. The image display apparatus of claim 1, wherein the signal processing device is further configured to remove a chatting window including the chatting conversation content and display only the broadcast image based on a signal from the remote controller.

18. The image display apparatus of claim 1, wherein the signal processing device is further configured to:
synchronize timing information of the chatting conversation content from the server received through the interface with timing information of the broadcast image received from the image receiver.

19. The image display apparatus of claim 1, wherein the plurality of broadcast channel thumbnails include a thumbnail of a broadcast channel received from a tuner and a thumbnail of a broadcast channel received from an external input terminal.

20. A method of controlling an image display apparatus, the method comprising:

displaying, on a display of the image display apparatus, a plurality of broadcast channel thumbnails;

in response to receiving, by a processor of the image display apparatus, a selection of one of the plurality of broadcast channel thumbnails, obtaining a broadcast image corresponding to the one of the plurality of broadcast channel thumbnails and chatting conversation content corresponding to the broadcast image from a server;

displaying the chatting conversation content together with the broadcast image on the display;

in response to a selection of a chatting input item from a remote controller, displaying a mobile terminal input item, a keyboard display window, and a text input window while displaying the broadcast image and the chatting conversation content;

in response to receiving conversation content input through the text input window from a user based on a signal from the remote controller, displaying the input conversation content together with the broadcast image and the chatting conversation content; and in response to a selection of the mobile terminal input item, making the keyboard display window disappear and keeping the text input window to display.

* * * * *